(12) United States Patent
Qiao et al.

(10) Patent No.: US 10,784,041 B2
(45) Date of Patent: Sep. 22, 2020

(54) ELECTROMAGNETIC POWER CONVERTER

(71) Applicant: NUtech Ventures, Lincoln, NE (US)

(72) Inventors: Wei Qiao, Lincoln, NE (US); Liyan Qu, Lincoln, NE (US); Haosen Wang, Lincoln, NE (US)

(73) Assignee: NUtech Ventures, Lincoln, NE (US)

( * ) Notice: Subject to any disclaimer, the term of this patent is extended or adjusted under 35 U.S.C. 154(b) by 0 days.

(21) Appl. No.: 16/410,913

(22) Filed: May 13, 2019

(65) Prior Publication Data

US 2019/0267186 A1 Aug. 29, 2019

Related U.S. Application Data

(63) Continuation of application No. 15/746,316, filed as application No. PCT/US2016/043150 on Jul. 20, 2016, now Pat. No. 10,290,417.
(Continued)

(51) Int. Cl.
*G05F 1/325* (2006.01)
*H01F 29/14* (2006.01)
(Continued)

(52) U.S. Cl.
CPC ............ *H01F 29/146* (2013.01); *H01F 3/10* (2013.01); *H01F 27/24* (2013.01); *H01F 29/14* (2013.01);
(Continued)

(58) Field of Classification Search
CPC ... G05F 1/32; G05F 1/325; G05F 1/33; G05F 1/335; G05F 1/34; G05F 1/38
See application file for complete search history.

(56) References Cited

U.S. PATENT DOCUMENTS

| 2,493,388 A | 1/1950 | Candy |
| 2,519,425 A | 8/1950 | Barlow |
(Continued)

FOREIGN PATENT DOCUMENTS

| WO | WO 2007/121427 | 10/2007 |
| WO | WO 2008/100127 | 8/2008 |

OTHER PUBLICATIONS

Astrov, "Magnetoelectric effect in chromium oxide," Soviet Phys. JETP, 1961, 13: 726-733.
(Continued)

*Primary Examiner* — Harry R Behm
(74) *Attorney, Agent, or Firm* — Fish & Richardson P.C.

(57) ABSTRACT

Magnetic flux valves can be used in electromagnetic (EM) power converters to electronically control output signals of the EM power converters. An input signal is provided to an EM power converter that includes two or more core sections in which at least one core section includes a magnetic flux valve having an adjustable reluctance. The EM power converter has one or more primary windings and one or more secondary windings wound around one or more core sections. One or more control signals are provided to the one or more magnetic flux valves to control a reluctance or reluctances of the one or more magnetic flux valves, affecting magnetic coupling between the primary and secondary windings. An output signal is generated, in which the output signal is a function of the input signal and the one or more control signals.

27 Claims, 37 Drawing Sheets

Related U.S. Application Data

(60) Provisional application No. 62/195,093, filed on Jul. 21, 2015.

(51) Int. Cl.

| | | |
|---|---|---|
| *H01F 3/10* | (2006.01) | |
| *H02M 5/16* | (2006.01) | |
| *H02M 5/18* | (2006.01) | |
| *H01F 27/24* | (2006.01) | |
| *H01L 41/00* | (2013.01) | |

(52) U.S. Cl.
CPC ............. *H02M 5/16* (2013.01); *H02M 5/18* (2013.01); *G05F 1/325* (2013.01); *H01F 2003/106* (2013.01); *H01F 2029/143* (2013.01); *H01L 41/00* (2013.01)

(56) References Cited

U.S. PATENT DOCUMENTS

| | | | | |
|---|---|---|---|---|
| 2,519,426 | A | * | 8/1950 | Grant .................... H03K 17/82 307/112 |
| 3,184,675 | A | * | 5/1965 | Sutherland ................ G05F 1/38 323/334 |
| 3,454,862 | A | | 7/1969 | Kurimura et al. |
| 3,757,201 | A | | 9/1973 | Cornwell |
| 3,932,791 | A | | 1/1976 | Oswald |
| 4,041,431 | A | | 8/1977 | Enoksen |
| 4,056,411 | A | | 11/1977 | Chen et al. |
| 4,468,725 | A | | 8/1984 | Venturini |
| 4,612,527 | A | | 9/1986 | Third et al. |
| 4,876,638 | A | | 10/1989 | Silva et al. |
| 6,809,516 | B1 | | 10/2004 | Li et al. |
| 6,885,270 | B2 | | 4/2005 | Buswell |
| 7,199,495 | B2 | | 4/2007 | Or et al. |
| 7,476,998 | B2 | | 1/2009 | Maeda |
| 7,573,172 | B2 | | 8/2009 | Maeda |
| 9,030,843 | B1 | * | 5/2015 | Herbert ............. H02M 3/33561 363/17 |
| 10,290,417 | B2 | | 5/2019 | Qiao et al. |
| 2007/0242406 | A1 | | 10/2007 | Annis et al. |
| 2009/0230776 | A1 | | 9/2009 | Ocht et al. |
| 2010/0176755 | A1 | | 7/2010 | Hoadley et al. |
| 2013/0021126 | A1 | | 1/2013 | Gajewski |
| 2013/0320940 | A1 | | 12/2013 | Dimitrovski et al. |
| 2014/0241012 | A1 | | 8/2014 | Lindberg-Poulsen et al. |

OTHER PUBLICATIONS

Astrov, "The magnetoelectric effect in antiferromagnetics," Soviet Phys. JETP, 1960, 11: 708-709.
Curie, "Sur la symetrie dans les phenomenes physiques," J. of Phys, 1894, 3: 393-415 (Machine Translation).
Dong et al., "A strong magnetoelectric voltage gain effect in magnetostrictive/piezoelectric Composite," Applied Physics Letters, Oct. 2004, 85: 3534-3536.
Dong et al., "Characterization of magnetoelectric laminate composites operated in longitudinal-transverse and transverse-transverse modes," Journal of Applied Physics, Mar. 2004, 95: 2625-2630.
Dong et al., "Push-pull mode magnetostrictive/piezoelectric laminate composite with an enhanced magnetoelectric voltage coefficient," Applied Physics Letters, 2005, 87: 062502.
Dong et al., "Ultrahigh magnetic field sensitivity in laminates of TERFENOL-D and Pb ( Mg 1/3 Nb 2/3) O 3—PbTiO 3 crystals," Appl. Phys. Lett., 2003, 83:2265.
Fetisov, "Magnetoelectric Effect in Multilayer Ferromagnetic-piezoelectric Structures and Its Application in Electronics," Bulletin of the Russian Academy of Sciences: Physics, 2007, 71: 1626-1628.
Huber and Kolar, "Volume/weight/cost comparison of a 1MVA 10 kV/400V solid-state against a conventional low-frequency distribution transformer," in Proceedings of the IEEE Energy Conversion Congress and Exposition, Sep. 2014, 4545-4552.
International Preliminary Report on Patentability in International Application No. PCT/US2016/043150, dated Jan. 23, 2018, 17 pages.
International Search Report & Written Opinion in International Application No. PCT/US2016/043150, dated Nov. 29, 2016, 24 pages.
Invitation to Pay Additional Fees in International Application No. PCT/US2016/043150, dated Sep. 1, 2016, 2 pages.
Jia et al., "Converse magnetoelectric effect in laminated composites of PMN¬PT single crystal and Terfenol-D alloy," Applied Physics Letters, 2006, 88: 242902.
Kramer et al., "Advanced power electronic interfaces for distributed energy systems," Technical Report NREL/TP-581-42672, National Renewable Energy Laboratory, Mar. 2008, 132 pages.
Lebedev et al., "Converse magnetoelectric effect dependence with CoFeB composition in ferromagnetic/piezoelectric composites," Journal of Applied Physics, 2012, 111: 07C725.
Lin et al., "Voltage Tunable Magnetoelectric Inductors With Improved Operational Frequency and Quality Factor for Power Electronics," IEEE Trans. Magn, 2015, 51(1).
Lou et al., "Electrostatically tunable magnetoelectric inductors with large inductance Tenability," Appl. Phys. Lett, 2009, 94: 112508.
März et al., "Power electronics system integration for electric and hybrid vehicles," in Proceedings of the 6th International Conference on Integrated Power Systems, 2010, pp. 1-10.
Merkhouf et al., "Variable frequency transformer—Concept and electromagnetic design evaluation," IEEE Transactions on Energy Conversion, Dec. 2008, 23: 989-996.
Nan et al., "Multiferroic magnetoelectric composites: Historical perspective, status, and future directions," Journal of Applied Physics, 2008, 103: 031101-1-35.
Ozaki et al., "Magnetic flux memory effect using a magnetostrictive material-shape memory piezoelectric actuator composite," Aug. 2009, 154: 69-72.
Pettiford et al., "Bias Field Effects on Microwave Frequency Behavior of PZT/YIG Magnetoelectric Bilayer," IEEE Trans. Magn, 2007, 43: 3343.
Piwko et al., "Variable frequency transformer—A new alternative for asynchronous power transfer," in Proceedings of the Inaugural IEEE PES Conference and Exposition in Africa, Jul. 2005, 393-398.
Popov et al., "Direct and converse magnetoelectric effect at resonant frequency in laminar piezoelectric-magnetostrictive composite," Feb. 2008, 20: 53-58.
Ueno et al., "Magnetic Force Control With Composite of Giant Magnetostrictive and Piezoelectric Materials," IEEE Trans. Magn, 2003, 39: 3534.
Ustinov et al., "Ferrite-ferroelectric hybrid wave phase shifters," Appl. Phys. Lett, 2007, 90: 031913.
Wang and Blaabjerg, "Reliability of capacitors for DC-link application in power electronic converters—An overview," IEEE Transactions on Industry Applications, Sep./Oct. 2014, 50: 3569-3578.
Yang et al., "Condition monitoring for device reliability in power electronic converters: A review," IEEE Transactions on Power Electronics, Nov. 2010, 25: 2734-2752.
Zhai et al., "Detection of pico-Tesla magnetic fields using magnetoelectric sensors at room Temperature," Appl. Phys. Lett., 2006, 88:062510.

* cited by examiner

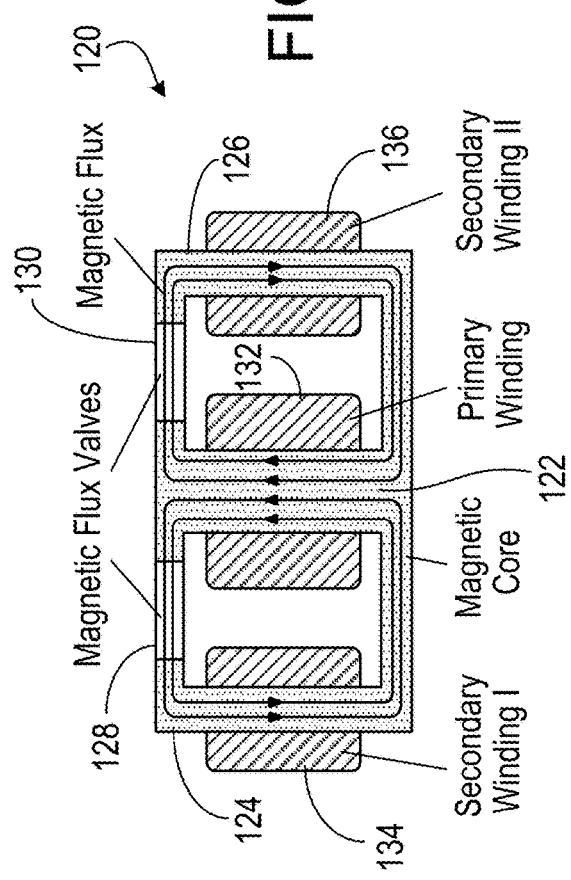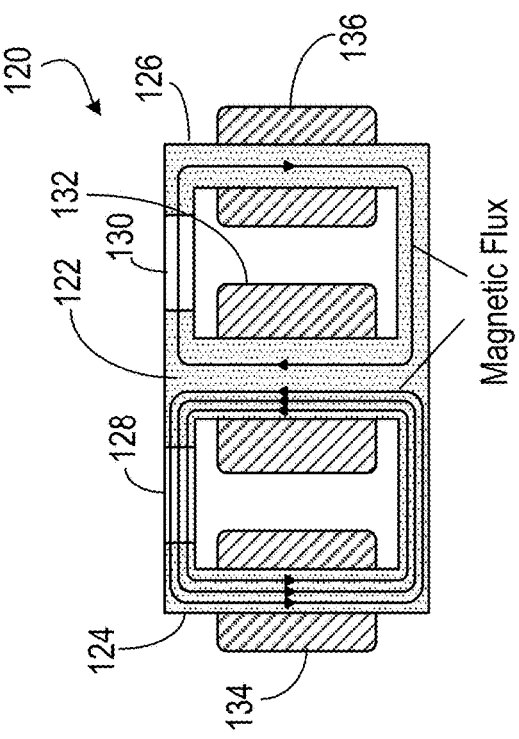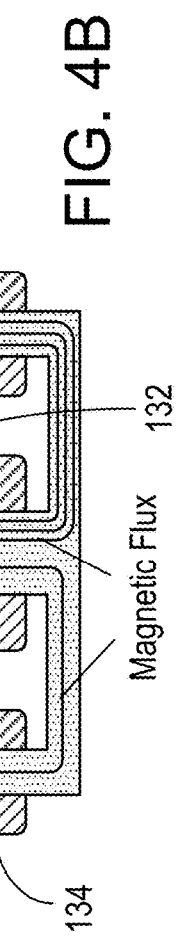

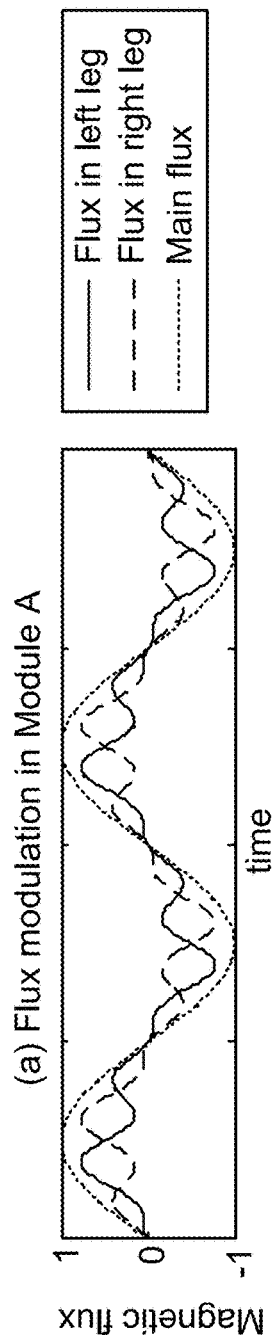
FIG. 8A (a) Flux modulation in Module A
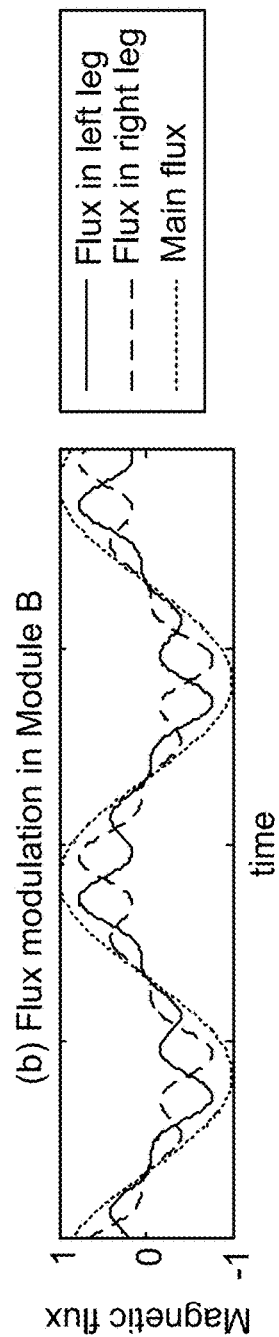
FIG. 8B (b) Flux modulation in Module B
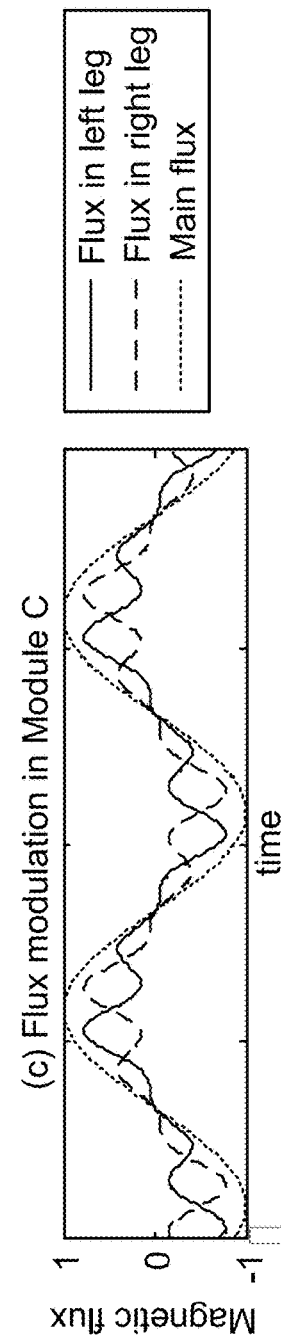
FIG. 8C (c) Flux modulation in Module C
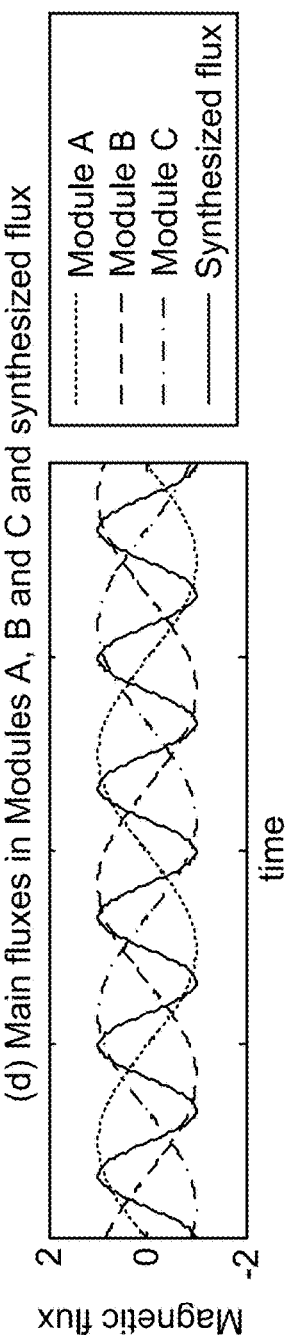
FIG. 8D (d) Main fluxes in Modules A, B and C and synthesized flux

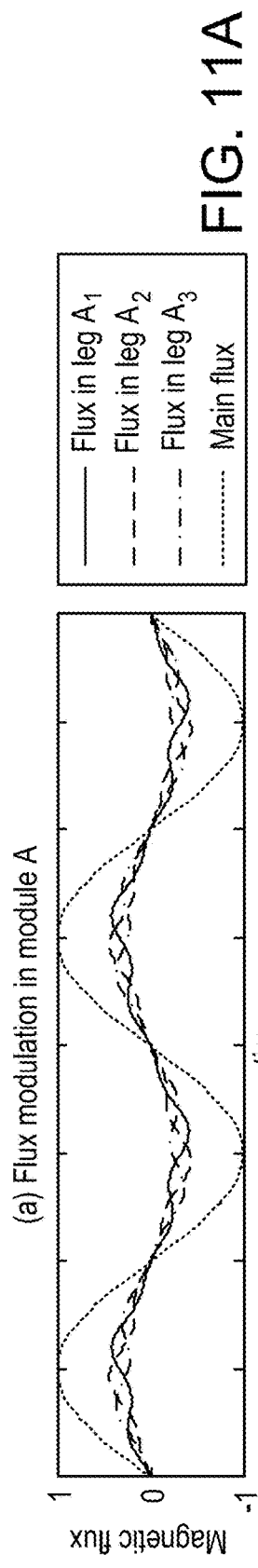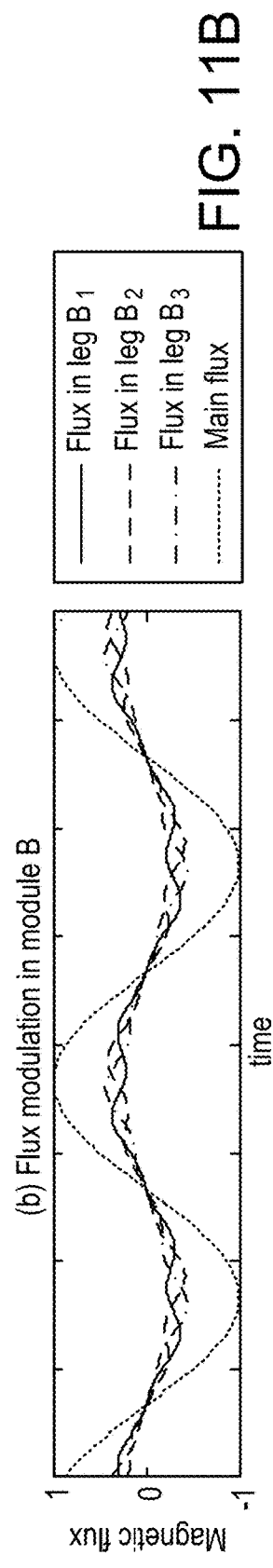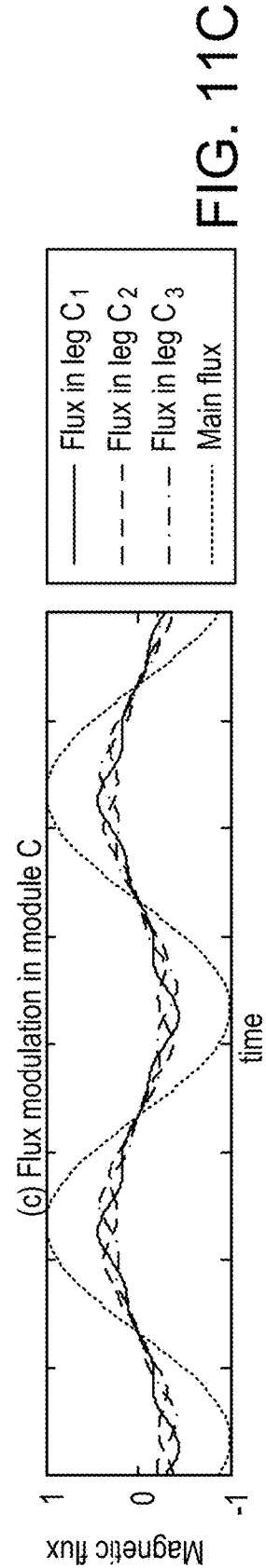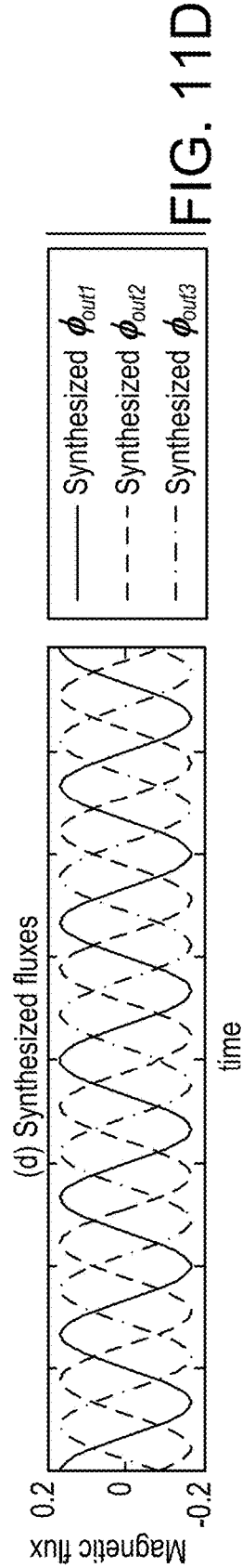
FIG. 11A
FIG. 11B
FIG. 11C
FIG. 11D

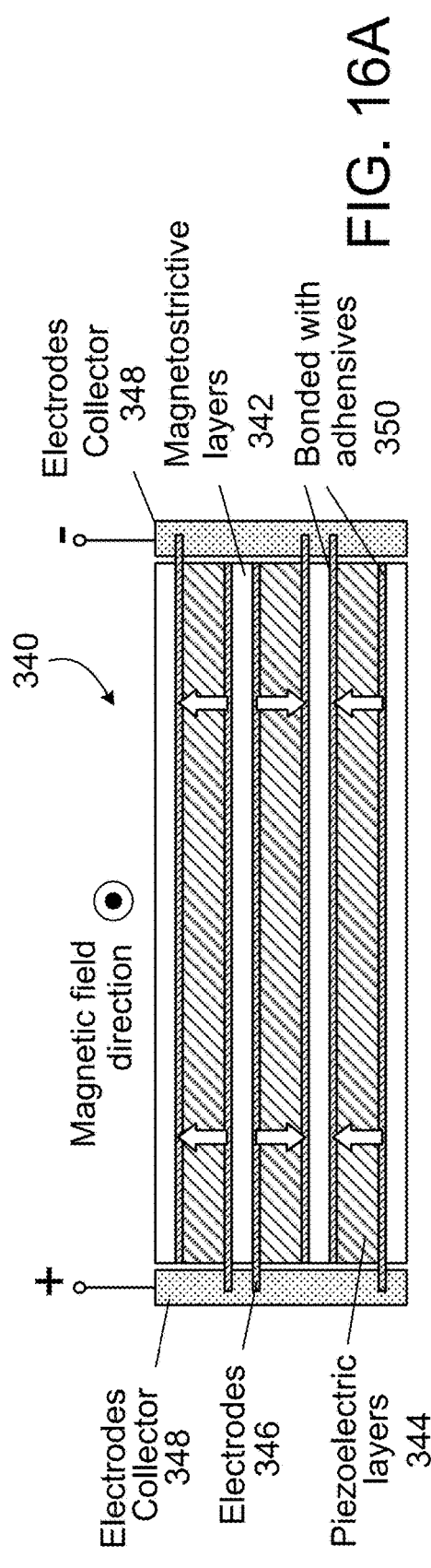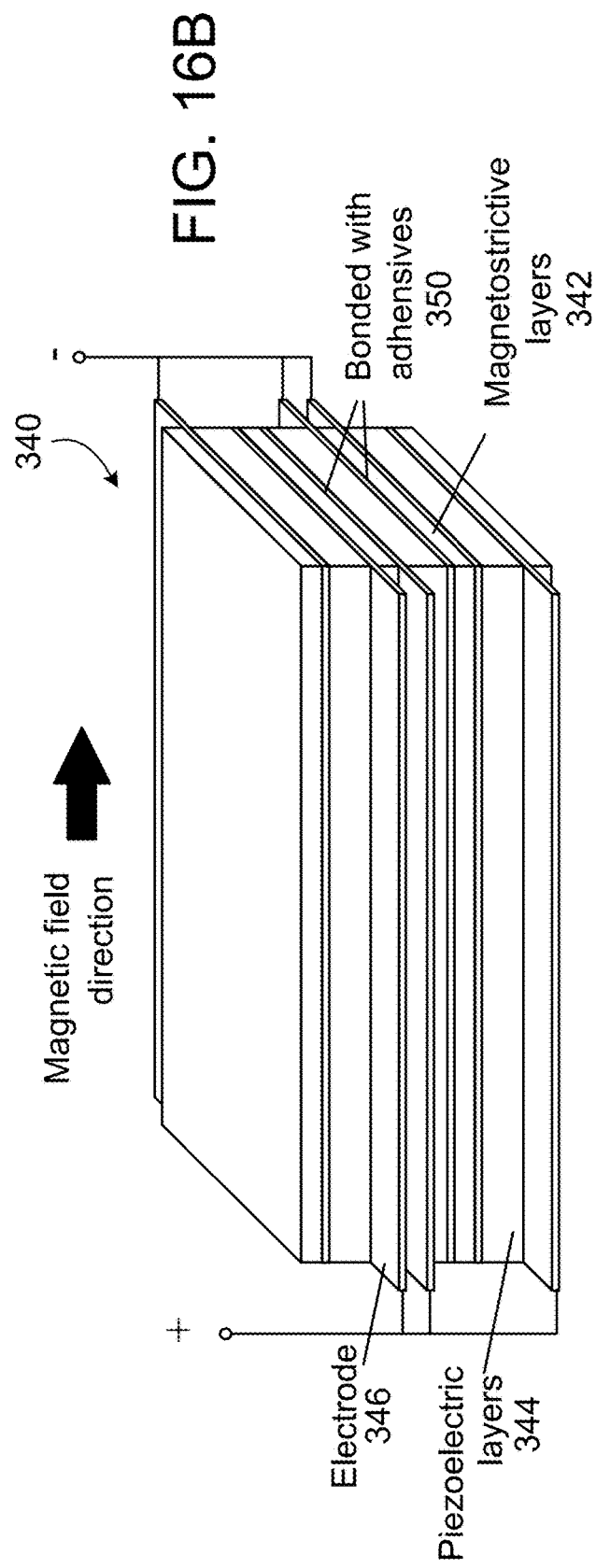
FIG. 16A
FIG. 16B

ELECTROMAGNETIC POWER CONVERTER

CROSS-REFERENCE TO RELATED APPLICATION

This application is a continuation of U.S. patent application Ser. No. 15/746,316 filed Jan. 19, 2018, which is a U.S. National Application of PCT/US2016/043150 filed Jul. 20, 2016, which claims priority to U.S. provisional patent application 62/195,093, filed on Jul. 21, 2015, which is incorporated by reference in its entirety.

TECHNICAL FIELD

This subject matter is generally related to electromagnetic power converters.

BACKGROUND

Power transformer is commonly used to convert the amplitude of the voltage of an alternating current (AC) source from one level to another. It plays an important role in electric power conversion, delivery, distribution, and utilization. In some implementations, the working principle of the power transformer is based on the magnetoelectric induction. When the primary windings of a power transformer are connected with an AC source, an AC voltage of the same frequency as that of the source voltage will be induced on the secondary windings. The voltage ratio of the power transformer, which is defined to be the ratio between the amplitudes of the input and output voltages, is determined by the turns ratio of the transformer. If the turns ratio of a power transformer is fixed, the voltage ratio will also be fixed. In some implementations, in order to change the voltage ratio of a power transformer, a tap-changing mechanism is used with the winding that allows a variable number of turns to be selected in discrete steps. The tap changer is a mechanical mechanism and can adjust the voltage ratio in discrete steps.

Power electronic converters can be used for variable-voltage and variable-frequency AC-AC power conversion. For example, power electronic converters can be made using power semiconductor devices, including insulated-gate bipolar transistors (IGBTs), metal-oxide-semiconductor field-effect transistors (MOSFETs), thyristors, and/or diodes, as well as passive components, such as inductors and capacitors. For example, AC-AC electric power conversion can be implemented using a variable frequency transformer (VFT). The VFT includes a rotary transformer (similar to an asynchronous generator) driven by an adjustable-speed DC motor drive. By adjusting the rotational speed of the VFT's rotor via the motor drive, two AC power systems with different frequencies or phases can be connected to the stator and rotor windings of the rotary transformer, respectively. The VFT can be used as a continuously variable phase-shifting transformer for power transfer between two asynchronous power networks with the same frequency.

SUMMARY

In general, in one aspect, a method for converting power is provided. The method includes providing an input signal to an electromagnetic (EM) power converter that comprises two or more core sections in which at least one core section comprises a magnetic flux valve having an adjustable reluctance, the EM power converter having one or more primary windings and one or more secondary windings wound around one or more core sections; providing one or more control signals to the one or more magnetic flux valves to control a reluctance or reluctances of the one or more magnetic flux valves, affecting magnetic coupling between the primary and secondary windings; and generating an output signal that is a function of the input signal and the one or more control signals.

Implementations of the method may include one or more of the following features. Each magnetic flux valve can include one or more layers of piezoelectric material, one or more layers of magnetostrictive material, and electrodes to receive one of the control signals.

The method can include using the control signal to provide electric charges to the one or more layers of piezoelectric material, and maintaining at least a portion of the electric charges at the one or more layers of piezoelectric material after removing the control signal.

The one or more layers of piezoelectric material can include a lead zirconate titanate (PZT) ceramic sheet, a PZT ceramic plate, PZT fibers, a polyvinylidene fluoride (PVDF) film, PMN-PT [Pb(Mg1/3Nb2/3)O3-PbTiO3] single crystals, or other materials that have the inverse piezoelectric effect.

The one or more layers of magnetostrictive material can include a Metglas® foil, a Terfenol-D (Tb0.30Dy0.70Fe1.92) foil, or other materials that have the converse magnetostrictive effect.

The two or more core sections can include a first core leg, a second core leg, and a third core leg, the second core leg can include a first magnetic flux valve, and the third core leg can include a second magnetic flux valve.

Providing one or more control signals can include providing a first control signal to the first magnetic flux valve and providing a second control signal to the second magnetic flux valve.

The method can include configuring the first and second control signals to provide a constant difference between the reluctance of the first magnetic flux valve and the reluctance of the second magnetic flux valve.

The method can include configuring the first and second control signals to provide a time-varying difference between the reluctance of the first magnetic flux valve and the reluctance of the second magnetic flux valve.

The difference between the reluctance of the first magnetic flux valve and the reluctance of the second magnetic flux valve can have a sinusoidal waveform.

The input signal can have a sinusoidal waveform, square waveform, or triangular waveform, and the output signal can also have a corresponding sinusoidal, square, or triangular waveform. The input and output signals can also have other waveforms.

The method can include modifying the first and second control signals to modify an amplitude of the output signal.

The method can include modifying the first and second control signals to modify a frequency of the output signal.

The method can include modifying the first and second control signals to modify a waveform of the output signal.

The input signal can have a sinusoidal waveform, and the output signal can have a square waveform or a triangular waveform.

The two or more core sections can include a first core leg, a second core leg, a third core leg, and a fourth core leg, the second core leg can include a first magnetic flux valve, the third core leg can include a second magnetic flux valve, and the fourth core leg can include a third magnetic flux valve.

Providing one or more control signals can include providing a first control signal to the first magnetic flux valve, providing a second control signal to the second magnetic flux valve, and providing a third control signal to the third magnetic flux valve.

The EM power converter can include three power converter modules, providing the input signal to the EM power converter can include providing a three-phase input signal to the three power converter modules, and generating an output signal can include generating a single-phase output signal.

Each power converter module can include a first core leg, a second core leg, and a third core leg, the second core leg can include a first magnetic flux valve, and the third core leg can include a second magnetic flux valve.

For each power converter module, a primary winding can be wound around the first leg, a first secondary winding can be wound around the second core leg, and a second secondary winding can be wound around the third core leg.

The secondary windings can be electrically coupled in series, and the output signal can be generated across the secondary windings.

A negative terminal of the first secondary winding can be electrically coupled to a negative terminal of the second secondary winding.

The EM power converter can include nine power converter modules, providing the input signal to the EM power converter can include providing a three-phase input signal to the nine power converter modules, and generating an output signal can include generating a three-phase output signal.

Each power converter module can include a first core leg, a second core leg, and a third core leg, the second core leg includes a first magnetic flux valve, and the third core leg includes a second magnetic flux valve.

For each power converter module, a primary winding can be wound around the first core leg, a first secondary winding can be wound around the second core leg, and a second secondary winding can be wound around the third core leg.

The nine power converter modules can be grouped into three sets of power converter modules, each set of power converter modules can include three power converter modules, and the secondary windings of the three power converter modules in the set can be electrically coupled in series.

The method can include providing a three-phase input signal to each set of power converter modules.

The method can include controlling the control signals provided to the magnetic flux valves to provide a first phase output signal across the secondary windings of the first set of power converter modules, provide a second phase output signal across the secondary windings of the second set of power converter modules, and provide a third phase output signal across the secondary windings of the third set of power converter modules.

The EM power converter can include three power converter modules, providing the input signal to the EM power converter can include providing a three-phase input signal to the three power converter modules, and generating an output signal can include generating a three-phase output signal.

Each power converter module can include a first core leg, a second core leg, a third core leg, and a fourth core leg, the second core leg can include a first magnetic flux valve, the third core leg can include a second magnetic flux valve, and the fourth core leg can include a third magnetic flux valve.

For each power converter module, a primary winding can be wound around the first core leg, a first secondary winding can be wound around the second core leg, a second secondary winding can be wound around the third core leg, and a third secondary winding can be wound around the fourth core leg.

The method can include providing the three-phase input signal to the primary windings of the power converter modules.

The first secondary windings of the three power converter modules can be electrically coupled in series, the second secondary windings of the three power converter modules can be electrically coupled in series, and the third secondary windings of the three power converter modules can be electrically coupled in series.

A negative terminal of the first secondary winding of the first power converter module can be electrically coupled to a positive terminal of the second secondary winding of the second power converter module; a negative terminal of the second secondary winding of the second power converter module can be electrically coupled to the positive terminal of the third secondary winding of the third power converter module; and a positive terminal of the first secondary winding of the first power converter module and a negative terminal of the third secondary winding of the third power converter module can be two output terminals of one phase output of a three-phase EM power converter.

A negative terminal of the second secondary winding of the first power converter module can be electrically coupled to a positive terminal of the third secondary winding of the second power converter module; a negative terminal of the third secondary winding of the second power converter module can be electrically coupled to the positive terminal of the first secondary winding of the third power converter module; and a positive terminal of the second secondary winding of the first power converter module and a negative terminal of the first secondary winding of the third power converter module can be two output terminals of a second phase output of the three-phase EM power converter.

A negative terminal of the third secondary winding of the first power converter module can be electrically coupled to a positive terminal of the first secondary winding of the second power converter module; a negative terminal of the first secondary winding of the second power converter module can be electrically coupled to the positive terminal of the second secondary winding of the third power converter module; a positive terminal of the third secondary winding of the first power converter module and a negative terminal of the second secondary winding of the third power converter module can be two output terminals of a third phase output of the three-phase EM power converter.

A first phase of the three-phase output signal can be generated across the series-connected first secondary windings, a second phase of the three-phase output signal can be generated across the series-connected second secondary windings, and a third phase of the three-phase output signal can be generated across the series-connected third secondary windings.

The two or more core sections can include three or more core legs, each core leg can include a magnetic flux valve, and a primary winding and a secondary winding can be wound around each core leg.

The method can include providing a multi-phase input signal to the primary windings, and generating a multi-phase output signal at the secondary windings.

The method can include providing a three-phase input signal to the primary windings and generating a three-phase output signal at the secondary windings.

The two or more core sections can include nine core legs, each core leg can include a magnetic flux valve, the primary windings of the first, second, and third core legs can be connected in series, the primary windings of the fourth, fifth, and sixth core legs can be connected in series, and the primary windings of the seventh, eighth, and ninth core legs can be connected in series.

The secondary windings of the first, fourth, and seventh core legs can be connected in series, the secondary windings of the second, fifth, and eighth core legs can be connected in series, and the secondary windings of the third, sixth, and ninth core legs can be connected in series.

Providing the three-phase input signal can include providing a first phase input signal across the primary windings of the first, second, and third core legs, providing a second phase input signal across the primary windings of the fourth, fifth, and sixth core legs, and providing a third phase input signal across the primary windings of the seventh, eight, and ninth core legs.

Generating the three-phase output signal can include generating a first phase output signal across the secondary windings of the first, fourth, and seventh core legs, generating a second phase output signal across the secondary windings of the second, fifth, and eighth core legs, and generating a third phase output signal across the secondary windings of the third, sixth, and ninth core legs.

One of the core sections can include a magnetic flux valve and a magnetically permeable material, the magnetically permeable material can be coupled to the magnetic flux valve, the magnetic flux can travel in the magnetic flux valve and the magnetically permeable material in a same direction.

One of the core sections can include a magnetic flux valve and a magnetically permeable material, the magnetically permeable material can be spaced apart from the magnetic flux valve, the magnetic flux can travel in the magnetic flux valve along a first direction, and the magnetic flux can travel in the magnetically permeable material in a second direction opposite to the first direction.

The magnetically permeable material can include a ferrite ring core that surrounds the magnetic flux valve.

In general, in another aspect, an apparatus that includes a power converter having two or more core sections is provided. At least one core section includes a magnetic flux valve having an adjustable reluctance. The power converter has one or more primary windings and one or more secondary windings that are wound around one or more core sections. The core sections include magnetically permeable material, and the reluctance of the magnetic flux valve is a function of a control signal applied to the magnetic flux valve.

Implementations of the apparatus may include one or more of the following features. The magnetic flux valve can include one or more layers of piezoelectric material, one or more layers of magnetostrictive material, and electrodes to receive the control signal.

The one or more layers of piezoelectric material can hold electric charges provided by the control signal and maintain at least a portion of the electric charges after the control signal is removed.

The one or more layers of piezoelectric material can include a lead zirconate titanate (PZT) ceramic sheet, a PZT ceramic plate, PZT fibers, a polyvinylidene fluoride (PVDF) film, PMN-PT [Pb(Mg1/3Nb2/3)O3-PbTiO3] single crystals, or other materials that have the inverse piezoelectric effect.

The one or more layers of magnetostrictive material can include a Metglas® foil, a Terfenol-D ($Tb_{0.30}Dy_{0.70}Fe_{1.92}$) foil, or other materials that have the converse magnetostrictive effect.

The two or more core sections can include a first core leg, a second core leg, and a third core leg, the second core leg can include a first magnetic flux valve, and the third core leg can include a second magnetic flux valve.

The first magnetic flux valve can have a reluctance that is a function of a first control signal, and the second magnetic flux valve can have a reluctance that is a function of a second control signal.

The apparatus can include a driver circuit configured to generate the first and second control signals.

A primary winding can be wound around the first core leg, a first secondary winding can be wound around the second core leg, and a second secondary winding can be wound around the third core leg.

The first and second secondary windings can be connected in series, and the driver circuit can be configured to generate the first and second control signals having waveforms such that when the primary winding receives an input signal having a sinusoidal waveform, the first and second secondary windings generate an output signal having a sinusoidal waveform.

A negative terminal of the first secondary winding can be electrically coupled to a negative terminal of the second secondary winding.

The first and second secondary windings can be connected in series, and the driver circuit can be configured to generate the first and second control signals having waveforms such that when the primary winding receives an input signal having a sinusoidal waveform, the first and second secondary windings generate an output signal having at least one of a square or triangular waveform.

A negative terminal of the first secondary winding can be electrically coupled to a negative terminal of the second secondary winding.

The power converter can be configured such that a first portion of a magnetic flux generated by the primary winding passes the second core leg, a second portion of the magnetic flux generated by the primary winding passes the third core leg, and a ratio between the first and second portions is controlled by the first and second control signals.

The two or more core sections can include a first core leg, a second core leg, a third core leg, and a fourth core leg, the second core leg can include a first magnetic flux valve, the third core leg can include a second magnetic flux valve, and the fourth core leg can include a third magnetic flux valve.

The first magnetic flux valve can have a reluctance that is a function of a first control signal, the second magnetic flux valve can have a reluctance that is a function of a second control signal, and the third magnetic flux valve can have a reluctance that is a function of a third control signal.

The apparatus can include a driver circuit configured to generate the first, second, and third control signals.

The power converter can be configured such that a first portion of a magnetic flux generated by the primary winding passes the second core leg, a second portion of the magnetic flux generated by the primary winding passes the third core leg, a third portion of the magnetic flux generated by the primary winding passes the fourth core leg, and the relative amounts of the first, second, and third portions are controlled by the first, second, and third control signals.

The power converter can include three converter modules, each converter module can include a first core leg, a second core leg, and a third core leg, the second core leg can include a first magnetic flux valve, and the third core leg can include a second magnetic flux valve.

For each converter module, a primary winding can be wound around the first core leg, a first secondary winding can be wound around the second core leg, and a second secondary winding can be wound around the third core leg.

In each converter module, the secondary windings can be electrically coupled in series.

In each converter module, a negative terminal of the first secondary winding can be electrically coupled to a negative terminal of the second secondary winding.

The power converter can include nine converter modules, each converter module can include a first core leg, a second core leg, and a third core leg, the second core leg can include a first magnetic flux valve, and the third core leg can include a second magnetic flux valve.

For each converter module, a primary winding can be wound around the first core leg, a first secondary winding can be wound around the second core leg, and a second secondary winding can be wound around the third core leg.

The nine converter modules can be grouped into three sets of converter modules, each set of converter modules can include three converter modules, and the secondary windings of the three converter modules in each set can be electrically coupled in series.

A positive terminal of the second secondary winding of the first converter module can be electrically coupled to a positive terminal of the first secondary winding of the second converter module.

The power converter can include three converter modules, each converter module can include a first core leg, a second core leg, a third core leg, and a fourth core leg, the second core leg can include a first magnetic flux valve, the third core leg can include a second magnetic flux valve, and the fourth core leg can include a third magnetic flux valve.

For each converter module, a primary winding can be wound around the first core leg, a first secondary winding can be wound around the second core leg, a second secondary winding can be wound around the third core leg, and a third secondary winding can be wound around the fourth core leg.

The first secondary windings of the three converter modules can be electrically coupled in series, the second secondary windings of the three converter modules can be electrically coupled in series, and the third secondary windings of the three converter modules can be electrically coupled in series.

The two or more core sections can include three or more core legs, each core leg can include a magnetic flux valve, and a primary winding and a secondary winding can be wound around each core leg.

The two or more core sections can include nine core legs, each core leg can include a magnetic flux valve, the primary windings of the first, second, and third core legs can be connected in series, the primary windings of the fourth, fifth, and sixth core legs can be connected in series, and the primary windings of the seventh, eighth, and ninth core legs can be connected in series.

The secondary windings of the first, fourth, and seventh core legs can be connected in series, the secondary windings of the second, fifth, and eighth core legs can be connected in series, and the secondary windings of the third, sixth, and ninth core legs can be connected in series.

The apparatus can include a driver circuit configured to generate the control signal.

One of the core sections can include a magnetic flux valve and a magnetically permeable material, the magnetically permeable material can be coupled to the magnetic flux valve, the magnetic flux can travel in the magnetic flux valve and the magnetically permeable material in a same direction.

One of the core sections can include a magnetic flux valve and a magnetically permeable material, the magnetically permeable material can be spaced apart from the magnetic flux valve, the magnetic flux can travel in the magnetic flux valve along a first direction, and the magnetic flux can travel in the magnetically permeable material in a second direction opposite to the first direction.

The magnetically permeable material can include a ferrite ring core that surrounds the magnetic flux valve.

In general, in another aspect, a method for converting power is provided. The method includes applying a control signal to a magnetic flux valve that includes one or more layers of piezoelectric material and one or more layers of magnetostrictive material to provide one or more electric fields across the one or more layers of piezoelectric material to produce strain that is transferred to the one or more layers of magnetostrictive material, and modifying a permeability of the one or more layers of magnetostrictive material based on the strain; providing an input signal to a primary winding; controlling a magnetic coupling between the primary winding and a secondary winding based on the permeability of the one or more layers of magnetostrictive material; and controlling an output signal provided at least in part by the secondary winding based at least in part on the magnetic coupling between the primary and secondary windings.

Implementations of the method may include one or more of the following features. The method can include controlling an amplitude of the output signal based on the control signal.

The method can include controlling a frequency of the output signal based on the control signal.

The method can include controlling a waveform of the output signal based on the control signal.

In general, in another aspect, a method for converting power is provided. The method includes applying a control signal to a magnetic flux valve comprising one or more layers of piezoelectric material and one or more layers of magnetostrictive material to provide one or more electric fields across the one or more layers of piezoelectric material to produce strain that is transferred to the one or more layers of magnetostrictive material, and modifying a permeability of the one or more layers of magnetostrictive material based on the strain; controlling a distribution of magnetic flux among two or more core sections based at least in part on the permeability of the one or more layers of magnetostrictive material; and controlling an output signal based at least in part on the distribution of the magnetic flux among the two or more core sections.

Implementations of the method may include one or more of the following features. The method can include controlling an amplitude of the output signal based on the control signal.

The method can include controlling a frequency of the output signal based on the control signal.

The method can include controlling a waveform of the output signal based on the control signal.

A primary winding can be wound around a first core section, a first secondary winding can be wound around a second core section, a second secondary winding can be wound around a third core section, and the output signal can be provided by the first and second secondary windings. Controlling the distribution of magnetic flux can include controlling a distribution of magnetic flux between the second core section and the third core section, thereby controlling a first signal generated at the first secondary winding and a second signal generated at the second secondary winding, thereby controlling the output signal.

In general, in another aspect, an apparatus that includes a power converter is provided. The power converter includes a first converter module that includes a first core section; a primary winding wound around a portion of the first core section, the primary winding having a first terminal and a second terminal that are configured to receive a first input signal; a second core section comprising a first magnetic flux valve that has a reluctance that changes in response to a first control signal; and a first secondary winding wound around a portion of the second core section, the first secondary winding having a first terminal and a second terminal.

Implementations of the apparatus may include one or more of the following features. The apparatus can include a third core section; and a second secondary winding wound around a portion of the third core section, the second secondary winding having a first terminal and a second terminal.

The second terminal of the first secondary winding can be electrically coupled to the first terminal of the second secondary winding, and the first terminal of the first secondary winding and the second terminal of the second secondary winding can be configured to provide an output signal.

The third core section can include a second magnetic flux valve having a reluctance that changes in response to a second control signal.

The apparatus can include a driver circuit to generate the first and second control signals.

The first and second control signals can be configured to provide a constant difference between the reluctance of the first magnetic flux valve and the reluctance of the second magnetic flux valve.

The first and second control signals can be configured to cause a difference between the first and second reluctances to vary over time.

The first and second control signals can be configured to cause the difference between the first and second reluctances to vary over time according to a sinusoidal waveform.

The apparatus can include a fourth core section that includes a third magnetic flux valve having a reluctance that changes in response to a third control signal; and a third secondary winding wound around a portion of the fourth core section, the third secondary winding having a first terminal and a second terminal.

The apparatus can include a driver circuit to generate the first, second, and third control signals.

The apparatus can include a driver circuit to generate the first control signal.

The first magnetic flux valve can include one or more layers of magnetostrictive material and one or more layers of piezoelectric material.

The one or more layers of piezoelectric material can hold electric charges provided by the control signal and maintain at least a portion of the electric charges after the control signal is removed.

In general, in another aspect, an apparatus that includes a power converter is provided. The power converter includes a plurality of converter modules, each converter module including a first core leg; a primary winding wound around a section of the first core leg, the primary winding having a first terminal and a second terminal that are configured to receive an input signal; a second core leg comprising a first magnetic flux valve having a reluctance that changes in response to a control signal; and a first secondary winding wound around a section of the second core leg, the secondary winding having a first terminal and a second terminal.

Implementations of the apparatus may include one or more of the following features. At least some of the secondary windings of the plurality of converter modules can be connected in series, and two terminals of the series-connected secondary windings can be configured to provide an output signal.

Each converter module can include a third core leg; and a second secondary winding wound around a section of the third core leg, the second secondary winding having a first terminal and a second terminal. The first secondary winding and the second secondary winding of at least some of the converter module can be connected in series.

The third core leg can include a second magnetic flux valve having a reluctance that changes in response to a second control signal.

Each converter module can include a fourth core leg and a third secondary winding wound around a section of the fourth core leg, the third secondary winding having a first terminal and a second terminal.

The fourth core leg can include a third magnetic flux valve having a reluctance that changes in response to a third control signal.

The apparatus can include a driver circuit to generate the first and second control signals.

The driver circuit can be configured to generate the first and second control signals to provide a constant difference between a first reluctance of the first magnetic flux valve and a second reluctance of the second magnetic flux valve.

The driver circuit can be configured to generate the first and second control signals to cause the first magnetic flux valve to have a first reluctance, the second magnetic flux valve to have a second reluctance, and a difference between the first and second reluctances to vary over time.

Within one converter module, a negative terminal of a first secondary winding can be electrically coupled to a negative terminal of a second secondary winding.

The first magnetic flux valve can include one or more layers of magnetostrictive material and one or more layers of piezoelectric material.

The one or more layers of piezoelectric material can hold electric charges provided by the control signal and maintain at least a portion of the electric charges after the control signal is removed.

In general, in another aspect, an apparatus that includes a power converter is provided. The power converter includes a plurality of converter modules, each converter module includes a first core leg; a primary winding wound around a section of the first core leg, the primary winding having a first terminal and a second terminal; a second core leg; a first secondary winding wound around a section of the second core leg, the secondary winding having a first terminal and a second terminal; a first magnetic flux valve having a reluctance that changes in response to a first control signal, in which the first core leg, the second core leg, and the first magnetic flux valve together provide a first magnetic flux path having an overall reluctance that changes in response to the first control signal; a third core leg; a second secondary winding wound around a section of the third core leg, the second secondary winding having a first terminal and a second terminal; and a second magnetic flux valve having a reluctance that changes in response to a second control signal, in which the first core leg, the third core leg, and the second magnetic flux valve together provide a second magnetic flux path having an overall reluctance that changes in response to the second control signal.

Implementations of the apparatus may include one or more of the following features. At least some of the secondary windings of the plurality of converter modules can be connected in series, and two terminals of the series-connected secondary windings can be configured to provide an output signal.

The plurality of converter modules can include three converter modules, the primary windings of the three converter modules can be configured to receive a three-phase input signal, and the series-connected secondary windings can be configured to provide a single phase output signal.

The plurality of converter modules can include three single-phase converter modules, each single-phase converter module can include three converter modules, and the three single-phase converter modules can be configured to provide a three-phase output signal.

The apparatus can include a driver circuit configured to generate the first and second control signals.

The driver circuit can be configured to generate the first and second control signals to provide a constant difference between a first reluctance of the first magnetic flux valve and a second reluctance of the second magnetic flux valve.

The driver circuit can be configured to generate the first and second control signals to cause the first magnetic flux valve to have a first reluctance, the second magnetic flux valve to have a second reluctance, and a difference between the first and second reluctances to vary over time.

Each of the magnetic flux valves can include one or more layers of magnetostrictive material and one or more layers of piezoelectric material.

The one or more layers of piezoelectric material can hold electric charges provided by the control signal and maintain at least a portion of the electric charges after the control signal is removed.

Each of the magnetic flux valves can include electrodes to receive one of the control signals and to provide an electric field across the one or more piezoelectric layers in response to the control signal.

Each converter module can includes a fourth core leg; a third secondary winding wound around a section of the fourth core leg, the third secondary winding having a first terminal and a second terminal; and a third magnetic flux valve having a reluctance that changes in response to a third control signal, in which the first core leg, the fourth core leg, and the third magnetic flux valve together provide a third magnetic flux path, and the third magnetic flux path has an overall reluctance that changes in response to the third control signal.

The plurality of converter modules can include three converter modules, the second terminal of the first secondary winding of the first converter module can be electrically coupled to the first terminal of the first secondary winding of the second converter module, the second terminal of the first secondary winding of the second converter module can be electrically coupled to the first terminal of the first secondary winding of the third converter module, and the first terminal of the first secondary winding of the first converter module and the second terminal of the first secondary winding of the third converter module can be configured to provide a first output signal.

The second terminal of the second secondary winding of the first converter module can be electrically coupled to the first terminal of the second secondary winding of the second converter module, the second terminal of the second secondary winding of the second converter module can be electrically coupled to the first terminal of the second secondary winding of the third converter module, and the first terminal of the second secondary winding of the first converter module and the second terminal of the second secondary winding of the third converter module can be configured to provide a second output signal.

The second terminal of the third secondary winding of the first converter module can be electrically coupled to the first terminal of the third secondary winding of the second converter module, the second terminal of the third secondary winding of the second converter module can be electrically coupled to the first terminal of the third secondary winding of the third converter module, and the first terminal of the third secondary winding of the first converter module and the second terminal of the third secondary winding of the third converter module can be configured to provide a third output signal.

The three primary windings can be configured to receive a three-phase input signal, and the first, second, and third output signals can be configured to be a three-phase output signal.

In general, in another aspect, a method for converting power is provided. The method includes providing an input signal to a primary winding that is wound around a section of a first core leg of a power converter; passing a first magnetic flux generated by the primary winding through a first magnetic flux path formed by the first core leg, a second core leg, and a first magnetic flux valve; generating a first signal across a first secondary winding that is wound around a section of the second core leg; and applying a first control signal to the first magnetic flux valve to control a reluctance of the first magnetic flux valve, in which the first signal is influenced by the reluctance of the first magnetic flux valve.

Implementations of the method may include one or more of the following features. The method can include passing a second magnetic flux generated by the primary winding through a second magnetic flux path formed by the first core leg and a third core leg; and generating a second signal across a second secondary winding that is wound around a section of the third core leg.

The first secondary winding and the second secondary winding can be connected in series, and the method can include providing an output signal at a first terminal of the first secondary winding and a second terminal of the second secondary winding.

The second magnetic flux path can be formed by the first core leg, the third core leg, and a second magnetic flux valve, and the method can include applying a second control signal to the second magnetic flux valve to control a reluctance of the second magnetic flux valve, in which the second signal is influenced by the reluctance of the second magnetic flux valve.

In general, in another aspect, a method for converting power is provided. The method includes providing a power converter that includes: a first core leg; a primary winding wound around a section of the first core leg, the primary winding having a first terminal and a second terminal; a second core leg; a first secondary winding wound around a section of the second core leg, the first secondary winding having a first terminal and a second terminal; a first magnetic flux valve, in which the first core leg, the second core leg, and the first magnetic flux valve form a first magnetic flux path; a third core leg; a second secondary winding wound around a section of the third core leg, the second secondary winding having a first terminal and a second terminal; and a second magnetic flux valve, in which the first core leg, the third core leg, and the second magnetic flux valve form a second magnetic flux path. The method includes providing an input signal to the primary winding; generating an output signal from terminals of the secondary windings; providing a first control signal to control a reluctance of the first magnetic flux valve; providing a second control signal to control a reluctance of the second magnetic flux valve; and controlling the output signal by controlling the reluctances of the first and second magnetic flux valves.

Implementations of the method may include one or more of the following features. The first magnetic flux valve can include one or more layers of piezoelectric material and one or more layers of magnetostrictive material, and providing the first control signal includes providing a first voltage signal to the one or more layers of piezoelectric material.

The method can include holding electric charges provided by the control signal at the one or more layers of piezoelectric material, and maintaining at least a portion of the electric charges at the one or more layers of piezoelectric material after the control signal is removed.

Providing the first and second control signals can include providing a first voltage signal to the first magnetic flux valve and a second voltage signal to the second magnetic flux valve.

A difference between the first and second voltage signals can be a constant.

A difference between the first and second voltage signals can vary over time.

Providing the input signal can include providing a sinusoidal input voltage signal.

Generating the output signal can include generating a sinusoidal output voltage signal.

The method can include controlling the first and second magnetic flux valves such that a difference between the reluctance of the first magnetic flux valve and the reluctance of the second magnetic flux value is a constant, in which generating the output signal can include generating an output signal that has a frequency that is the same as the frequency of the input signal.

The method can include controlling the first and second magnetic flux valves such that a difference between the reluctance of the first magnetic flux valve and the reluctance of the second magnetic flux value varies over time, in which generating the output signal can include generating an output signal having a modulated waveform that is a function of the input signal and the difference between the reluctance of the first magnetic flux valve and the reluctance of the second magnetic flux valve.

In general, in another aspect, a method for converting power is provided. The method includes providing a power converter that includes: a first core leg and a primary winding wound around a section of the first core leg; a second core leg and a first secondary winding wound around a section of the second core leg; a third core leg and a second secondary winding wound around a section of the third core leg; and a first magnetic flux valve having a controllable reluctance. The method includes providing an input signal to the primary winding; providing a first control signal to the first magnetic flux valve to control the reluctance of the first magnetic flux valve, in which the magnetic fluxes passing the second and third core legs are influenced by the reluctance of the first magnetic flux valve; and generating an output signal at the secondary windings, in which the output signal is influenced by the magnetic fluxes passing the second and third core legs.

Implementations of the method may include one or more of the following features. The power converter can include a second magnetic flux valve, and the method can include providing a second control signal to the second magnetic flux valve to control the reluctance of the second magnetic flux valve, in which the magnetic fluxes passing the second and third core legs can be influenced by the reluctances of the first and second magnetic flux valves.

The first magnetic flux valve can include one or more layers of piezoelectric material, one or more layers of magnetostrictive material, and electrodes. Applying the first control signal can include applying a voltage signal across the electrodes to generate an electric field across the one or more layers of piezoelectric material.

The method can include holding electric charges provided by the control signal at the one or more layers of piezoelectric material, and maintaining at least a portion of the electric charges at the one or more layers of piezoelectric material after the control signal is removed.

In general, in another aspect, a method for converting power is provided. The method includes providing an input signal to a primary winding of a power converter that includes a first core leg and a second core leg, the second core leg comprising a first magnetic flux valve, the primary winding being wound around the first core leg; providing a first control signal to the first magnetic flux valve to control a reluctance of the first magnetic flux valve and affecting a reluctance of the second core leg; and inducing a first secondary signal across a first secondary winding that is wound around the second core leg, in which the first secondary signal is affected by the reluctance of the second core leg.

Implementations of the method may include one or more of the following features. The power converter can include a third core leg that includes a second magnetic flux value, and a second secondary winding wound around the third core leg.

The method can include providing a second control signal to the second magnetic flux valve to control a reluctance of the second magnetic flux valve and affecting a reluctance of the third core leg; and inducing a second secondary signal across the second secondary winding, in which the second secondary signal is affected by the reluctance of the third core leg.

The first and second secondary windings can be electrically coupled in series, and the method can include providing an output signal across the first and second secondary windings.

The method can include configuring the first and second control signals such that a difference between the reluctance of the first magnetic flux valve and the reluctance of the second magnetic flux valve is a constant.

The input signal can have a sinusoidal waveform, and the output signal can also have a sinusoidal waveform.

The method can include configuring the first and second control signals such that a difference between the reluctance of the first magnetic flux valve and the reluctance of the second magnetic flux valve varies over time.

The difference between the reluctance of the first magnetic flux valve and the reluctance of the second magnetic flux valve can have a sinusoidal waveform.

The method can include modifying the first and second control signals to modify an amplitude of the output signal.

The method can include modifying the first and second control signals to modify a frequency of the output signal.

The method can include modifying the first and second control signals to modify a waveform of the output signal.

The first voltage signal can have a sinusoidal waveform, and the method can include configuring the first and second control signals to cause the output voltage signal to have at least one of a square waveform or a triangular waveform.

The power converter can include a fourth core leg that includes a third magnetic flux valve, and a third secondary winding wound around the fourth core leg.

The method can include providing a third control signal to the third magnetic flux valve to control a reluctance of the third magnetic flux valve and affecting a reluctance of the fourth core leg, and inducing a third secondary signal across the third secondary winding, in which the third secondary signal can be affected by the reluctance of the fourth core leg.

In general, in another aspect, a method for converting power is provided. The method includes providing an input voltage signal to a primary winding of a power converter that includes a first core leg and a first magnetic flux valve, the primary winding being wound around the first core leg; providing a first control signal to the first magnetic flux valve to control a reluctance of the first magnetic flux valve and affecting magnetic flux that passes the first core leg; and inducing a second voltage signal across a first secondary winding that is wound around the first core leg, in which the second voltage signal is affected by the magnetic flux that passes the first core leg.

Implementations of the method may include one or more of the following features. The power converter can include additional core legs, each of the additional core legs can have a corresponding primary winding and a second secondary winding that are wound around the core leg, and each of the additional core legs can be coupled to a corresponding magnetic flux valve.

The method can include providing control signals to the magnetic flux valves coupled to the additional core legs to control reluctances of the magnetic flux valves and affecting magnetic fluxes that pass the additional core legs.

The method can include providing input voltage signals to the primary windings and generating output voltage signals at the secondary windings.

The input voltage signals can include a three-phase input voltage signal, and the output voltage signals can include a three-phase output voltage signal.

The power converter can include nine core legs, the primary windings of the first, second, and third core legs can be connected in series, the primary windings of the fourth, fifth, and sixth core legs can be connected in series, and the primary windings of the seventh, eighth, and ninth core legs can be connected in series.

The secondary windings of the first, fourth, and seventh core legs can be connected in series, the secondary windings of the second, fifth, and eighth core legs can be connected in series, and the secondary windings of the third, sixth, and ninth core legs can be connected in series.

The method can include providing a first phase input voltage signal across the primary windings of the first, second, and third core legs, providing a second phase input voltage signal across the primary windings of the fourth, fifth, and sixth core legs, and providing a third phase input voltage signal across the primary windings of the seventh, eight, and ninth core legs.

The method can include providing a first phase output voltage signal across the secondary windings of the first, fourth, and seventh core legs, providing a second phase output voltage signal across the secondary windings of the second, fifth, and eighth core legs, and providing a third phase output voltage signal across the secondary windings of the third, sixth, and ninth core legs.

In general, in another aspect, a method for converting power is provided. The method includes providing a multi-phase input voltage signal to primary windings of a plurality of power converter modules, each power converter module comprising a first magnetic flux valve; providing control signals to the magnetic flux valves to control reluctances of the magnetic flux valves; and inducing one or more voltage signals across secondary windings of the power converter modules, in which the voltage signals induced across the secondary windings are affected by the reluctances of the magnetic flux valves.

Implementations of the method may include one or more of the following features. The multi-phase input voltage signal can include a three-phase input voltage signal.

The secondary windings of three of the power converter modules can be connected in series, and the method can include providing a single-phase output voltage signal from the secondary windings of the three power converter modules.

The plurality of power converter modules can include nine power converter modules grouped into three single-phase power converter units, each single-phase power converter unit can include three power converter modules having secondary windings connected in series. The method can include providing a three-phase output voltage signal from the three single-phase power converter units.

Each converter module can include a first core leg and a second core leg, in which the first magnetic flux valve of the converter module can affect a magnetic flux that passes the first magnetic flux circuit.

Each converter module can include a third core leg, a secondary winding wound around the third core leg, and a second magnetic flux valve.

The method can include providing control signals to the second magnetic flux valves of each power converter module to control the reluctances of the second magnetic flux valves.

Each converter module can include a fourth core leg, a secondary winding wound around the fourth core leg, and a third magnetic flux valve.

The method can include providing control signals to the second and third magnetic flux valves of each power converter module to control the reluctances of the second and third magnetic flux valves.

The method can include providing a multi-phase output voltage signal from the secondary windings of the power converter modules.

The plurality of power converter modules can include three power converter modules, and the multi-phase output voltage signal includes a three-phase output voltage signal.

At least some of the secondary windings of the second core legs of the power converter modules can be connected in series, at least some of the secondary windings of the third core legs of the power converter modules can be connected in series, and at least some of the secondary windings of the fourth core legs of the power converter modules can be connected in series.

Each magnetic flux valve can include one or more layers of piezoelectric material, one or more layers of magnetostrictive material, and electrodes to receive one of the control signals and provide an electric field across the piezoelectric material.

The method can include holding electric charges provided by the control signal at the one or more layers of piezoelectric material, and maintaining at least a portion of the electric charges at the one or more layers of piezoelectric material after the control signal is removed.

The details of one or more of the above aspects and implementations are set forth in the accompanying drawings and the description below. Other features, aspects, and advantages will become apparent from the description, the drawings, and the claims.

BRIEF DESCRIPTION OF DRAWINGS

FIGS. 4A to 4C show magnetic flux variations in a three-leg EM power converter module.

FIGS. 8(a) to 8(d) are graphs of magnetic flux waveforms in the single-phase EM power converter formed by using three three-leg modules.

FIGS. 11(a) to 11(c) are graphs showing waveforms of the magnetic fluxes in the four core legs of the three EM power converter modules.

FIG. 11(d) is a graph showing the synthesized magnetic fluxes through the three secondary output windings of the three-phase EM power converter.

FIGS. 16A and 16B are diagrams showing a side view and a three-dimensional view, respectively, of a first exemplary structure of a magnetic flux valve.

Like reference symbols in the various drawings indicate like elements.

DETAILED DESCRIPTION

Figure 1:
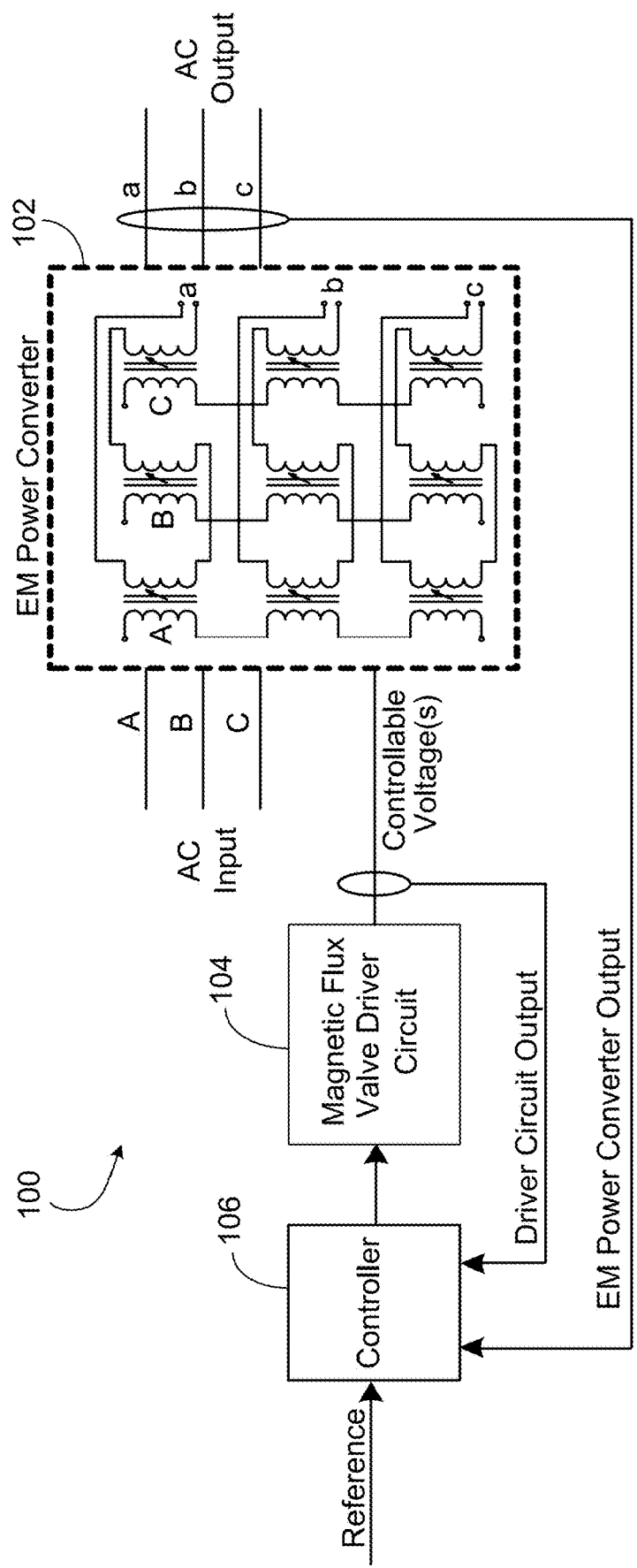
FIG. 1 is a schematic diagram of an electromagnetic (EM) power converter system.

This disclosure provides a novel approach for an electromagnetic (EM) power converter for converting alternating current (AC) electric energy by actively controlling the magnetic flux in the device. The electromagnetic power converter can convert an AC input to an AC output with a different amplitude, frequency, and/or waveform, where the AC input and output can be single phase or have multiple phases. For example, from a sinusoidal input signal, the power converter can generate an output signal having an arbitrary waveform, e.g., sinusoid, square, or triangle waveform. The input signal waveform is not limited to sinusoidal and can also be an arbitrary waveform. In some implementations, the electromagnetic power converter includes one or more magnetic cores, coil windings wrapped on the magnetic cores, one or more controllable magnetic flux valves, and a driver circuit and a controller for the one or more magnetic flux valves. The power converter achieves conversion of amplitude, frequency, and/or waveform by electrically controlling magnetic fluxes without using mechanical moving parts.

In some implementations, the magnetic flux valve is a voltage-controlled static magnetic device made of magnetoelectric materials. The permeability of the magnetic flux valve is regulated by the control voltage applied to the valve, which is supplied by the driver circuit and controlled by the controller. The driver circuit can be implemented by using a power electronic converter or other devices that can output controllable voltages. A change of the permeability of the magnetic flux valve leads to changes of the reluctance of the magnetic flux valve and the reluctance of the magnetic core legs of the EM power converter containing the magnetic flux valve. The magnetic flux valve actively controls the magnetic flux distribution in the EM power converter. As the magnetic flux distribution changes, the flux linkage of each winding changes and thus the voltage induced across each winding can be controlled. The EM power converter can convert one or more AC inputs to one or more AC outputs with controllable amplitude, frequency, phase and waveform.

The power and energy needed to drive the magnetic flux valve are much lower than the power rating and energy flow, respectively, of the EM power converter. The output voltages of the magnetic flux valve driver circuit and the EM power converter are measured and used by a controller to control the driver circuit to supply desired voltages for the magnetic flux valves according to reference values provided to the controller. The reference values can be, e.g., the desired amplitude, frequency, etc., of the output voltages of the EM power converter. For example, the reference values can be provided by an operator, or by another system that sets the desired amplitude and frequency of the AC output voltage.

In some implementations, the EM power converter can have the following features. The voltage conversion ratio (i.e., ratio of output voltage to input voltage) of the EM power converter can be continuously adjustable. The EM power converter can perform frequency conversion. The EM power converter can have a power capacity ranging from low to high, a voltage rating ranging from low to high, and a current rating ranging from low to high. The EM power converter can have a static operation with no mechanical moving parts, have a low complexity of thermal management, and does not need a harmonic filter (which may be used in conventional power electronic converters to suppress harmonics). The EM power converter can have a fast dynamic response, low maintenance requirement, high reliability, and long life expectancy, e.g., more than 25 years.

Referring to FIG. 1, in some implementations, an EM power converter system 100 includes an EM power converter 102, a magnetic flux valve driver circuit 104, and a controller 106. The EM power converter 102 may include multiple modules, in which each module can include a magnetic core with multiple legs, one or more magnetic flux valves in some legs of the magnetic core, and coil windings wrapped on the core legs. FIG. 1 shows an example in which the EM power converter 102 includes nine modules, but the EM power converter 102 can also include other numbers of modules. The numbers of core legs, magnetic flux valves, and coil windings in each module depend on the design. In this document, the term "core section" is used to refer to a section of the magnetic core, and can include a core leg and one or more magnetic flux valves.

Figure 2A:
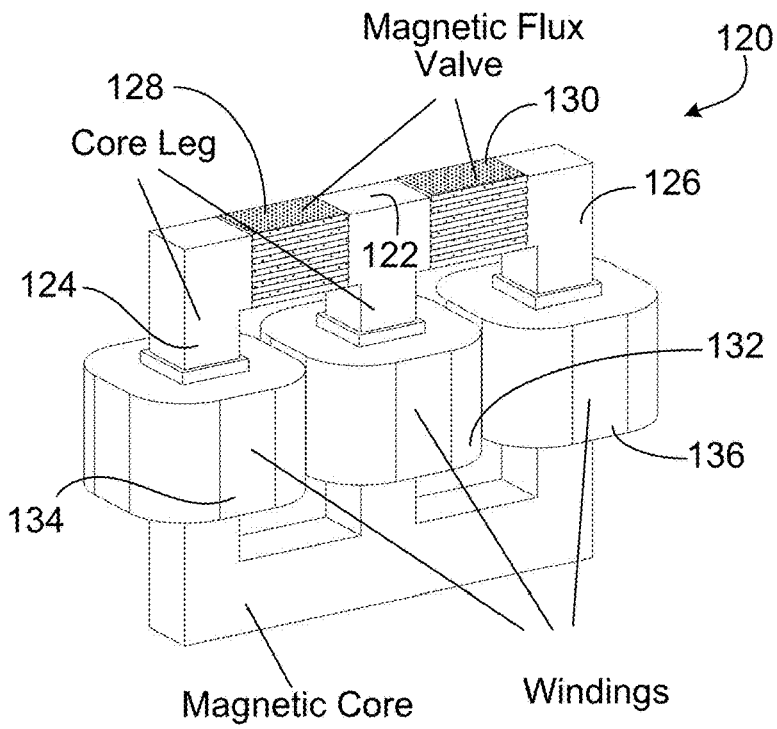
FIG. 2A is an exemplary configuration of an EM power converter module having three core legs.
Figure 2B:
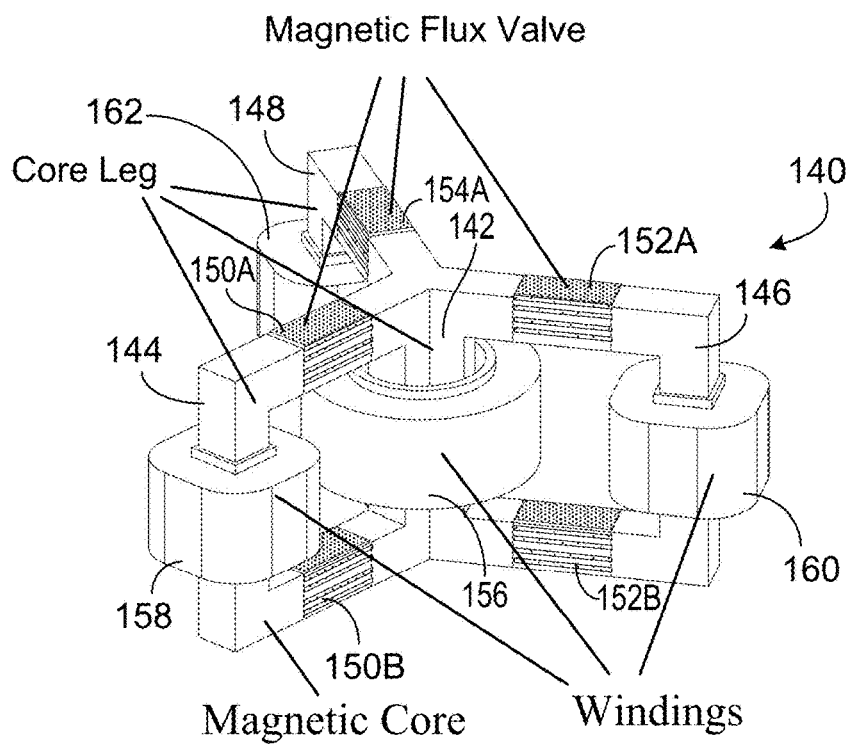
FIG. 2B is an exemplary configuration of an EM power converter module having four core legs.

FIGS. 2A and 2B illustrate two exemplary configurations of an EM power converter module. Referring to FIG. 2A, in some implementations, an EM power converter module 120 has three core legs—a center core leg 122, a first side core leg 124, and a second side core leg 126. The first side core leg 124 has a first magnetic flux valve 128, and the second side core leg 126 has a second magnetic flux valve 130. A primary winding 132 is wound around the center core leg 122, a first secondary winding 134 is wound around the first side core leg 124, and a second secondary winding 136 is wound around the second side core leg 126.

Referring to FIG. 2B, in some implementations, an EM power converter module 140 has four core legs—a center core leg 142, a first side core leg 144, a second side core leg 146, and a third side core leg 148. Each of the side core legs has two magnetic flux valves. The first side core leg 144 has a first magnetic flux valve 150A and a second magnetic flux valve 150B. The second side core leg 146 has a first magnetic flux valve 152A and a second magnetic flux valve 152B. The third side core leg 148 has a first magnetic flux valve 154A and a second magnetic flux valve 154B. A primary winding 156 is wound around the center core leg 142, a first secondary winding 158 is wound around the first side core leg 144, a second secondary winding 160 is wound around the second side core leg 146, and a third secondary winding 162 is wound around the third side core leg 148.

The magnetic flux valve (e.g., 128, 130, 150A, 150B, 152A, 152B, 154A, and 154B) is made of magnetoelectric materials, whose permeabilities can be regulated by controlling the external control voltage applied to the valve. The detailed structure and working principles of the three-leg EM power converter module 120 in FIG. 2A are illustrated in FIGS. 3 to 7. The detailed structure and working principles of the four-leg EM power converter module 140 in FIG. 2B are illustrated in FIGS. 8 to 11.

A Three-Leg EM Power Converter Module

Figure 3A:
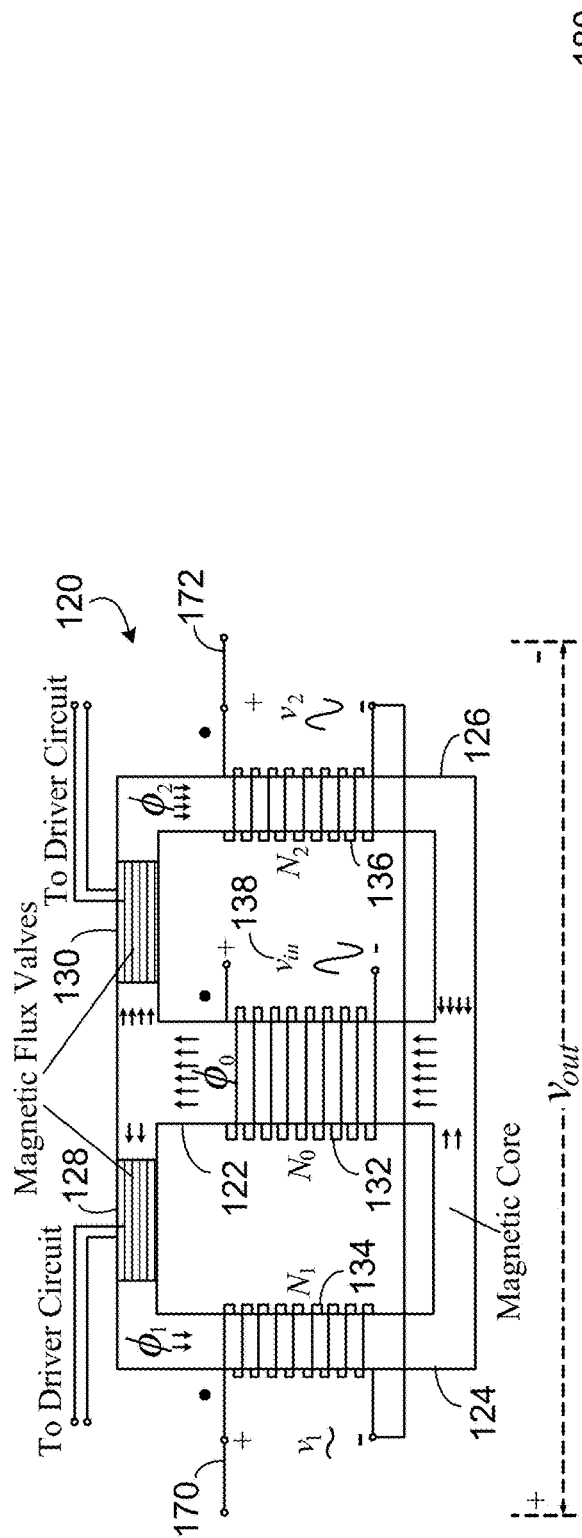
FIG. 3A is a diagram of the magnetic circuit of the three-leg EM power converter module of FIG. 2A.

FIG. 3A shows the magnetic circuit of the three-leg EM power converter module 120 in FIG. 2A. The primary winding 132 of the module is located on the central core leg 122 and connected to an AC voltage source $v_{in}$ 138 ($v_{in}=U_{in} \sin \omega_1 t$) as the input. The turn number of the primary winding 132 is No. The two secondary windings 134, 136 of the module are located on the two side core legs 124, 126 and connected in series as the output. The turn numbers of the two secondary windings 134, 136 are $N_1$ and $N_2$, respectively. In some examples, $N_1=N_2$.

As shown in FIG. 3A, the power converter module 120 has two output terminals 170, 172 that are the two dotted terminals of the two secondary windings with the same polarity. Therefore, the output $v_{out}=v_1-v_2$, where $v_1$ and $v_2$ are the voltages induced by the first secondary winding 134 and second secondary winding 136, respectively. The two magnetic flux valves 128, 130 in the two side core legs 124, 126 are connected with the driver circuit 104, which supplies controllable voltages to the magnetic flux valves 128, 130 to regulate their permeabilities.

Figure 3B:
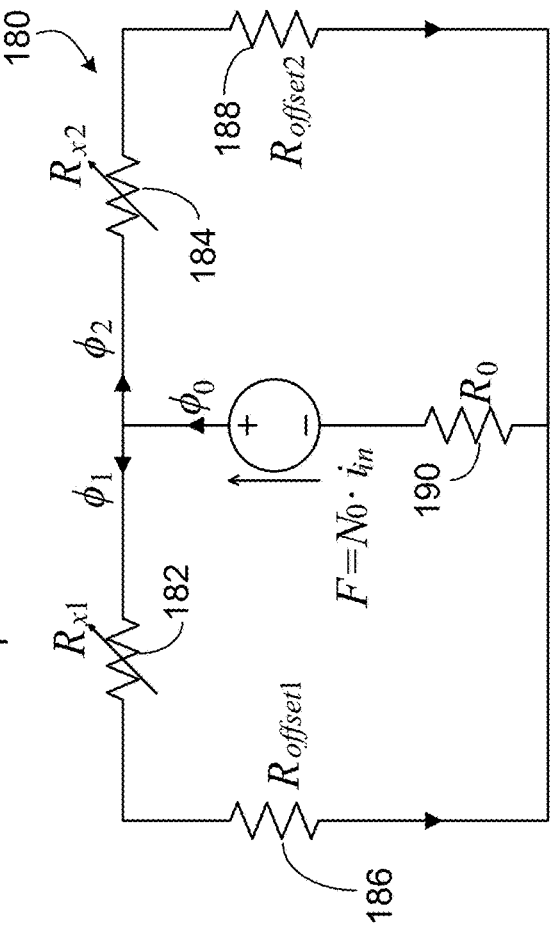
FIG. 3B is a diagram of an equivalent circuit of the three-leg EM power converter module of FIG. 2A.

FIG. 3B shows an equivalent circuit 180 of the three-leg EM power converter module 120. The two variable reluctances $R_{x1}$ 182 and $R_{x2}$ 184 represent the equivalent reluctances of the first and second magnetic flux valves 128, 130. The equivalent offset reluctances of the two side core legs are $R_{offset1}$ 186 and $R_{offset2}$ 188, which are mainly determined by the magnetic properties of the laminated magnetic core made by ferromagnetic or other magnetic materials. Therefore, the total reluctances $R_1$ of the left core leg and $R_2$ of the right core leg are $$R_1 = R_{offset1} + R_{x1} \tag{Equ. 1}$$

$$R_2 = R_{offset2} + R_{x2} \tag{Equ. 2}$$

In FIG. 3B, $R_0$ 190 is the equivalent reluctance of the central core leg 122 wrapped by the primary winding 132, $i_n$ is the current through the primary winding 132, and $\phi_0$ is the magnetic flux generated by the current $i_{in}$ (called the main flux). The main flux $\phi_0$ splits into two parts, which flow through the two side core legs 124 and 126, respectively. The magnetic fluxes $\phi_1$ and $\phi_2$ ($\phi_1+\phi_2=\phi_0$) through the two side core legs 124, 126 will change when the permeabilities of the two magnetic flux valves 128, 130 are changed.

FIGS. 4A to 4C illustrate the flux variation process of the three-leg EM power converter module 120 in FIG. 3A. Assume $R_{offset1}=R_{offset2}$ and the two magnetic flux valves 128, 130 are the same. When the voltages applied to the two magnetic flux valves 128, 130 by the driver circuit 104 are equal, the reluctances of the two side core legs 124, 126 are the same (i.e., $R_1=R_2$) and, therefore, the magnetic fluxes in the two side core legs 124, 126 are equal (i.e., $\phi_1=\phi_2$), as illustrated in FIG. 4A.

Referring to FIG. 4B, when the voltage applied to the left magnetic flux valve 128 by the driver circuit 104 is higher than that applied to the right magnetic flux valve 130, the left magnetic flux valve 128 has a lower permeability and, therefore, a larger reluctance (i.e., $R_1>R_2$). In this case, a larger portion of the magnetic flux generated by the current through the primary winding 132 will flow through the right core leg 126.

Referring to FIG. 4C, when the voltage applied to the left magnetic flux valve 128 by the driver circuit 104 is lower than that applied to the right magnetic flux valve 130, the left magnetic flux valve 128 has a higher permeability and, therefore, a smaller reluctance (i.e., $R_1<R_2$). In this case, a larger portion of the magnetic flux generated by the current through the primary winding 132 will flow through the left core leg 124.

If the dotted terminals with the same polarity of the two secondary windings 134, 136 are connected in series as shown in FIG. 3A, the output voltage $v_{out}$ of the EM power converter module 120 is the differential voltage induced by the two secondary windings 134, 136 and is determined by the difference of the magnetic fluxes in the two side core legs 124, 126 as well as the difference of the voltages applied to the two magnetic flux valves 128, 130.

Suppose that the input voltage $v_{in}$ applied to the primary winding 132 of the EM power converter module 120 in FIG. 3A is sinusoidal. If the difference of the voltages applied to the two magnetic flux valves 128, 130 is constant, the output voltage of the EM power converter module 120 will be a sinusoidal waveform, which has the same frequency as that of the input voltage applied on the primary winding 132. The amplitude of the sinusoidal output voltage is affected by the difference of the voltages applied to the two magnetic flux valves 128, 130, which is shown in FIG. 5A.

Figure 5A:
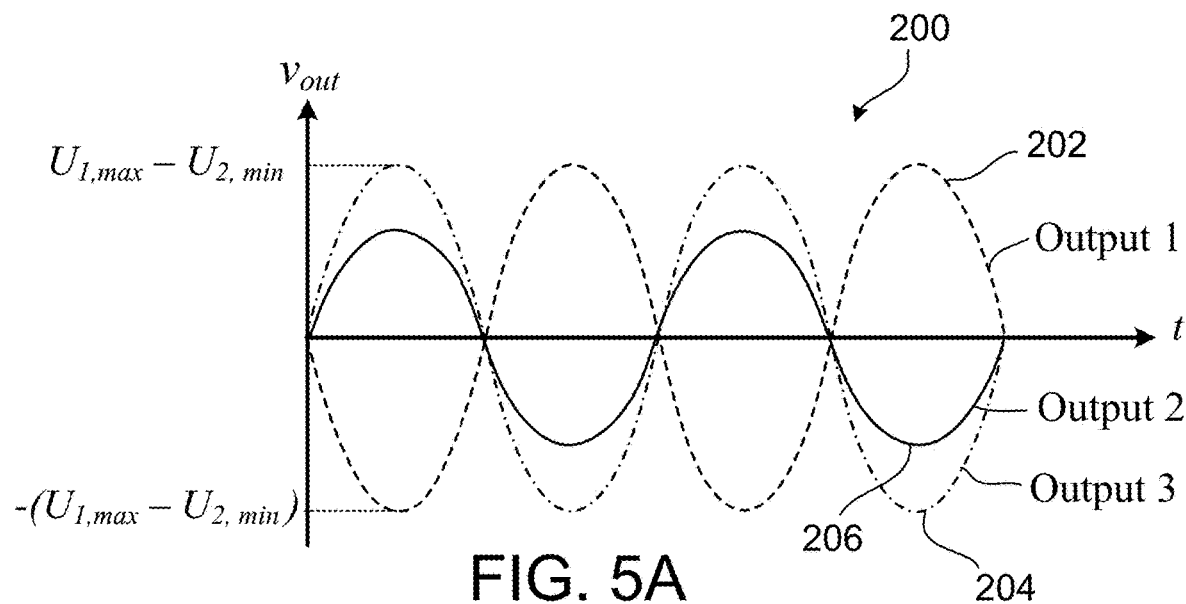
FIGS. 5A and 5B are graphs showing possible output voltages of a three-leg EM power converter module.
Figure 5B:
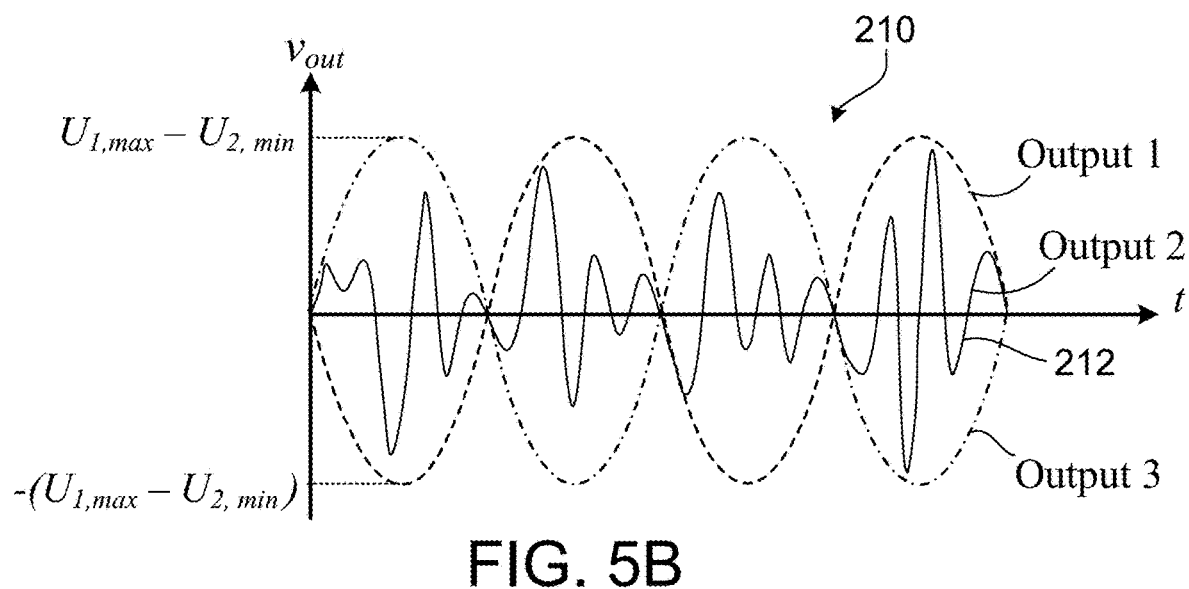

FIGS. 5A and 5B are graphs 200 and 210 that show possible output waveforms that can be provided by the power converter module 120. In FIG. 3A, when the magnetic flux valve 128 in the left core leg 124 is controlled such that the left core leg 124 constantly has the minimum reluctance while the magnetic flux valve 130 in the right core leg 126 is controlled such that the right core leg 126 constantly has the maximum reluctance, the minimum and maximum magnetic fluxes will flow through the left core leg and the right core leg, respectively. As a consequence, the voltage $v_1$ induced on the secondary winding of the left core leg will have the maximum amplitude $U_{1,\,max}$ while voltage $v_2$ induced on the secondary winding of the right core leg will have the minimum amplitude $U_{2,\,min}$. The output voltage $v_{out}$, which is equal to $v_1-v_2$ and labeled as Output 1 in FIG. 5A, is a sinusoidal wave 202 and has the maximum amplitude $(U_{1,\,max}-U_{2,\,min})$. On the contrary, when the magnetic flux valve 128 in the left core leg 124 is controlled such that the left core leg 124 constantly has the maximum reluctance while the magnetic flux valve 130 in the right core leg 126 is controlled such that the right core leg 126 constantly has the minimum reluctance, the output voltage $v_{out}$, which is labeled as Output 3 in FIG. 5A, is a sinusoidal wave 204 and also has the maximum amplitude $(U_{1,\,max}-U_{2,\,min})$ but is out of phase with Output 1.

The curves of Output 1 and Output 3 provide the two boundaries for the output voltage of the EM power converter module 120. In other words, the actual output of the EM power converter module 120, Output 2, which has a waveform 206, can be controlled between the two boundaries, as shown in FIG. 5A. In this way, the EM power converter module 120 works like a controllable power transformer whose output voltage amplitude can be regulated continuously, i.e., a power transformer with continuous tap changing capability. If the differential voltage supplied by the driver circuit 104 of the two magnetic flux valves 128, 130 also varies, the output $v_{out}$ will no longer be a pure sinusoidal waveform but a modulated waveform 212 of the input voltage and the differential voltage supplied by the driver circuit 104 of the two magnetic flux valves 128, 130, as shown in FIG. 5B. If the voltages applied to the magnetic flux valves 128, 130 are controlled dynamically, both the frequency and the amplitude of the output voltage can be regulated in real time via the modulation. However, the output $v_{out}$ should still lie between Output 1 and Output 3, as shown in FIG. 5B. By synthesizing or superposing such modulated output waveforms from multiple EM power converter modules, the total output can be a pure sinusoidal waveform with controllable amplitude, frequency and phase. The operating principle of the EM power converter module 120 is based on magnetic flux and voltage modulation and synthesization, which is described below for sinusoidal input and output.

Consider the three-leg EM power converter module 120 in FIG. 3A. Assume that the primary AC input is a sinusoidal voltage with the frequency $\omega_1$ and the amplitude $U_{in}$, the turn number of the primary winding 132 is $N_0$, the turn numbers of the two secondary windings 134, 136 are N (i.e., $N_1=N_2=N$), and the main flux generated by the current through the primary winding 132 is $\phi_0$. Then the main flux can be expressed as $$\phi_0 = -\frac{U_{in}}{N_0\omega_1}\sin\omega_1 t \qquad \text{(Equ. 3)}$$

The main flux $\phi_0$ splits into two parts, which flow through the two side core legs 124, 126, respectively. The distribution of the magnetic flux in the left and right core legs 124, 126 is dependent on the reluctances $R_1$ and $R_2$ of the two core legs 124, 126. Let $R_{x1}=\Delta R$ and $R_{x2}=-\Delta R$. Then $R_1$ in Equation 1 and $R_2$ in Equation 5 can be expressed as follows.

$$R_1=R_{offset1}+\Delta R \qquad (4)$$

$$R_2=R_{offset2}-\Delta R \qquad (5)$$

The reluctance $R_1$ ($R_2$) consists of two components: a fixed offset component $R_{offset1}$ ($R_{offset2}$) and a fluctuating component $\Delta R$. The value of the offset component is mainly determined by the reluctance of the laminated magnetic core leg, while the value of $\Delta R$ depends on the permeability of the magnetic flux valve, which can be controlled by adjusting the voltage applied to the magnetic flux valve. In some examples, $R_{offset1}$ and $R_{offset2}$ have the same value and, therefore, are denoted as $R_{offset}$ (i.e., $R_{offset1}=R_{offset2}=R_{offset}$) in the remaining text.

The flux $\phi_1$ in the left core leg 124 and the flux $\phi_2$ in right core leg 126 can be calculated as follows $$\phi_1 = \phi_0 \frac{R_2}{R_1 + R_2} = \phi_0 \frac{R_{offset} - \Delta R}{(R_{offset} + \Delta R) + (R_{offset} - \Delta R)} = \phi_0 \frac{R_{offset} - \Delta R}{2R_{offset}} \quad (6)$$

$$\phi_2 = \phi_0 \frac{R_2}{R_1 + R_2} = \phi_0 \frac{R_{offset} + \Delta R}{(R_{offset} + \Delta R) + (R_{offset} - \Delta R)} = \phi_0 \frac{R_{offset} + \Delta R}{2R_{offset}} \quad (7)$$

where $\phi_0 = \phi_1 + \phi_2$.

By changing the fluctuating reluctance $\Delta R$, $\phi_1$ and $\phi_2$ can be regulated. The voltages $v_1$ and $v_2$ induced on the two secondary windings 134, 136 are $$v_1 = -N\frac{d\phi_1}{dt} = -N\frac{1}{2R_{offset}}\frac{d[(R_{offset} - \Delta R)\phi_0]}{dt} \quad (8)$$

$$v_2 = -N\frac{d\phi_2}{dt} = -N\frac{1}{2R_{offset}}\frac{d[(R_{offset} + \Delta R)\phi_0]}{dt} \quad (9)$$

The output voltage $v_{out}$ of this three-leg EM power converter module 120 is the difference of the voltages induced on the two secondary windings 134, 136 expressed as follows.

$$v_{out} = v_1 - v_2 = \quad (10)$$
$$-N\frac{d(\phi_1 - \phi_2)}{dt} = -\frac{N}{2R_{offset}}\frac{d}{dt}(-2\phi_0\Delta R) = \frac{N}{R_{offset}}\frac{d}{dt}(\phi_0\Delta R)$$

where the flux term $(\phi_1 - \phi_2)$ is called the synthesized flux through the two side (secondary) core legs 124, 126 of the three-leg EM power converter module 120, which induces the output voltage of the three-leg EM power converter module 120. Substituting the expression of $\phi_0$ in Equation 3 into Equation 10, $v_{out}$ can be expressed as follows $$v_{out} = -\frac{N}{R_{offset}}\frac{U_{in}}{N_0\omega_1}\frac{d}{dt}[\Delta R\sin(\omega_1 t)] \quad (11)$$

The value of $\Delta R$ can be controlled to be a time-varying function by the controller 106 of the magnetic flux valves. Assume that the value of $\Delta R$ is controlled to be the following sinusoidal function of time t with the frequency $\omega_2$ and amplitude Ramp.

$$\Delta R = R_{amp} \sin(\omega_2 t) \quad (12)$$

Substituting Equation 12 into Equations 6 and 7, the flux $\phi_1$ in the left core leg 124 and the flux $\phi_2$ in right core leg 126 become $$\phi_1 = \frac{\phi_0}{2}\left(1 - \frac{\Delta R}{R_{offset}}\right) = \quad (13)$$
$$\frac{\phi_0}{2}\left[1 - \frac{R_{amp}}{R_{offset}}\sin(\omega_2 t)\right] = -\frac{U_{in}}{2N_0\omega_1}\sin(\omega_1 t)\left[1 - \frac{R_{amp}}{R_{offset}}\sin(\omega_2 t)\right]$$

$$\phi_2 = \frac{\phi_0}{2}\left(1 + \frac{\Delta R}{R_{offset}}\right) = \quad (14)$$
$$\frac{\phi_0}{2}\left[1 + \frac{R_{amp}}{R_{offset}}\sin(\omega_2 t)\right] = -\frac{U_{in}}{2N_0\omega_1}\sin(\omega_1 t)\left[1 + \frac{R_{amp}}{R_{offset}}\sin(\omega_2 t)\right]$$

The magnetic flux $\phi_1$ ($\phi_2$) is a modulated waveform of the part of the main flux with the frequency $\omega_1$ through the left (right) core leg and the fluctuating reluctance $\Delta R$ of the magnetic flux valve with the frequency $\omega_2$ in the left (right) core leg generated by the time-varying voltage applied to the magnetic flux valve 120.

Figure 6:
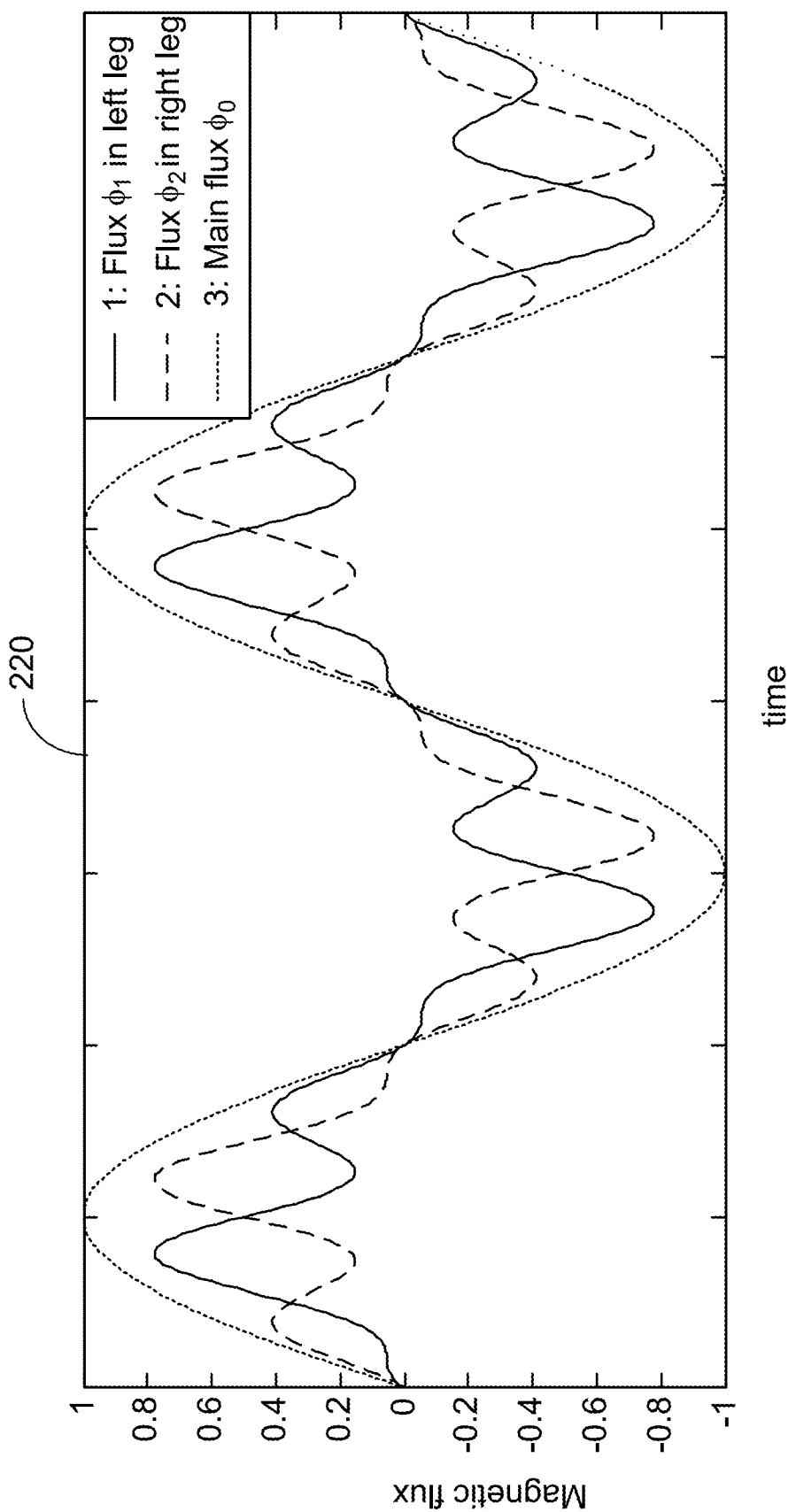
FIG. 6 is a graph showing the main flux in the central core leg and the fluxes in the two side core legs generated by modulation through a three-leg EM power converter module.

FIG. 6 is a graph 220 showing the waveforms of $\phi_0$, $\phi_1$ and $\phi_2$. Substituting Equation 12 into Equation 11, then $v_{out}$ can be written as $$v_{out} = -\frac{NU_{in}}{R_{offset}N_0\omega_1}\frac{d}{dt}[R_{amp}\sin\omega_1 t\sin\omega_2 t] \quad (15)$$

The output voltage of the three-leg EM power converter module 120 is a modulated waveform of a sinusoid with the frequency $\omega_1$ (i.e., the frequency of the input voltage) and another sinusoid with the frequency $\omega_2$ (i.e., the frequency of the variation of the fluctuating reluctance $\Delta R$).

Figure 7:
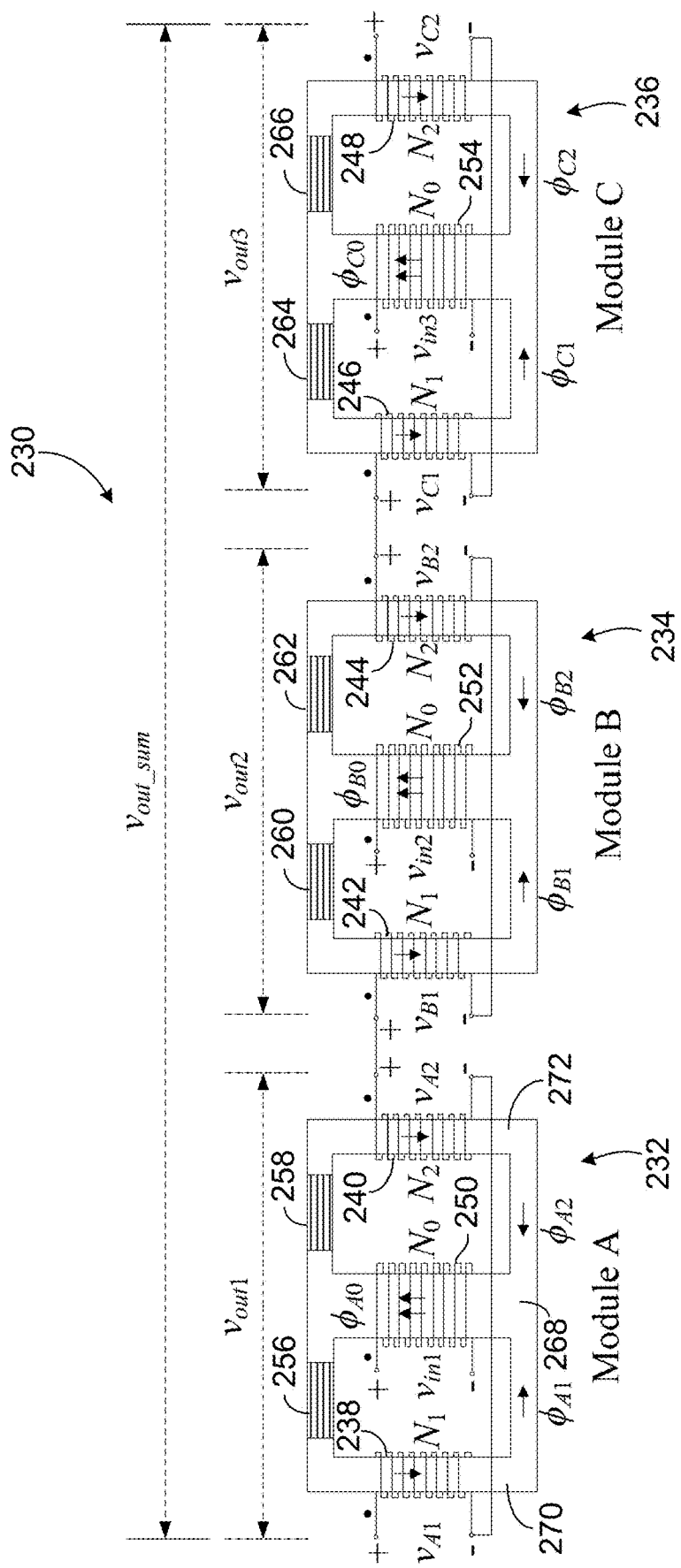
FIG. 7 is a diagram of a single-phase EM power converter that includes three three-leg modules.

Single- or Three-Phase EM Power Converter Formed by Using Multiple Three-Leg Modules Referring to FIG. 7, a single-phase EM power converter 230 can be constructed using three identical three-leg EM power converter modules 232, 234, and 236 (also referred to as module A, module B, and module C), in which their secondary (output) windings 238, 240, 242, 244, 246, 248 are connected sequentially and their primary (input) windings 250, 252, 254 are connected to balanced three-phase input voltage Sources $v_{in1}$, $v_{in2}$, and $v_{in3}$ $$v_{in1} = U_{in}\cos\omega_1 t \quad (16)$$

$$v_{in2} = U_{in}\cos\left(\omega_1 t - \frac{2\pi}{3}\right) \quad (17)$$

$$v_{in3} = U_{in}\cos\left(\omega_1 t + \frac{2\pi}{3}\right) \quad (18)$$

According to Equations 10, 11 and 15, the three-phase output voltages $v_{out1}$, $v_{out2}$ and $v_{out3}$ of the three EM power converter modules 232, 234, 236 are $$v_{out1} = -N\frac{d(\phi_{A1} + \phi_{A2})}{dt} = -\frac{NU_{in}}{R_{offset}N_0\omega_1}\frac{d}{dt}[\Delta R_1\sin(\omega_1 t)] = \quad (19)$$
$$-\frac{NU_{in}}{R_{offset}N_0\omega_1}\frac{d}{dt}[R_{amp}\sin(\omega_1 t)\sin(\omega_2 t)]$$

$$v_{out2} = -N\frac{d(\phi_{B1} + \phi_{B2})}{dt} = -\frac{NU_{in}}{R_{offset}N_0\omega_1}\frac{d}{dt}\left[\Delta R_2\sin\left(\omega_1 t - \frac{2\pi}{3}\right)\right] = \quad (20)$$
$$-\frac{NU_{in}}{R_{offset}N_0\omega_1}\frac{d}{dt}\left[R_{amp}\sin\left(\omega_1 t - \frac{2\pi}{3}\right)\sin\left(\omega_2 t - \frac{2\pi}{3}\right)\right]$$

$$v_{out3} = -N\frac{d(\phi_{C1} + \phi_{C2})}{dt} = -\frac{NU_{in}}{R_{offset}N_0\omega_1}\frac{d}{dt}\left[\Delta R_3\sin\left(\omega_1 t + \frac{2\pi}{3}\right)\right] = \quad (21)$$
$$-\frac{NU_{in}}{R_{offset}N_0\omega_1}\frac{d}{dt}\left[R_{amp}\sin\left(\omega_1 t + \frac{2\pi}{3}\right)\sin\left(\omega_2 t + \frac{2\pi}{3}\right)\right]$$

where $\phi_{A1}$, $\phi_{B1}$, and $\phi_{C1}$ are the magnetic fluxes through the left core legs of the three modules A, B, and C, respectively. The magnetic fluxes $\phi_{A1}$, $\phi_{B1}$, and $\phi_{C1}$ are generated by the modulation of the part of the main fluxes with the frequency $\omega_1$ through the magnetic flux valves and the time-varying fluctuating reluctances of the magnetic flux valves with the frequency $\omega_2$ in the left core legs of the three modules. The symbols $\phi_{A2}$, $\phi_{B2}$, and $\phi_{C2}$ represent the magnetic fluxes through the right core legs of the three modules A, B, and C, respectively. The magnetic fluxes $\phi_{A2}$, $\phi_{B2}$, and $\phi_{C2}$ are generated by the modulation of the part of the main fluxes with the frequency $\omega_1$ through the magnetic flux valves and the time-varying fluctuating reluctances of the magnetic flux valves with the frequency $\omega_2$ in the right core legs of the three modules A, B, and C.

The fluctuating reluctances of the three EM power converter modules, $\Delta R_1$, $\Delta R_2$, and $\Delta R_3$, are controlled to be three balanced sinusoidal functions as follows $$\Delta R_1 = R_{amp} \sin(\omega_{12} t) \qquad (22)$$

$$\Delta R_2 = R_{amp} \sin\left(\omega_2 t - \frac{2\pi}{3}\right) \qquad (23)$$

$$\Delta R_3 = R_{amp} \sin\left(\omega_2 t + \frac{2\pi}{3}\right) \qquad (24)$$

The total output voltage of the single-phase EM power converter 230, $v_{out\_sum}$, is the summation of the outputs of the three modules A, B, C and is expressed as follows.

$$v_{out\_sum} = \qquad (25)$$
$$v_{out1} + v_{out2} + v_{out3} = -N \frac{d(\phi_{A1} + \phi_{B1} + \phi_{C1} - \phi_{A2} - \phi_{B2} - \phi_{C2})}{dt} =$$
$$\frac{3}{2} \frac{N}{N_0} \frac{R_{amp}}{R_{offset}} \frac{\omega_2 - \omega_1}{\omega_1} U_{in} \sin(\omega_2 - \omega_1)t$$

where $(\phi_{A1}+\phi_{B1}+\phi_{C1}-\phi_{A2}-\phi_{B2}-\phi_{C2})$ is called the synthesized magnetic flux through all secondary core legs of the EM power converter 230 shown in FIG. 7, which induces the output voltage of the EM power converter 230. The synthesized magnetic flux has a sinusoidal waveform with the frequency of $(\omega_2-\omega_1)$. Thus, a sinusoidal voltage $v_{out}$ sum with the frequency of $(\omega_2-\omega_1)$ is generated at the output of the EM power converter 230, which is, therefore, called a single-phase EM power converter 230.

The amplitude of the output voltage $v_{out\_sum}$ is determined by the amplitude $U_{in}$ of the voltages applied to the primary windings 250, 252, 254 of the modules A, B, C, the turn ratio N/No of each module, a frequency-related ratio $(\omega_2-\omega_1)/\omega_1$, and a reluctance ratio $R_{amp}/R_{offset}$. Both the frequency and amplitude of the output voltage $v_{out}$ sum are controllable. Therefore, the EM power converter 230 in FIG. 7 can perform single-phase variable-voltage and variable-frequency AC-AC electric power conversion. According to the relationship of voltage and magnetic flux (see Equations 8 and 9), as long as the synthesized flux (e.g., in Equation 10) is a sinusoidal function, the output voltage induced from the synthesized flux will be a sinusoidal function. Therefore, the general principle of the sinusoidal flux synthesization is to make the algebraic summation of the magnetic fluxes used to generate an output voltage of the EM power converter 230 be a sinusoidal function. However, the input and output of the EM power converter 230 are not limited to sinusoidal waveforms. Other AC waveforms, such as square wave, triangular wave, etc., can also be used and generated, as long as an appropriate magnetic flux modulation and synthesization method is used.

FIGS. 8(a) to 8(c) are graphs that show the waveforms of the magnetic fluxes inside the three modules A, B, and C of the EM power converter 230, respectively, which include the main flux through the central core leg (e.g., 268) and the fluxes through the two side (secondary) core legs (e.g., 270, 272) generated by modulation of each power converter module. In each power converter module, the main flux generated by the current through the primary winding splits into two parts. By controlling the magnetic flux valves 256, 258, 260, 262, 264, 266, the magnetic flux in each secondary core leg is generated by modulating the part of the main flux through the core leg with the fluctuating reluctance of the magnetic flux valve in the core leg, which is controlled by the time-varying voltage supplied by the driver circuit 104 of the magnetic flux valve.

FIG. 8(d) is a graph that shows the waveforms of the main fluxes in the three modules A, B, C and the synthesized magnetic flux through all secondary windings (e.g., 270, 272) of the EM power converter 230. Both the main fluxes and the synthesized flux are pure sinusoidal waveforms.

A three-phase EM power converter can be constructed by using three single-phase EM power converters shown in FIG. 7 for variable-voltage and variable-frequency three-phase AC-AC electric power conversion. If the inputs to the three single-phase EM power converters are a balanced three-phase AC voltage source, then the outputs of the three single-phase EM power converters, i.e., the output of the three-phase EM power converter, will be balanced three-phase AC voltages as well.

For example, suppose that the three modules in FIG. 7 form the A phase of the three-phase EM power converter with the output voltage $v_{outA}$ equal to $v_{out\_sum}$ in Equation (25), i.e., $$v_{outA} = \frac{3}{2} \frac{N}{N_0} \frac{R_{amp}}{R_{offset}} \frac{\omega_2 - \omega_1}{\omega_1} U_{in} \sin(\omega_2 - \omega_1)t$$

The input terminals of the three modules in the B and C phases of the three-phase EM power converter are connected to the balanced three-phase voltage sources $v_{in1}$, $v_{in2}$, and $v_{in3}$ in the same way as those in the A phase shown in FIG. 7. However, the fluctuating reluctances of the three modules A, B, and C in the B phase are controlled to be $\Delta R_2$, $\Delta R_3$, and $\Delta R_1$, respectively. Then, the output voltage $v_{outB}$ of the B phase is:

$$v_{outB} = \frac{3}{2} \frac{N}{N_0} \frac{R_{amp}}{R_0} \frac{\omega_2 - \omega_1}{\omega_1} U_{in} \sin\left[(\omega_2 - \omega_1)t - \frac{2\pi}{3}\right]$$

The fluctuating reluctances of the three modules A, B, and C in the C phase are controlled to be $\Delta R_3$, $\Delta R_1$, and $\Delta R_2$, respectively. Then, the output voltage $v_{outC}$ of the C phase is:

$$v_{outC} = \frac{3}{2} \frac{N}{N_0} \frac{R_{amp}}{R_0} \frac{\omega_2 - \omega_1}{\omega_1} U_{in} \sin\left[(\omega_2 - \omega_1)t + \frac{2\pi}{3}\right]$$

Therefore, the three-phase EM power converter made of the nine identical modules shown in FIGS. 2A and 3A will output balanced three-phase sinusoidal voltages with controllable frequency and amplitude.

Four-Leg EM Power Converter Module

The physical configuration, equivalent circuit, and operating principles of the four-leg EM power converter module 140 shown in FIG. 2B are described below.

Figure 9A:
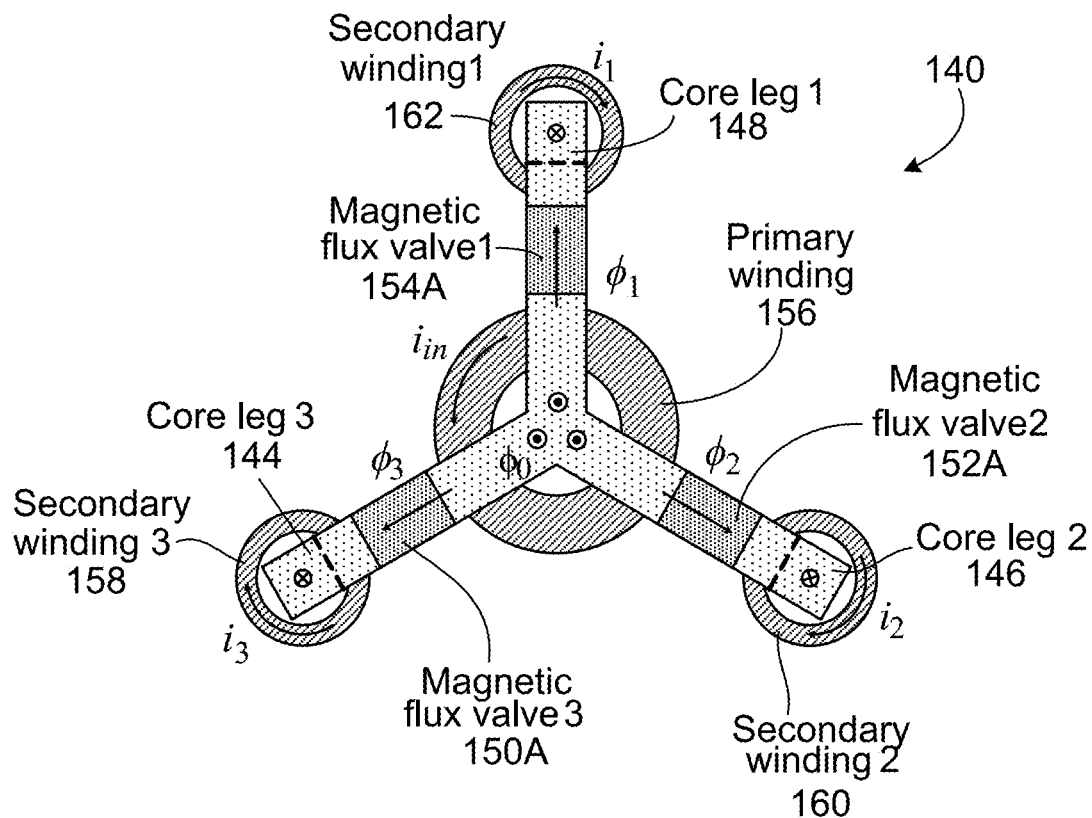
FIG. 9A is a diagram showing a top view of the physical configuration of a four-leg EM power converter module.
Figure 9B:
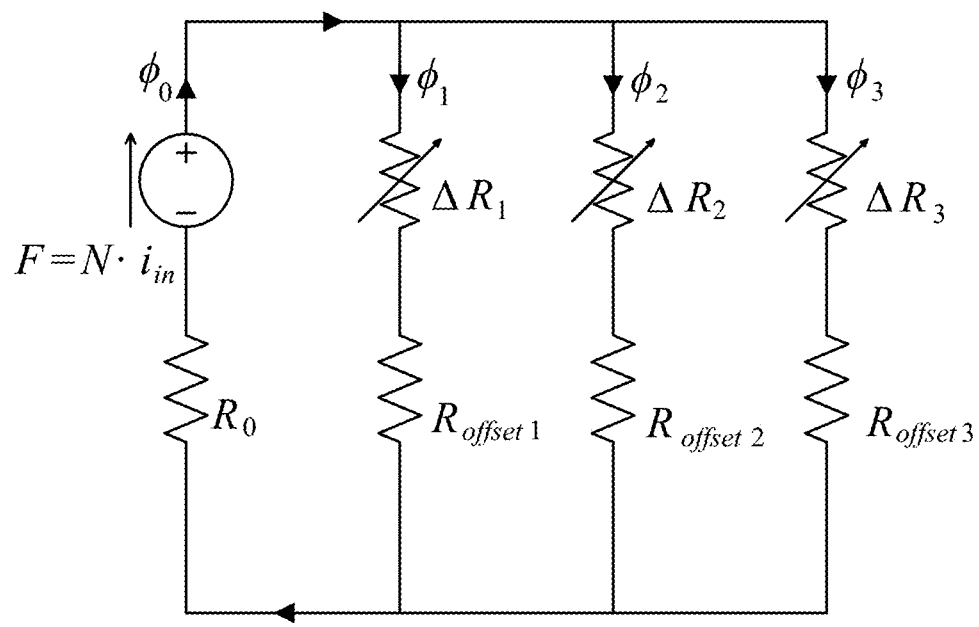
FIG. 9B is a diagram of the equivalent circuit of the power converter module of FIG. 9A.

FIG. 9A is the top view of the physical configuration of the four-leg EM power converter module 140 shown in FIG. 2B. FIG. 9B is the equivalent circuit of the module 140 shown in FIG. 9A. As shown in FIGS. 9A and 9B, the current iin through the primary winding 156 on the central core leg 142 generates the main magnetic flux, which then splits into three branches and flows through the three side (secondary) core legs 144, 146, 148. The principle of regulating the reluctances of the magnetic flux valves for the magnetic flux redistribution and modulation is the same as that of the three-leg EM power converter module 120. The magnetic flux will be redistributed if the reluctance(s) of any core leg(s) changes by controlling the magnetic flux valves.

Three-Phase EM Power Converter Formed by Using Multiple Four-Leg Modules

Figure 10:
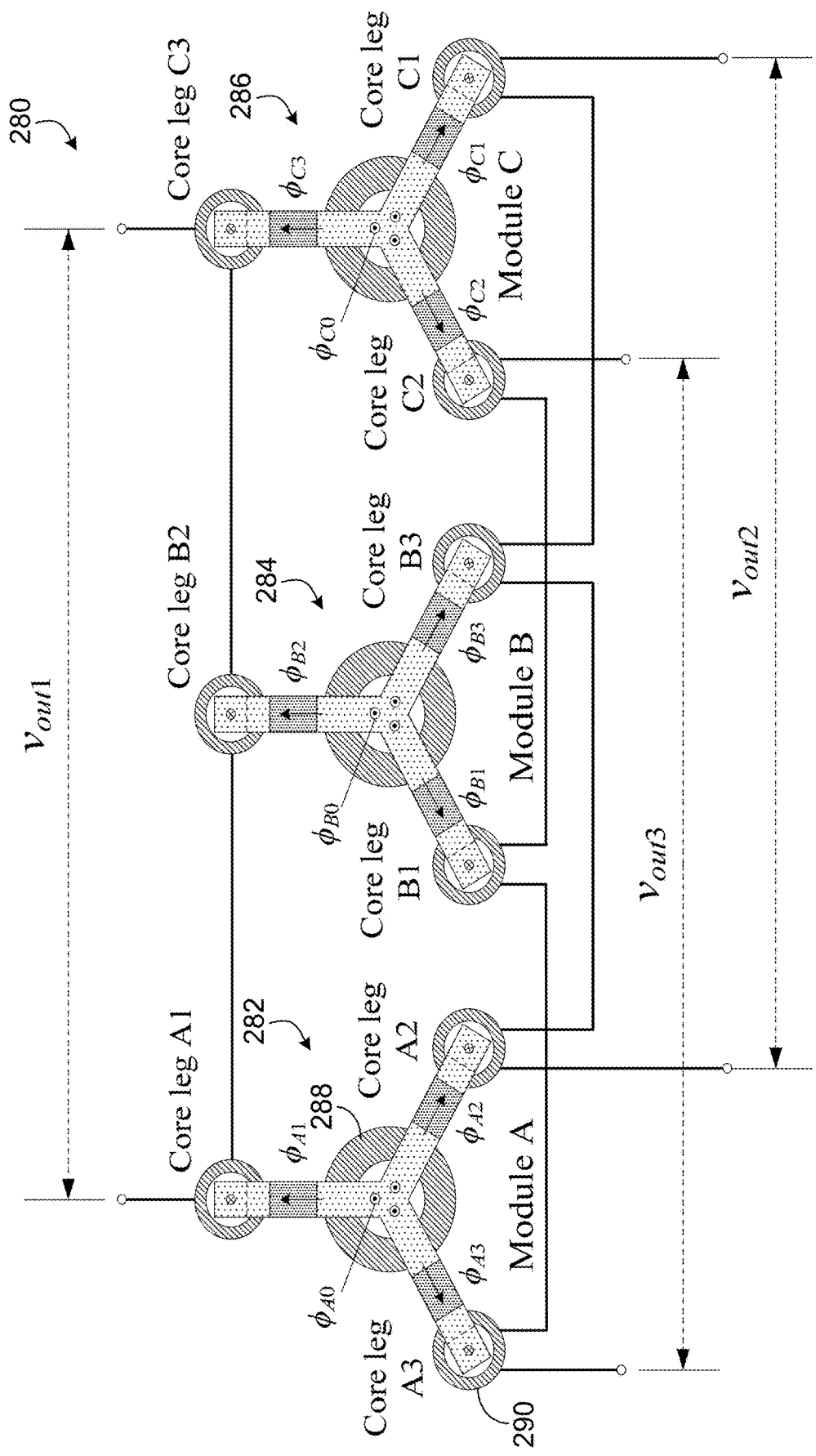
FIG. 10 is a diagram of a three-phase EM power converter that includes three four-leg modules.

Referring to FIG. 10, an EM power converter 280 with a three-phase output can be implemented using three four-leg power converter modules 282, 284, 286 (which have the same configuration as power converter module 140 of FIGS. 2B and 9). The notations of the fluxes and reluctances in each phase of the EM power converter are the same as those in FIG. 9 by adding a phase index A, B or C in their subscripts, as in the following Equations 26 to 47.

Assume that the AC inputs on the primary windings (e.g., 288) of the three modules 282, 284, 286 are balanced three-phase sinusoidal voltages with the frequency $\omega_1$ and the amplitude $U_{in}$, all of the primary windings have the same turn number $N_0$, and all of the secondary windings (e.g., 290) have the same turn number $N_1$. If the main magnetic fluxes $\phi_{A0}$, $\phi_{B0}$ and $\phi_{C0}$ of the three modules 282, 284, 286 generated by the currents through their primary windings are balanced three-phase sinusoidal functions as follows, $$\phi_{A0} = \frac{U_{in}}{N_0 \omega_1} \sin(\omega_1 t) \tag{26}$$

$$\phi_{B0} = -\frac{U_{in}}{N_0 \omega_1} \sin\left(\omega_1 t - \frac{2\pi}{3}\right) \tag{27}$$

$$\phi_{C0} = -\frac{U_{in}}{N_0 \omega_1} \sin\left(\omega_1 t + \frac{2\pi}{3}\right) \tag{28}$$

then the distribution of the main flux in the three secondary (side) core legs of each module 282, 284, 286 is dependent on the reluctances of the three secondary core legs. Consider for example Module A 282. Assume that the reluctances of the three secondary core legs are $R_{A1}$, $R_{A2}$ and $R_{A3}$ expressed as follows.

$$R_{A1} = R_{offset} + \Delta R_{A1} \tag{29}$$

$$R_{A2} = R_{offset} + \Delta R_{A2} \tag{30}$$

$$R_{A3} = R_{offset} + \Delta R_{A3} \tag{31}$$

Each of the reluctances $R_{A1}$, $R_{A2}$ and $R_{A3}$ consists of two components: a fixed offset component $R_{offset}$ (i.e., assume $R_{offset1} = R_{offset2} = R_{offset3} = R_{offset}$) and a fluctuating component $\Delta R_{A1}$, $\Delta R_{A2}$ and $\Delta R_{A3}$, respectively. The value of $R_{offset}$ is mainly determined by the reluctance of the laminated core leg, while the values of $\Delta R_{A1}$, $\Delta R_{A2}$ and $\Delta R_{A3}$ are determined by the corresponding magnetic flux valve in the core leg.

As described previously, the total reluctance of each secondary core leg of the power converter module can be controlled by changing the permeability (thus the fluctuating reluctance) of the magnetic flux valves in the core leg, which is achieved by the controlling the voltages applied to magnetic flux valves by the driver circuit (e.g., 104). In this way, the magnetic fluxes $\phi_{A1}$, $\phi_{A2}$, and $\phi_{A3}$ in the three side core legs of Module A can be controlled via modulation:

$$\phi_{A1} = \frac{\phi_{A0}}{3}[1 + K \cdot \sin(\omega_2 t)] \tag{32}$$

$$\phi_{A2} = \frac{\phi_{A0}}{3}\left[1 + K \cdot \sin\left(\omega_2 t - \frac{2\pi}{3}\right)\right] \tag{33}$$

$$\phi_{A3} = \frac{\phi_{A0}}{3}\left[1 + K \cdot \sin\left(\omega_2 t + \frac{2\pi}{3}\right)\right] \tag{34}$$

where $\phi_{A0} = \phi_{A1} + \phi_{A2} + \phi_{A3}$ and K is the split ratio of the modulated term of the main magnetic flux flowing through the three secondary core legs, and $\omega_2$ is the frequency of the variations of the fluctuating reluctances of the magnetic flux valves. The magnetic fluxes $\phi_{A1}$, $\phi_{A2}$, and $\phi_{A3}$ are modulated waveforms of the main flux and the fluctuating reluctances. The value of K and the reluctances $R_{A1}$, $R_{A2}$ and $R_{A3}$ have the following relations:

$$\frac{R_{A2}(t)R_{A3}(t)}{R_{A1}(t)R_{A2}(t) + R_{A2}(t)R_{A3}(t) + R_{A1}(t)R_{A3}(t)} = \frac{1}{3}(1 + K \sin \omega_2 t) \tag{35}$$

$$\frac{R_{A1}(t)R_{A3}(t)}{R_{A1}(t)R_{A2}(t) + R_{A2}(t)R_{A3}(t) + R_{A1}(t)R_{A3}(t)} = \frac{1}{3}\left[1 + K \sin\left(\omega_2 t - \frac{2}{3}\pi\right)\right] \tag{36}$$

$$\frac{R_{A1}(t)R_{A2}(t)}{R_{A1}(t)R_{A2}(t) + R_{A2}(t)R_{A3}(t) + R_{A1}(t)R_{A3}(t)} = \frac{1}{3}\left[1 + K \sin\left(\omega_2 t + \frac{2}{3}\pi\right)\right] \tag{37}$$

When the value of K is given, the reluctances $R_{A1}$, $R_{A2}$ and $R_{A3}$ and therefore the fluctuating reluctances $\Delta R_{A1}$, $\Delta R_{A2}$ and $\Delta R_{A3}$ can be calculated. The driver circuit of the magnetic flux valves can be controlled by the controller to supply proper voltages for the magnetic flux valves in the three secondary core legs to control their fluctuating reluctances at the desired values.

The magnetic fluxes $\phi_{B1}$, $\phi_{B2}$ and $\phi_{B3}$ in the three secondary core legs of Module B 284 and the magnetic fluxes $\phi_{C1}$, $\phi_{C2}$ and $\phi_{C3}$ in the three secondary core legs of Module C 286 can be controlled in the same way from the B and C phases of the balanced three-phase input source, respectively:

$$\phi_{B1} = \frac{\phi_{B0}}{3}[1 + K \cdot \sin(\omega_2 t)] \tag{38}$$

$$\phi_{B2} = \frac{\phi_{B0}}{3}\left[1 + K \cdot \sin\left(\omega_2 t - \frac{2\pi}{3}\right)\right] \tag{39}$$

$$\phi_{B3} = \frac{\phi_{B0}}{3}\left[1 + K \cdot \sin\left(\omega_2 t + \frac{2\pi}{3}\right)\right] \tag{40}$$

$$\phi_{C1} = \frac{\phi_{C0}}{3}[1 + K \cdot \sin(\omega_2 t)] \tag{41}$$

$$\phi_{C2} = \frac{\phi_{C0}}{3}\left[1 + K \cdot \sin\left(\omega_2 t - \frac{2\pi}{3}\right)\right] \tag{42}$$

$$\phi_{C3} = \frac{\phi_{C0}}{3}\left[1 + K \cdot \sin\left(\omega_2 t + \frac{2\pi}{3}\right)\right] \tag{43}$$

FIG. 10 also shows the flux lines of the three four-leg EM power converter modules 282, 284, 286. The secondary windings of the three four-leg EM power converter modules 282, 284, 286 are connected in a specific sequence as illustrated in FIG. 10 such that the synthesized magnetic fluxes $\phi_{out1}$, $\phi_{out2}$ and $\phi_{out3}$ through the secondary windings of the EM power converter 280 are balanced three-phase sinusoidal functions expressed as follows. In some implementations, the secondary windings generating $\phi_{A1}$, $\phi_{B2}$ and $\phi_{C3}$ are connected in series; the secondary windings generating $\phi_{A2}$, $\phi_{B3}$ and $\phi_{C1}$ are connected in series; and the secondary windings generating $\phi_{A3}$, $\phi_{B1}$ and $\phi_{C2}$ are connected in series.

$$\phi_{out1} = \phi_{A1} + \phi_{B2} + \phi_{C3} = \quad (44)$$
$$\frac{K}{3}\left[\phi_{A0}\sin(\omega_2 t) + \phi_{B0}\sin\left(\omega_2 t - \frac{2\pi}{3}\right) + \phi_{C0}\sin\left(\omega_2 t + \frac{2\pi}{3}\right)\right] =$$
$$-\frac{K\phi_{max}}{3}\frac{3}{2}\cos[(\omega_2 - \omega_1)t]$$

$$\phi_{out2} = \phi_{A2} + \phi_{B3} + \phi_{C1} = \quad (45)$$
$$\frac{K}{3}\left[\phi_{A0}\sin\left(\omega_2 t - \frac{2\pi}{3}\right) + \phi_{B0}\sin\left(\omega_2 t + \frac{2\pi}{3}\right) + \phi_{C0}\sin(\omega_2 t)\right] =$$
$$-\frac{K\phi_{max}}{3}\frac{3}{2}\cos\left[(\omega_2 - \omega_1)t - \frac{2\pi}{3}\right]$$

$$\phi_{out3} = \phi_{A3} + \phi_{B1} + \phi_{C2} = \quad (46)$$
$$\frac{K}{3}\left[\phi_{A0}\sin\left(\omega_2 t + \frac{2\pi}{3}\right) + \phi_{B0}\sin(\omega_2 t) + \phi_{C0}\sin\left(\omega_2 t - \frac{2\pi}{3}\right)\right] =$$
$$-\frac{K\phi_{max}}{3}\frac{3}{2}\cos\left[(\omega_2 - \omega_1)t + \frac{2\pi}{3}\right]$$

where $\phi_{max}$ is the amplitude of the main magnetic fluxes of the three four-leg EM power converter modules 282, 284, 286 defined as follows $$\phi_{max} = |\phi_{A0}| = |\phi_{B0}| = |\phi_{C0}| = \frac{U_{in}}{N_0 \omega_1} \quad (47)$$

The synthesized magnetic fluxes $\phi_{out1}$, $\phi_{out2}$ and $\phi_{out3}$ will generate the following balanced three-phase sinusoidal voltages at the output of the three-phase EM power converter 280.

$$v_{out1} = \frac{K}{2}\frac{N_1}{N_0}\frac{\omega_2 - \omega_1}{\omega_1}U_{in}\sin[(\omega_2 - \omega_1)t] \quad (48)$$

$$v_{out2} = \frac{K}{2}\frac{N_1}{N_0}\frac{\omega_2 - \omega_1}{\omega_1}U_{in}\sin\left[(\omega_2 - \omega_1)t - \frac{2\pi}{3}\right] \quad (49)$$

$$v_{out3} = \frac{K}{2}\frac{N_1}{N_0}\frac{\omega_2 - \omega_1}{\omega_1}U_{in}\sin\left[(\omega_2 - \omega_1)t + \frac{2\pi}{3}\right] \quad (50)$$

Compared to the single-phase EM power converter 230 formed by using three-leg modules in FIG. 7, the three-phase EM power converter 280 formed by using four-leg modules 282, 284, 286 has the advantages of being more compact, using less materials, and requiring only three modules to generate a three-phase AC output.

FIGS. 11(*a*) to 11(*d*) are graphs that show the magnetic flux waveforms in the four core legs of each power converter module A 282, B 284, C 286 and the synthesized flux waveforms through the secondary windings of the three phases of the EM power converter 280. The main flux in each four-leg EM power converter module is a sinusoidal waveform. The fluxes through the three secondary core legs of each module are modulated sinusoidal waveforms, and the three synthesized fluxes through the secondary windings of the EM power converter 280 are balanced three-phase sinusoidal waveforms.

Other Structures of the EM Power Converter

The structure of the EM power converter module is not limited to the three-leg and four-leg structures shown in FIGS. 2A and 2B. Other structures containing more legs can also be designed for the EM power converter module using the same magnetic flux and voltage modulation and synthesization principle. Structure design optimization can be performed to make the EM power converter more compact.

Figure 12A:
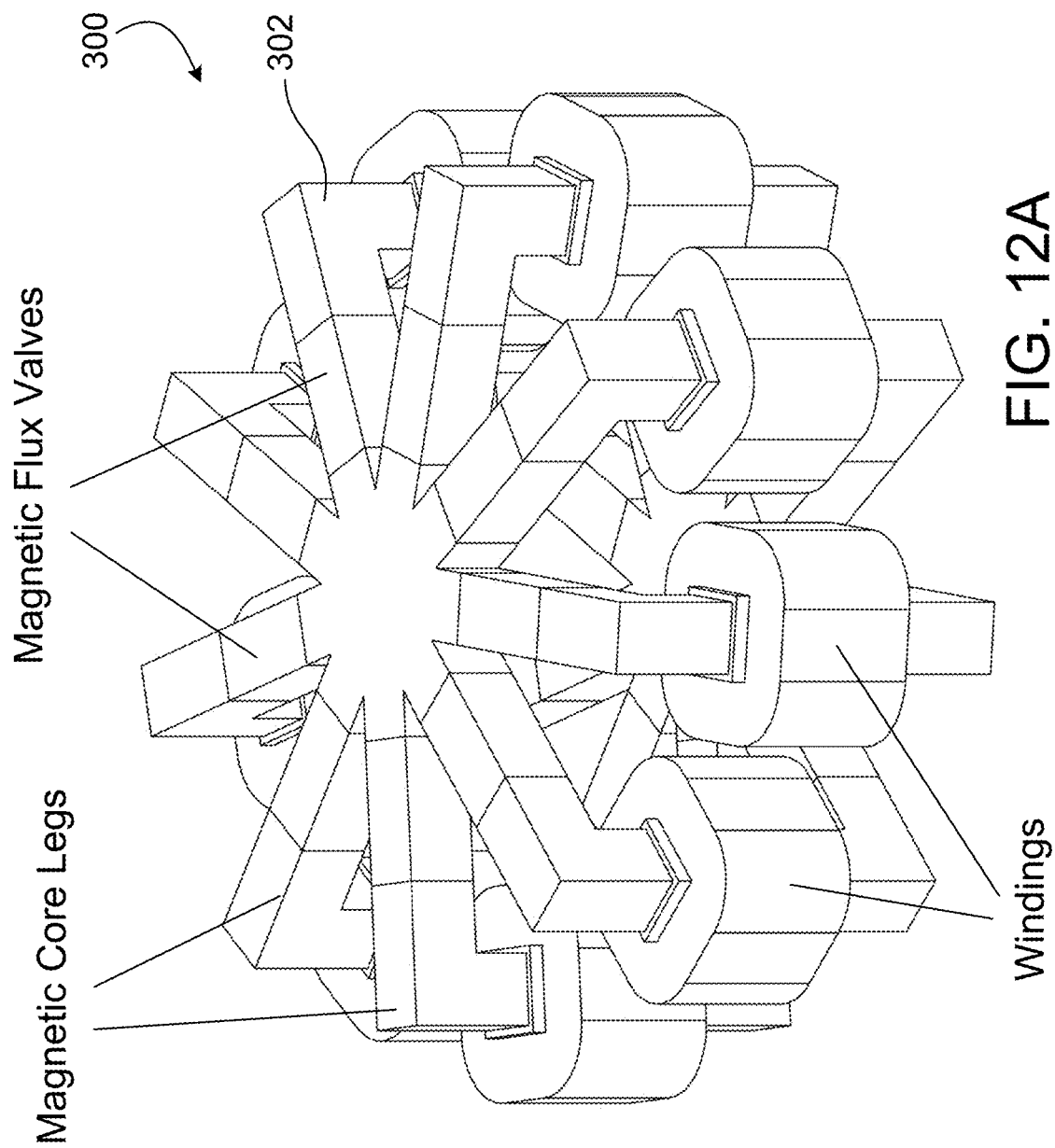
FIG. 12A is a three-dimensional view an exemplary compact three-phase nine-leg EM power converter.
Figure 12B:
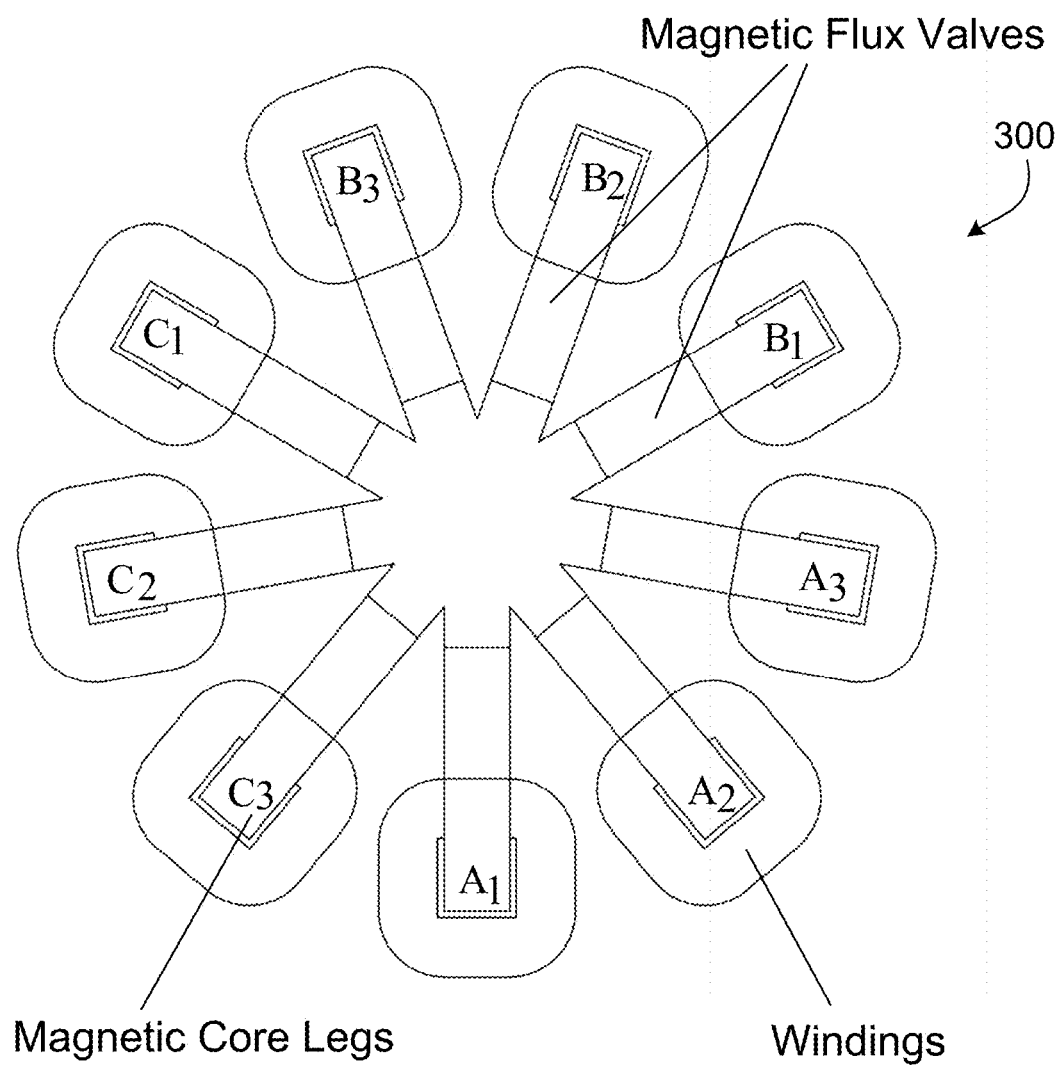
FIG. 12B is a top view of the exemplary compact three-phase nine-leg EM power converter.

FIG. 12A shows the configuration of a compact three-phase AC-AC EM power converter module 300, which contains one EM power converter module (i.e., one magnetic core) having nine core legs (e.g., 302). The nine core legs are labeled as A1, A2, A3, B1, B2, B3, C1, C2, and C3, as shown in FIG. 12B.

Figure 12C:
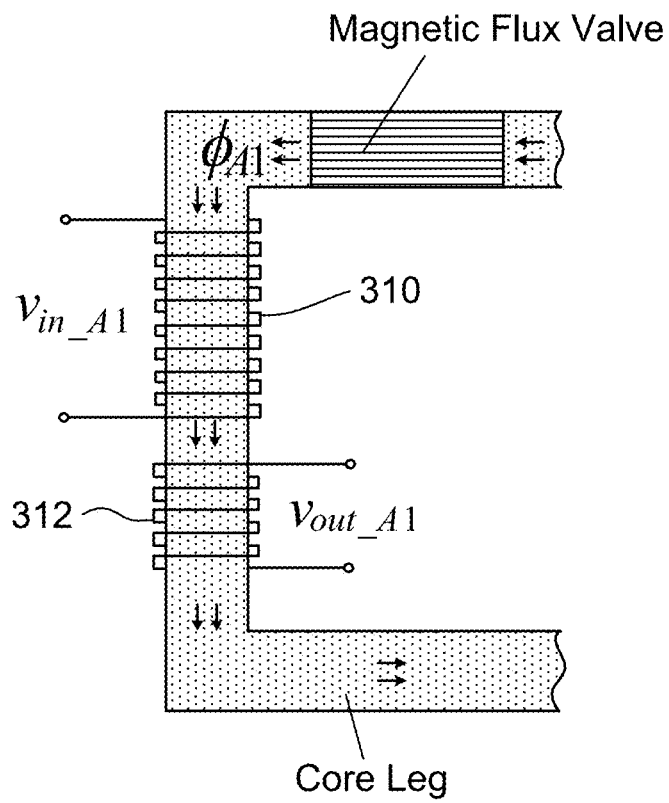
FIG. 12C is a cross-sectional view of an exemplary core leg of the compact three-phase nine-leg EM power converter.
Figure 12D:
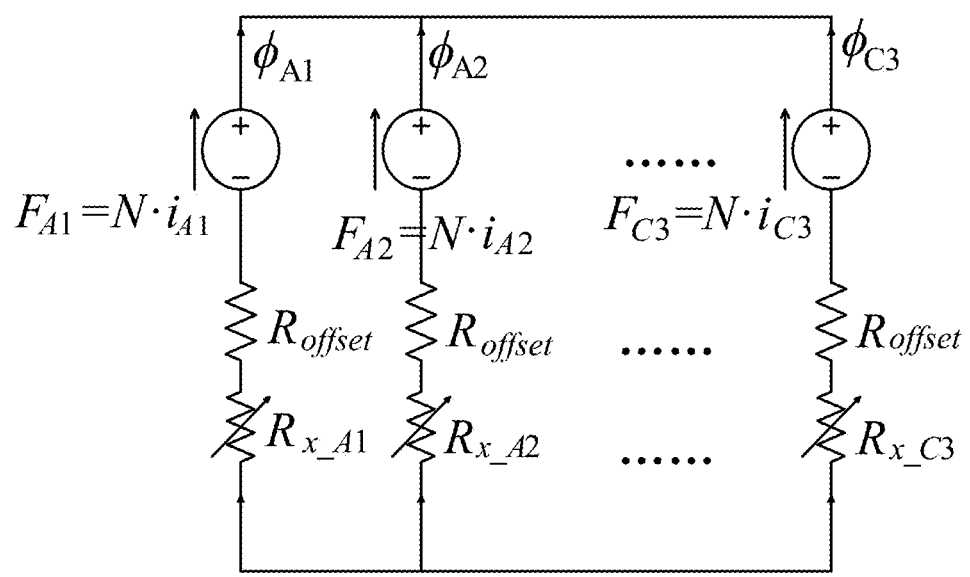
FIG. 12D is a diagram of an equivalent circuit of the compact three-phase nine-leg EM power converter.
Figure 13:
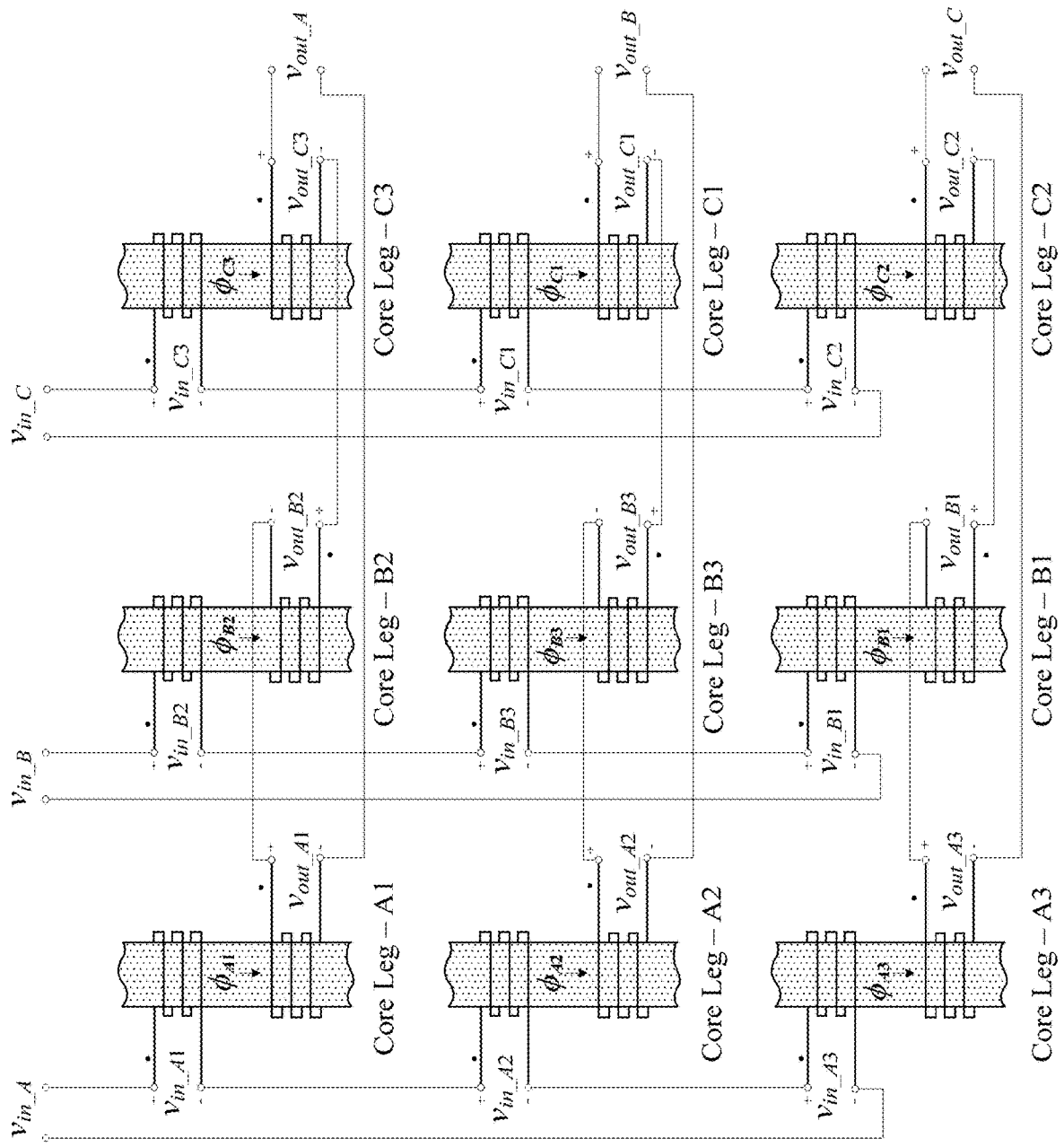
FIG. 13 is an exemplary winding connection diagram of the three-phase nine-leg EM power converter.

The three-phase nine-leg EM power converter has a symmetric structure. The nine core legs have the same fixed offset reluctance $R_{offset}$ as shown in FIG. 12D. Each core leg has a primary winding 310 and a secondary winding 312 as shown in FIG. 12C. The flux modulation and synthesization method of the three-phase EM power converter 300 in FIG. 12A is the same as that formed by using three three-leg modules in FIG. 7 and that formed by using three four-leg modules in FIG. 10. The connection of the secondary windings on the nine core legs uses the same principle as that of the three-phase EM power converter 280 formed by using three four-leg modules in FIG. 10. The difference is that the three-phase nine-leg EM power converter 300 uses three distributed primary windings for each input phase instead of one concentrated primary winding in the EM power converter 140 shown in FIG. 9A. Because the three-phase magnetic fluxes are symmetric, it is not necessary to wrap the primary windings on separate core legs. In other words, a primary winding and the corresponding secondary winding can be wrapped on the same core leg, as shown in FIG. 13. Thus, the core legs on the primary side of the EM power converter formed by using three-leg modules in FIG. 7 or four-leg modules in FIG. 10 can be saved, which is similar to a three-phase power transformer.

FIG. 13 shows the connection of the primary and secondary windings on the nine core legs of the EM power converter 300. The connection of the secondary windings is the same as that of the EM power converter 280 in FIG. 10. The difference is that in FIG. 13 the primary windings of each phase consist of three windings on three core legs connected in series. Although the structure of the EM power converter in FIG. 13 is more compact than those in FIGS. 7 and 10, the principle of the flux redistribution, modulation, and synthesization remains the same as that of the EM power converters in FIGS. 7 and 10.

General Principle of the Magnetic Flux Modulation and Synthesization of a Generic n-Phase EM Power Converter (n=1, 2, 3, ...)

The working principle of the EM power converter is based on magnetic flux modulation and synthesization. The flux modulation and synthesization method is not limited to that described above and depends on the specific structures of the EM power converter. The flux modulation and synthesization methods share the same principle: the magnetic flux through each secondary core leg generated by the source current(s) through the primary winding(s) is modulated by the fluctuating reluctance(s) of magnetic flux valve(s) in the secondary core leg, which is controlled by the time-varying voltage(s) applied to the magnetic flux valve(s). The modulated magnetic fluxes in different secondary core legs are synthesized to form a desired waveform, such as a sinusoidal wave, a square wave, a triangular wave, or a pulse wave, depending on the input source and the voltages applied to the magnetic flux valves.

Figure 14:
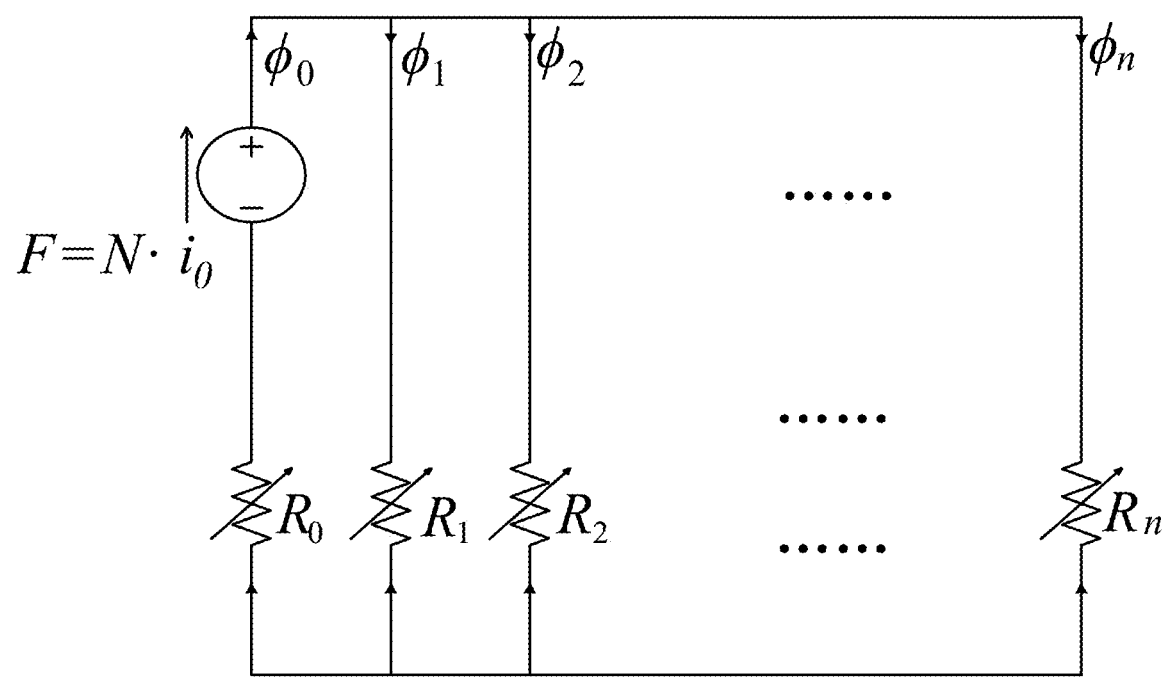
FIG. 14 is a diagram of an equivalent circuit of an n-leg EM power converter.

The magnetic flux modulation determines how the main flux splits into portions that are distributed in the secondary core legs. Consider a general n-leg EM power converter. Its equivalent circuit is shown in FIG. 14. If the main magnetic flux generated by the source current(s) $i_0$ through the primary winding(s) is $\phi_0$, the magnetic fluxes in the n secondary core legs of the n-leg EM power converter has the following relation:

$$\phi_1 R_1 = \phi_2 R_2 = \ldots = \phi_i R_i = \ldots = \phi_n R_n \quad (51)$$

where i is the index of the secondary magnetic core leg, n is the total number of the secondary core legs, $\phi_i$ is the magnetic flux through the secondary core leg i, and $R_i$ is the reluctance of the secondary core leg i. The summation of the magnetic fluxes through all secondary core legs is equal to $\phi_0$:

$$\sum_{i=0}^{n} \phi_i = \phi_0 \quad (52)$$

The synthesized magnetic fluxes determine the final output of the n-leg EM power converter because the output voltage(s) are the derivatives of the magnetic fluxes as follows.

$$v_{out} = \sum_{i=1}^{n} \frac{N_i d\phi_i}{dt} = \frac{d}{dt} \sum_{i=1}^{n} N_i \phi_i \xrightarrow{if\ N_1=\ldots=N_n=N} N \frac{d}{dt} \sum_{i=1}^{n} \phi_i \quad (53)$$

where $v_{out}$ is the final voltage output of some serially connected windings wrapped on the n secondary core legs, and $N_1$ is the turn number of the induced winding on the secondary core leg i. The synthesization (i.e., algebra summation) of the magnetic fluxes can be a sinusoidal wave, a triangular wave, a pulse wave, or any other waveform depending on the input source and the voltages applied to the magnetic flux valves. The output voltage can be sinusoidal when the synthesized magnetic flux is sinusoidal.

The following describes the sinusoidal magnetic flux modulation and synthesization method. The magnetic flux $\phi_i$, the reluctance $R_i$ and the split ratio K of the main magnetic flux flowing through the n secondary core legs have the following relation:

$$\frac{\phi_i}{\phi_0} = \frac{\frac{1}{R_i(t)}}{\sum_{i=1}^{n} \frac{1}{R_i(t)}} = \frac{1}{n}\left[1 + K\sin\left(\omega_{out}t - \frac{i-1}{n} \cdot 2\pi\right)\right] \quad (54)$$

where $\omega_{out}$ (e.g., ($\omega_2-\omega_1$) in Equations 12, 25, 48 to 50, etc.) is the objective frequency of the output, which is determined by controlling the magnetic flux valve. When the main flux split ratio K is given, the reluctance $R_i(t)$ can be determined.

The driver circuit of the magnetic flux valves can be controlled by the controller to supply a proper voltage for the magnetic flux valve in the core leg i to control the reluctance $R_i(t)$ at the desired value. By using an n-phase AC input, the EM power converter in FIG. 14 can generate an n-phase AC output by applying the proper flux modulation and synthesization method.

Figure 27:
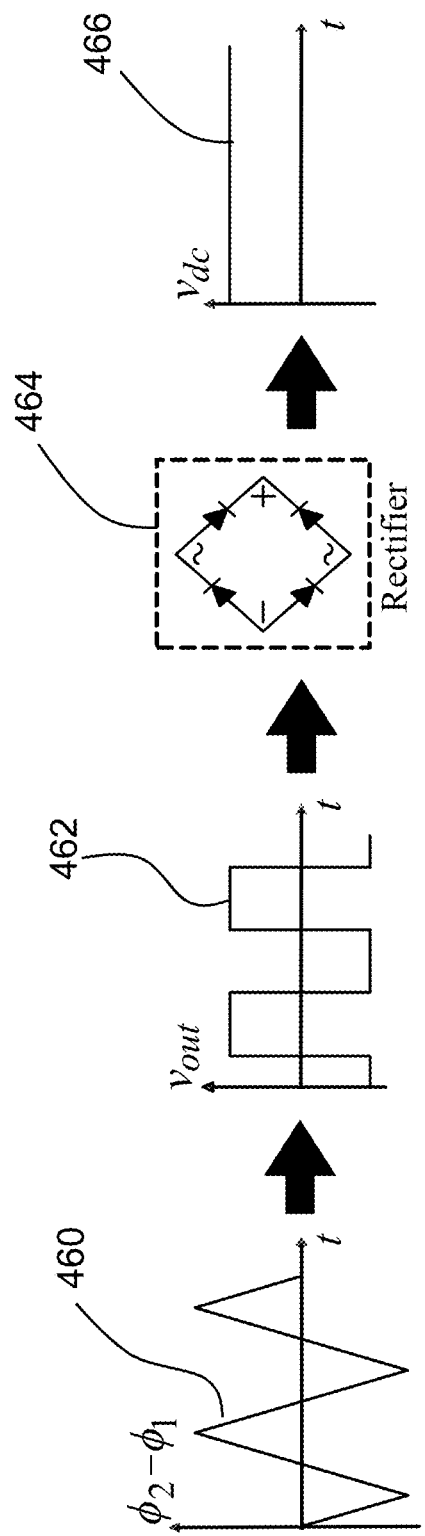
FIG. 27 is a diagram showing an output triangular waveform of an EM power converter module being converted to a direct current waveform.

In some implementations, the EM power converter can also perform AC-DC power conversion. Consider Equation (10) for the single EM converter module in FIG. 2A. Referring to FIG. 27, if $\Delta R$ is regulated such that the differential flux ($\phi_1-\phi_2$) ($=\phi_0 \Delta R/R_{offset}$) is a triangular wave 460, then the output voltage $v_{out}$ is a rectangular wave 462. By using a diode rectifier 464, $v_{out}$ can easily be rectified into a DC voltage $v_{dc}$ 466 without the need for a harmonic filter. A diode rectifier is low cost and reliable and can be built with a high power capacity using the emerging silicon carbide (SiC) diodes to achieve excellent performance.

For example, according to Equation (10), controlling ($\phi_1-\phi_2$) to be a triangular wave is equivalent to controlling $\phi_0 \Delta R$ to be a triangular wave, which can be expressed as a time-varying function $f$, namely, $\phi_0 \Delta R = f$ or $\Delta R = f/\phi_0$. Suppose that the relationship between the control voltage $v_c$ and $\Delta R$ is expressed mathematically to be $v_c = g(\Delta R)$, where g is a function and its expression can be obtained from experiment. Therefore, $v_c = g(f/\phi_0)$. It indicates that $v_c$ can be controlled according to $g(f/\phi_0)$ such that $\phi_0 \Delta R$ is a triangular wave $f$ and, thus, ($\phi_1-\phi_2$) is a triangular wave. Alternatively, a feedback control system can be used to adjust the control voltage according to a measured feedback signal, such as the amplitude of the output signal, such that the output signal is a square waveform or a triangular waveform.

From the configuration prospective, the electromagnetic (EM) power converter is an electromagnetic device containing one or multiple modules for variable-frequency, variable-amplitude and/or variable-waveform AC-AC electric power conversion, in which each module is a magnetic circuit that includes magnetic cores, controllable magnetic flux valves, and coil windings wrapped on magnetic cores. The number of modules in an EM power converter can be one, two, three or more dependent on the specific design. The number of core legs in each EM power converter module can be one, two, three or more dependent on the specific design as well. In the above, three specific structures of the EM power converter module containing three legs, four legs, and nine legs are described. However, the EM power converter can also have other structures.

The working principle of the EM power converter is based on magnetic flux modulation and synthesization. The flux modulation and synthesization method is not limited to that described above and depends on the specific structures of the EM power converter. The flux modulation and synthesization methods share the same principle: the magnetic flux through each secondary core leg generated by the source current(s) through the primary winding(s) is modulated by the fluctuating reluctance(s) of magnetic flux valve(s) in the secondary core leg, which is controlled by the time-varying voltage(s) applied to the magnetic flux valve(s) by a driver circuit; the modulated magnetic fluxes in different secondary core legs are then synthesized to form a desired waveform, such as sinusoidal wave, square wave, triangular wave, pulse wave, etc., depending on the input source and the voltages applied to the magnetic flux valves. The magnetic flux modulation determines how the main flux splits and is distributed in the secondary core legs and the synthesized magnetic fluxes determine the final output of the EM power converter.

Structure of Magnetic Flux Valve

The following describes the structure of a magnetic flux valve (e.g., 128 and 130 of FIG. 2A). A magnetic flux valve is a voltage-controlled static magnetoelectric device. As described above, the magnetic flux valve can be used in a magnetic circuit to actively control the magnetic flux through the magnetic circuit. In some implementations, a magnetic flux valve has a laminated structure that includes one or more magnetostrictive layers and one or more piezoelectric layers. Magnetostrictive materials are the materials whose shape or dimension will change when they are magnetized. The piezoelectric layers can be constructed using piezoelectric sheets or piezoelectric fibers. An external control voltage is applied to the piezoelectric layers. The permeability of the magnetostrictive layers will change when the external control voltage applied to the piezoelectric layers changes, which is referred to as the converse magnetoelectric effect. A permeability change of the magnetic flux valve will lead to a change of the reluctance of the magnetic flux valve and the reluctance of the magnetic circuit containing the magnetic flux valve and, therefore, will lead to a change of the magnetic flux or its distribution in the magnetic circuit. Based on this principle, a magnetic flux valve can be used to regulate the reluctance of a magnetic circuit and, therefore, control the magnetic flux in the magnetic circuit. This is achieved by regulating the external control voltage applied to the magnetic flux valve. This feature can be used for converting alternating current (AC) electric power from one frequency/amplitude/waveform to another frequency/amplitude/waveform. In the following, the concept of magnetic flux valve is first introduced, followed by a description of two feasible structures of the magnetic flux valve. The working principles of the magnetic flux valve are then discussed.

Magnetoelectric materials have electric (magnetic) polarization that can be changed by changing the external magnetic (electric) field applied to the materials. This is called the magnetoelectric (converse magnetoelectric) effect. In some implementations, compound multiphase magnetoelectric materials can gain a much stronger magnetoelectric effect than single-phase magnetoelectric materials.

Figure 15:
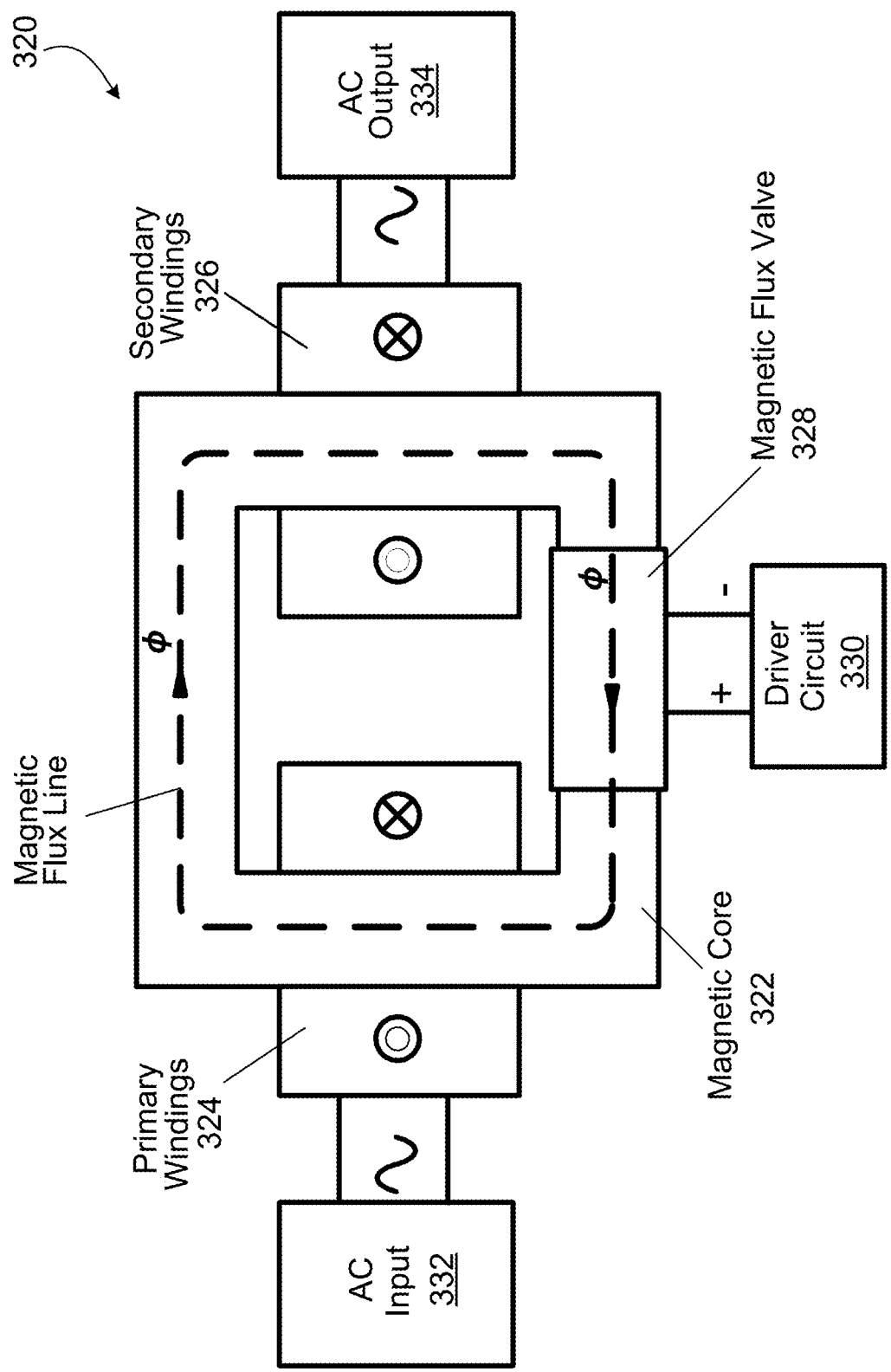
FIG. 15 is a diagram of an exemplary magnetic circuit containing a magnetic flux valve.

Referring to FIG. 15, a magnetic circuit 320 includes a magnetic core 322, a primary winding 324 and a secondary winding 326 wrapped around the magnetic core 322, and a magnetic flux valve 328. The magnetic flux valve 328 can be located anywhere in the magnetic loop, e.g., outside the windings, as shown in FIG. 15, or inside the windings. When the primary winding 324 is connected to an AC source 332 (i.e., the AC input), closed-loop magnetic flux will be produced and flow through the magnetic core 322 and the magnetic flux valve 328. Similar to the case where a water valve controls the fluid flux through a pipe, the magnetic flux valve 328 is capable of continuously controlling the flow of the magnetic flux through the magnetic loop. This is achieved by controlling the voltage applied to the magnetic flux valve 328, which is supplied by a driver circuit 330 connected with the magnetic flux valve 328. The secondary winding 326 provides an AC output 334.

Figure 17A:
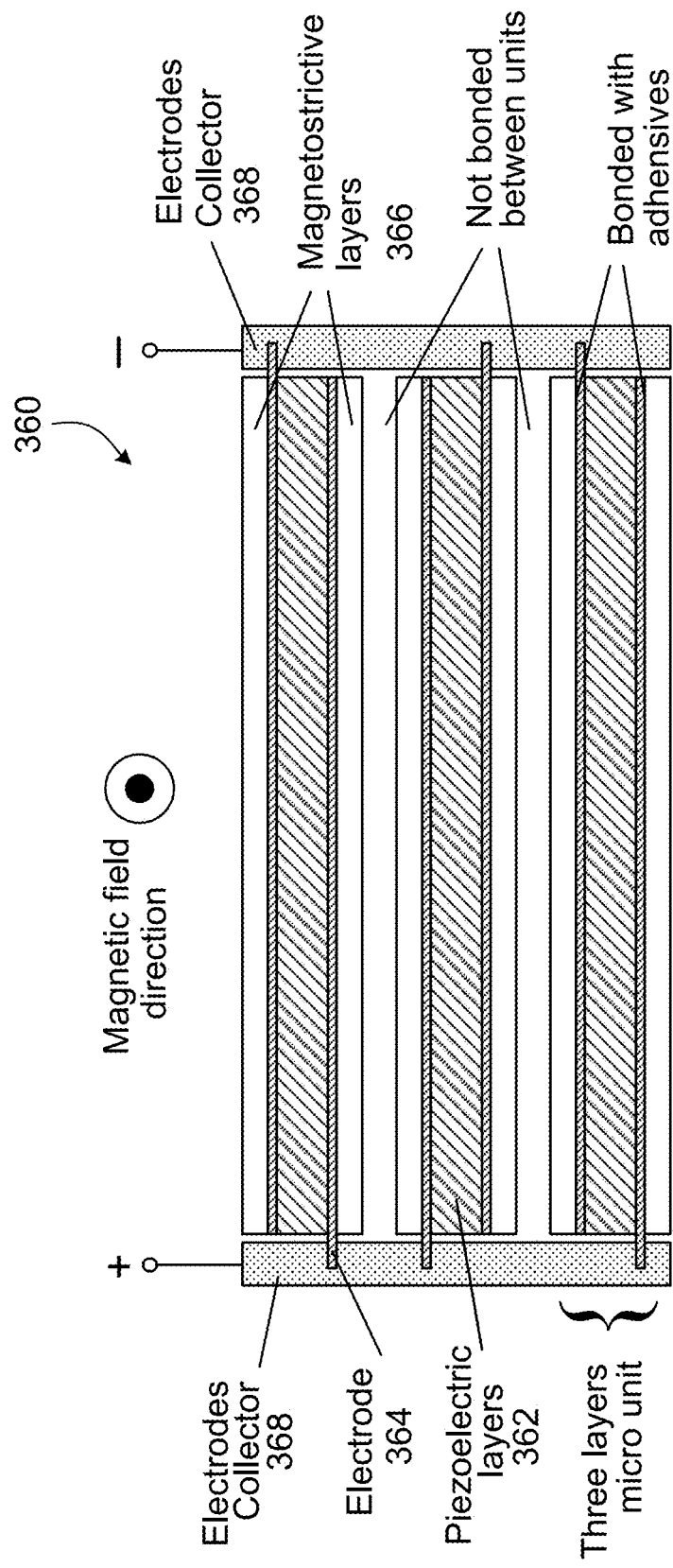
FIGS. 17A and 17B are diagrams showing a side view and a three-dimensional view, respectively, of a second exemplary structure of a magnetic flux valve.
Figure 17B:
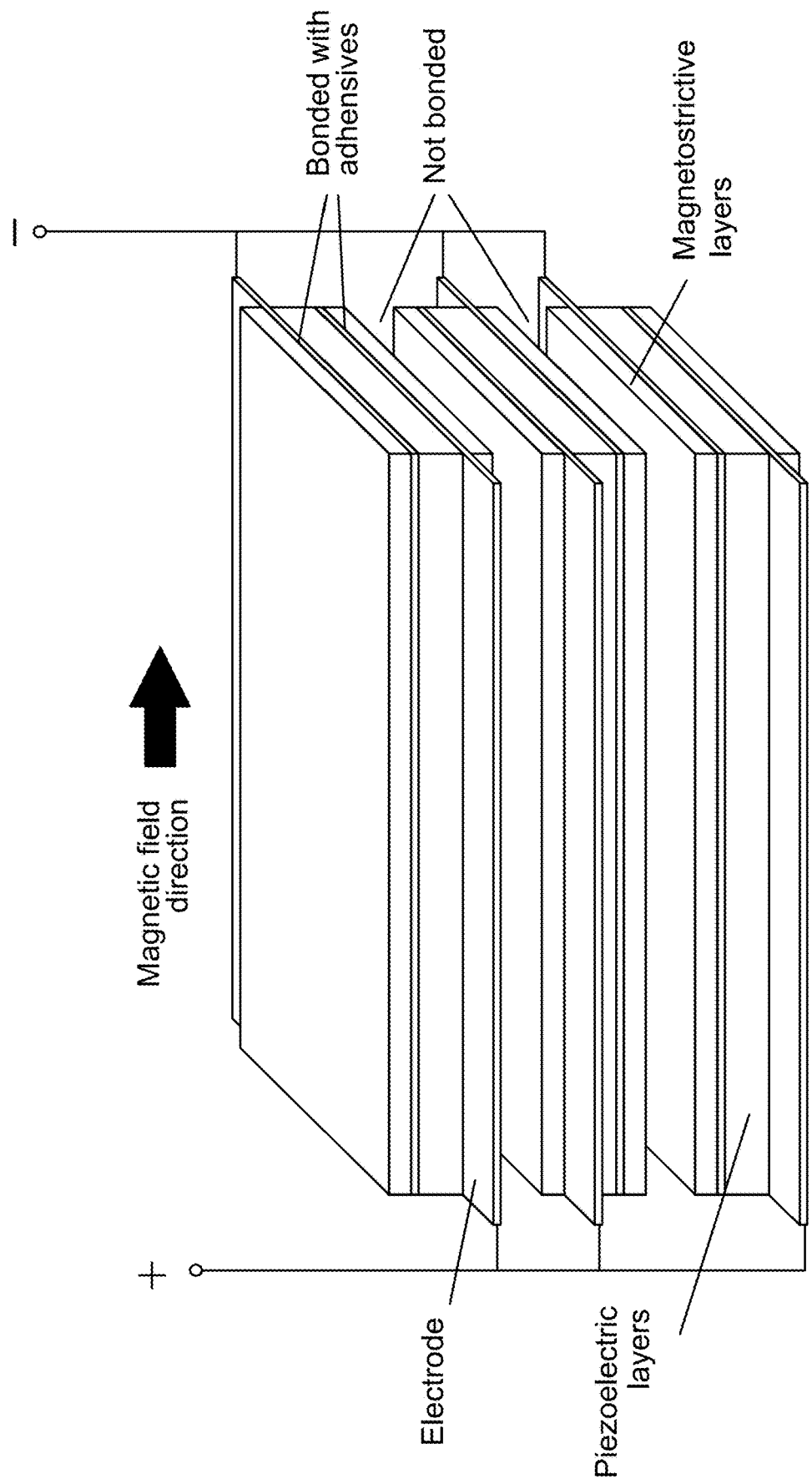

Two feasible structures of the magnetic flux valve 328 are described below. One example is shown in FIGS. 16A and 16B, a second example is shown in FIGS. 17A and 17B. The two structures take advantage of the converse magnetoelectric effect. However, the structure of the magnetic flux valve is not limited to these two. The magnetic flux valve 328 can also have other structures with a controllable permeability.

Referring to FIGS. 16A and 16B, in some implementations, a magnetic flux valve 340 has a laminated structure of two different types of layers made of magnetostrictive materials 342 and piezoelectric materials 344, respectively. The piezoelectric layers 344 can be made by using thin piezoelectric (e.g., piezo ceramic) sheets or one-direction-aligned piezoelectric fibers. Materials that can be used as the piezoelectric layers include, e.g., lead zirconate titanate (PZT) ceramic sheets or plates, PZT fibers, polyvinylidene fluoride (PVDF) films, and PMN-PT [$Pb(Mg_{1/3}Nb_{2/3})O_3$—$PbTiO_3$] single crystals.

The magnetostrictive layers 342 can be made by using amorphous metal alloy ribbons or foils, such as Metglas iron-based alloy ribbons (or foils) or other materials (such as Terfenol-D ($Tb_{0.30}Dy_{0.70}Fe_{1.92}$)) that have magnetostrictive effects. The piezoelectric layers 344 are plated with electrodes 346 on both sides. The electrodes 346 can be formed by using a solid pattern or an interdigitated (ID) pattern.

In the example of FIGS. 16A, 16B, the piezoelectric layers 344 are made of thin piezoelectric sheets with solid-pattern electrodes 346 on both sides. The electrodes 346 are connected to two electrode collectors 348 on both sides of the layers using leads or conductive foils. Then, the piezoelectric layers 344 and the magnetostrictive layers 342 are placed alternatively. Depending on the specific design of the magnetic flux valve 340, these layers can be bonded together with adhesives 350 or stacked in a confined space without bonding. In the former case, the adhesives 350 can be cyanoacrylate adhesives, epoxy resin, or any other type of materials which can perform such a bonding function. In the latter case, the layers can be stacked together tightly in a confined space with a fixed volume. The adjacent electrodes 346 have the same voltage polarity and are connected to the same electrode collector 348. The two electrode collectors 348 are the positive and negative voltage terminals of the magnetic flux valve and will be connected to the driver circuit 330 (FIG. 15). The polarities of the two electrode collectors 348 can be exchanged depending on the specific application. The circle with a dot in FIG. 16A indicates the direction of the magnetic field (flux line). The numbers of the piezoelectric layers and the magnetostrictive layers are dependent on the specific design of the magnetic flux valve.

Referring to FIGS. 17A and 17B, in some implementations, a magnetic flux valve 360 includes piezoelectric layers 362 in which each side of a piezoelectric layer 362 is plated with an electrode 364 and then bonded with a magnetostrictive layer 366. The three layers (two magnetostrictive layers 366 plus a piezoelectric layer 362) form a micro unit. Several micro units are stacked together without bonding. The adjacent electrodes 364 in any two adjacent micro units have the same voltage polarity and are connect to the same electrode collector 368. The number of the micro units is determined by the specific design of a magnetic flux valve 360. The two electrode collectors 368 are the positive and negative voltage terminals of the magnetic flux valve 360 and will be connected to the driver circuit 330 (FIG. 15). The circle with a dot in FIG. 17A indicates the direction of the magnetic flux.

Figure 18:
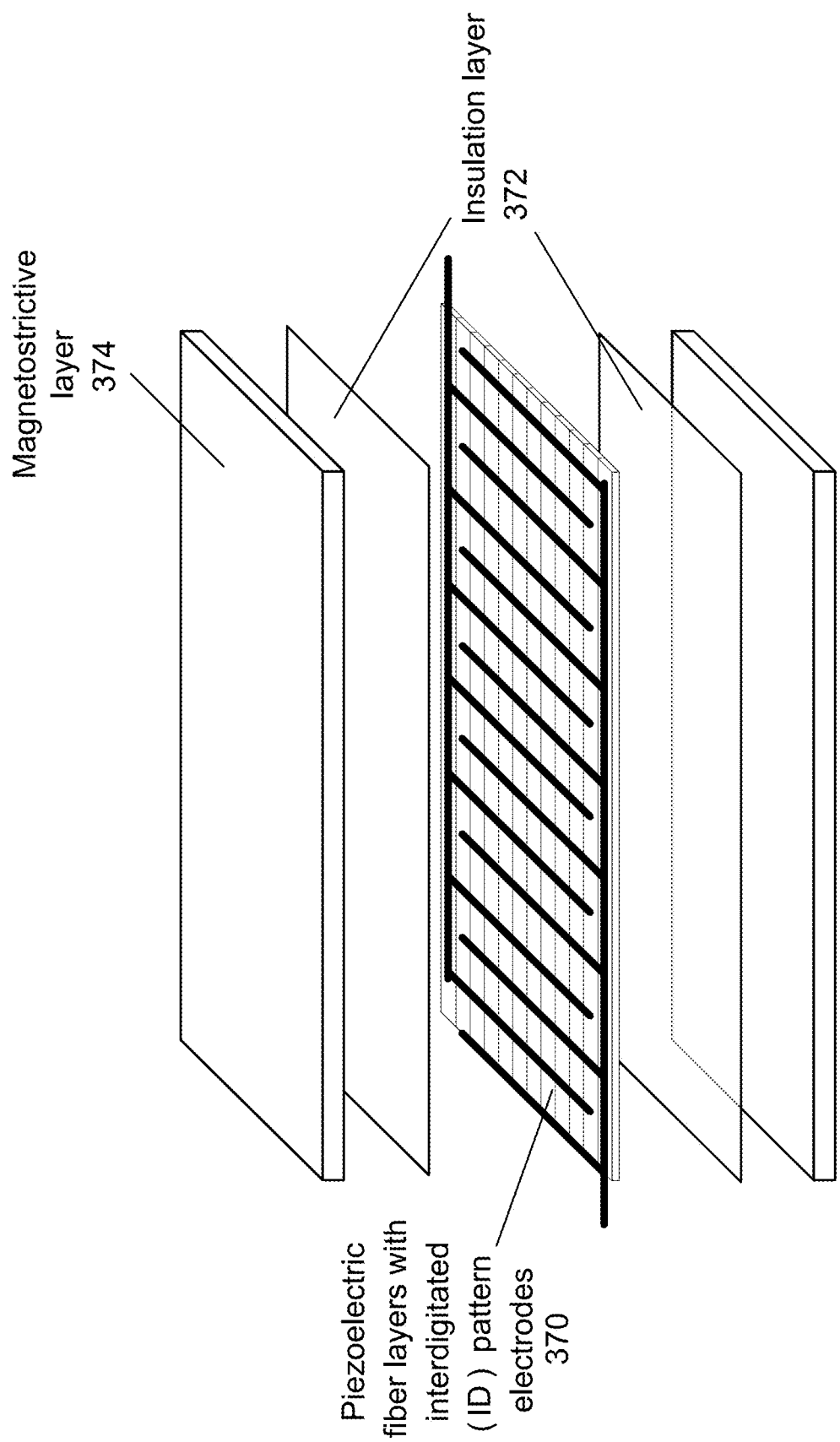
FIG. 18 is a diagram of a piezoelectric layer constructed by using piezoelectric fibers coupled to an interdigitated-pattern electrode.

The piezoelectric layers 344, 362 in the structures shown in FIGS. 16A and 17A can be made by using thin piezoelectric sheets with solid-pattern electrodes. Referring to FIG. 18, the piezoelectric layers can also be made by using piezoelectric fibers with an interdigitated-pattern electrode 370. The piezoelectric fibers are oriented along the longitudinal axis of the laminate. The interdigitated-pattern electrode 370 can be plated on either side or both sides of each piezoelectric fiber layer. When using piezoelectric fibers as the piezoelectric layers in the structures shown in FIGS. 16A and 17A, respectively, a thin insulation layer 372 can be added between each piezoelectric fiber layer and the adjacent magnetostrictive layer 374 bonded with it, as shown in FIG. 18.

Figure 19:
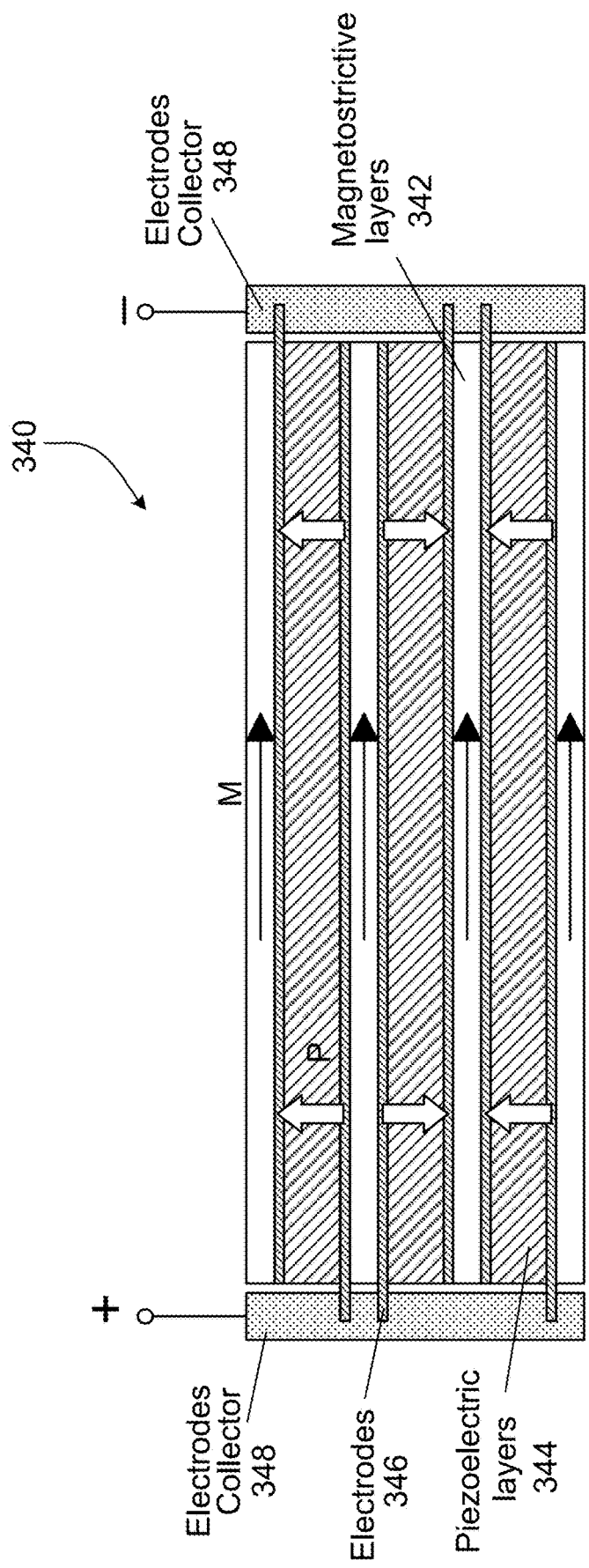
FIG. 19 is a diagram showing exemplary directions of magnetic polarization and electric polarization in a magnetic flux valve with piezoelectric sheets.

The following describes the working principles of the magnetic flux valve. The magnetic flux valve takes advantage of the converse magnetoelectric effect caused by the cross interaction between the piezoelectric phase and the magnetic phase in the magnetoelectric materials. The cross interaction is an elastic interaction that couples the electric polarization in the piezoelectric materials and the magnetic polarization in the magnetostrictive materials. FIG. 19 shows the directions of the magnetic polarization (M) and electric polarization (P) inside the magnetic flux valve 340 shown in FIG. 16A. When an electric field is applied to the piezoelectric materials 344, electric polarization is generated in the piezoelectric materials 344 and cause the shape of the piezoelectric materials 344 to change. This is referred to as the inverse piezoelectric effect. In the magnetic flux valve 340, the external control voltage applied to the piezoelectric layers 344 by the driver circuit 330 will generate an electric field across the piezoelectric layers 344. The electric field will generate electric polarization in the piezoelectric layers 344, which will change the shape of the piezoelectric layers 344 in the vertical direction. Since the piezoelectric layers 344 and the magnetostrictive layers 342 are bonded together using adhesives or stacked together tightly in a confined space with a fixed volume, the shape changes in the piezoelectric layers 344 will generate strain, which will be transferred to the magnetostrictive layers 342 immediately. Then, the magnetization of the magnetostrictive materials 342 in the horizontal direction will be altered by the strain. As a consequence, the permeability of the magnetostrictive layers 342 will be reduced.

Figure 20:
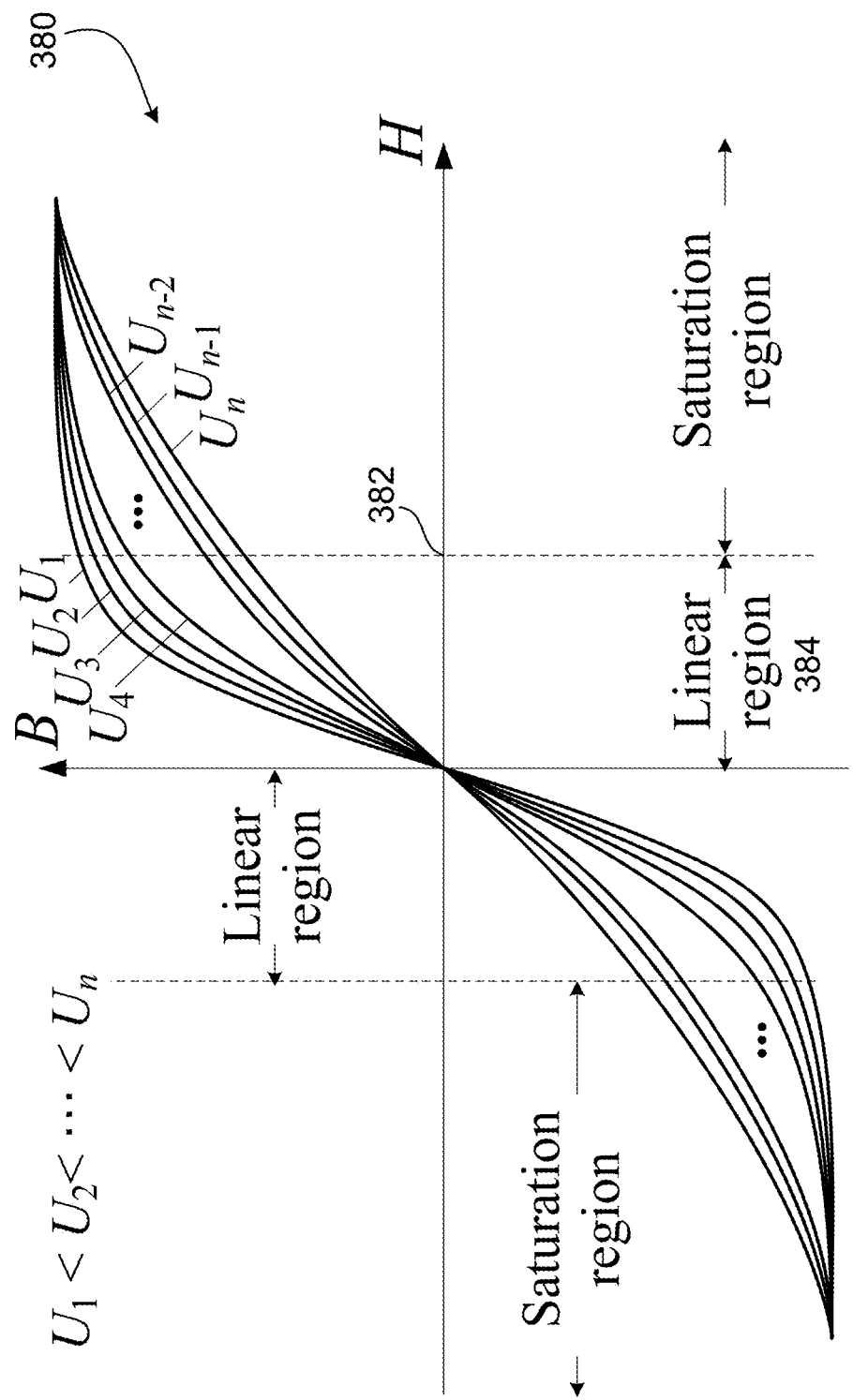
FIG. 20 is a graph showing variations of the magnetization curves of a magnetic flux valve when different control voltages are applied to the magnetic flux valve.

FIG. 20 is a graph 380 showing the resulting magnetization curves of the magnetic flux valve 340 when an external control voltage at different levels of $U_1, U_2, U_3, \ldots,$ and $U_n$ is applied separately to the magnetic flux valve 340, where $0 < U_1 < U_2 < U_3 < \ldots < U_n$. The horizontal axis H denotes the magnetic field strength. The vertical axis B denotes the magnetic flux density. The slope of the B-H curve (i.e., magnetization curve) represents the permeability μ of the magnetic flux valve:

$$\mu = \frac{B}{H} \tag{55}$$

As shown in FIG. 20, on the B-H curves, the magnetic flux density B saturates when the magnetic field strength H increases over a certain value 382. The magnetic flux valve mainly works in the unsaturated region 384 (i.e., linear region) of the B-H curves. When the voltage applied to the magnetic flux valve increases, the linear region 384 of the B-H curve becomes wider; while the slope of the curve in the linear region 384 becomes smaller, meaning a reduction in the permeability u. In the linear region 384, the relation of the permeability u and the applied voltage U can be expresses as:

$$\mu = \mu_0 - f(U) \tag{56}$$

where $\mu_0$ denotes the original permeability of the magnetic flux valve when there is no external control voltage applied, U is the external control voltage value, and $f(U)$ is the function of permeability variation with respect to the voltage U. The function $f(U)$ can be either linear or nonlinear, which depends on the structure of and the materials used in the magnetic flux valve.

When the voltage U increases (decreases), the value of the function $f(U)$ increases (decreases) as well; while the permeability u decreases (increases). Thus, the permeability of the magnetic flux valve can be regulated continuously by changing the external control voltage. When the permeability of the magnetic flux valve changes, the reluctance of the magnetic flux valve and, therefore, the total reluctance of the magnetic circuit containing the magnetic flux valve, will change as well. The magnetic flux φ in a magnetic circuit is determined by the magnetomotive force F and the total magnetic reluctance R of the magnetic circuit as follows:

$$\phi = \frac{F}{R} \tag{57}$$

where F is generally determined by the current through and the turn number of the windings of the magnetic circuit. Therefore, the magnetic flux in the magnetic circuit can be regulated by changing the total reluctance R of the magnetic circuit via controlling the permeability (therefore the reluctance) of the magnetic flux valve. This can be achieved by controlling the external control voltage applied to the magnetic flux valve by the driver circuit, as described by Equation 56.

Figure 28:
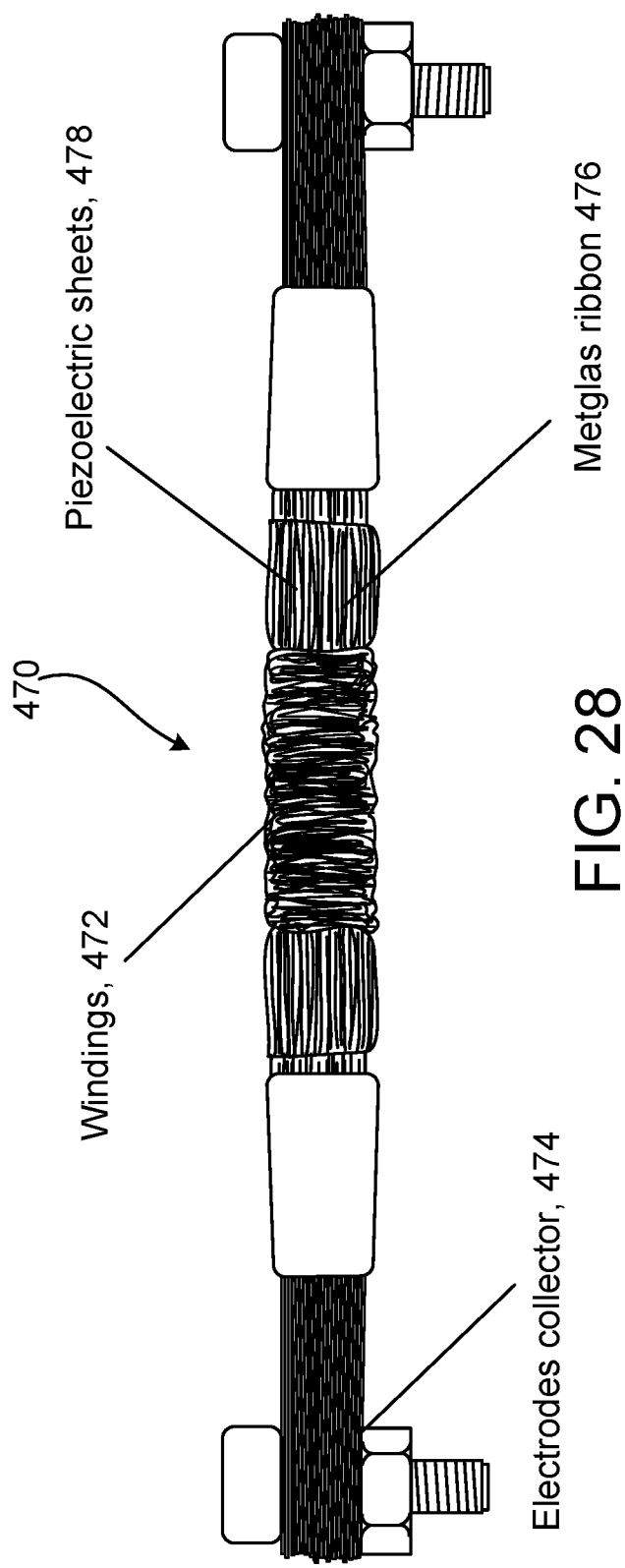
FIG. 28 is a photo of an exemplary magnetic flux valve.

FIG. 28 is a photo of an exemplary magnetic flux valve 470 that includes electrode collectors 474, magnetostrictive layers 476, and piezoelectric layers 478. Each magnetostrictive layer 476 includes a Metglas iron-based alloy ribbon, and each piezoelectric layer 478 includes a lead zirconate titanate (PZT) sheet. Twenty PZT sheets and forty Metglas ribbons are bonded together layer by layer using ethyl cyanoacrylate adhesives with the configuration in FIGS. 16A and 16B. Each layer is 8 mm in width and 18 mm in length. Nickel foil electrodes attached on both sides of the PZT sheets are lead out and crimped by two screws and bolts to form the two electrode collectors 474. An external control voltage is applied to the electrode collectors 474. Windings 472 are wrapped on the magnetic flux valve 470 for measuring the permeability of the valve.

Figure 29:
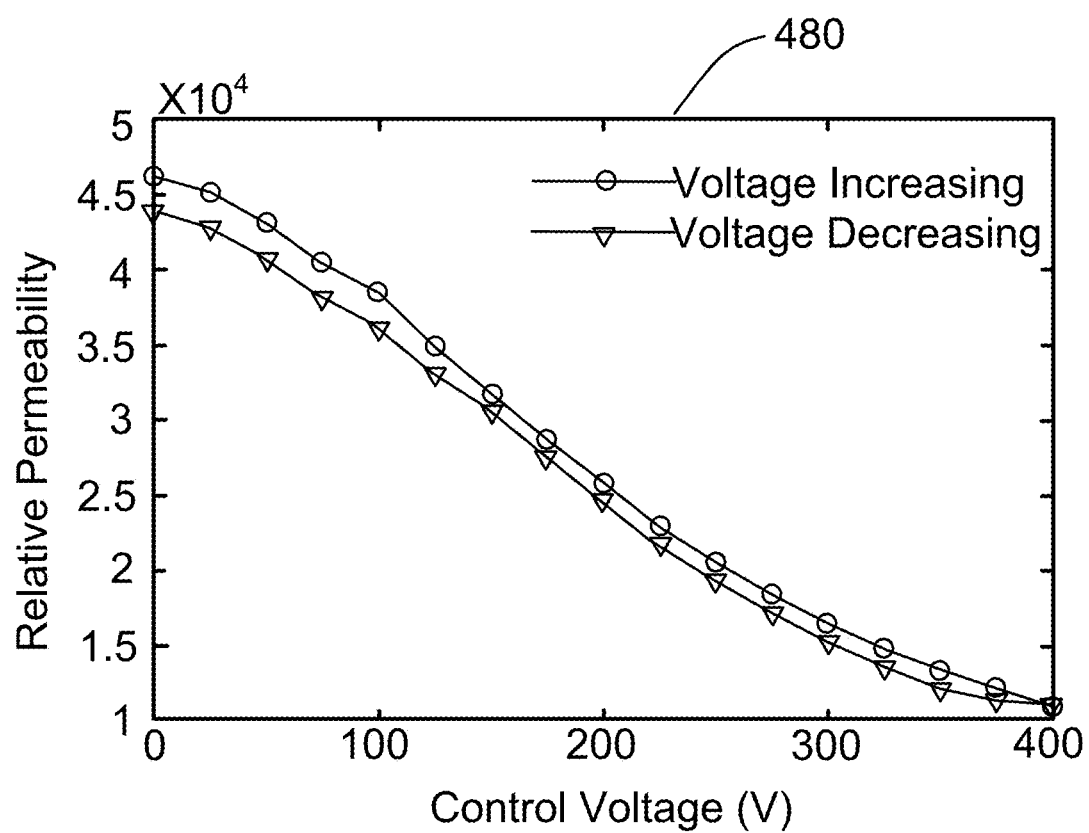
FIG. 29 is a graph showing the relationship between the relative permeability of the magnetic flux valve versus the control voltage applied to the valve.

FIG. 29 is a graph 480 showing the relationship between the relative permeability of the magnetic flux valve 470 in FIG. 28 versus the control voltage applied to the magnetic flux valve 470. Experiments were conducted by applying a control voltage to the electrode collectors 474, and measuring the relative permeability of the magnetic flux valve. The relative permeability of the magnetic flux valve (which is determined at least in part by the relative permeability of the amorphous alloy ribbons in the magnetic flux valve) decreased from 46300 to 11065 when the control voltage increased from 0 V to 400 V, showing a 76.1% variation range with respect to the maximum permeability at 0 V. On the other hand, when the control voltage decreased from 400 V to 0 V, the relative permeability increased from 11065 to 43910. Due to the piezoelectric hysteresis property of the PZT sheets, the permeability variation curves are slightly different when increasing and decreasing the control voltage.

Stacking Factor and Permeability Variation Range

Figure 30:
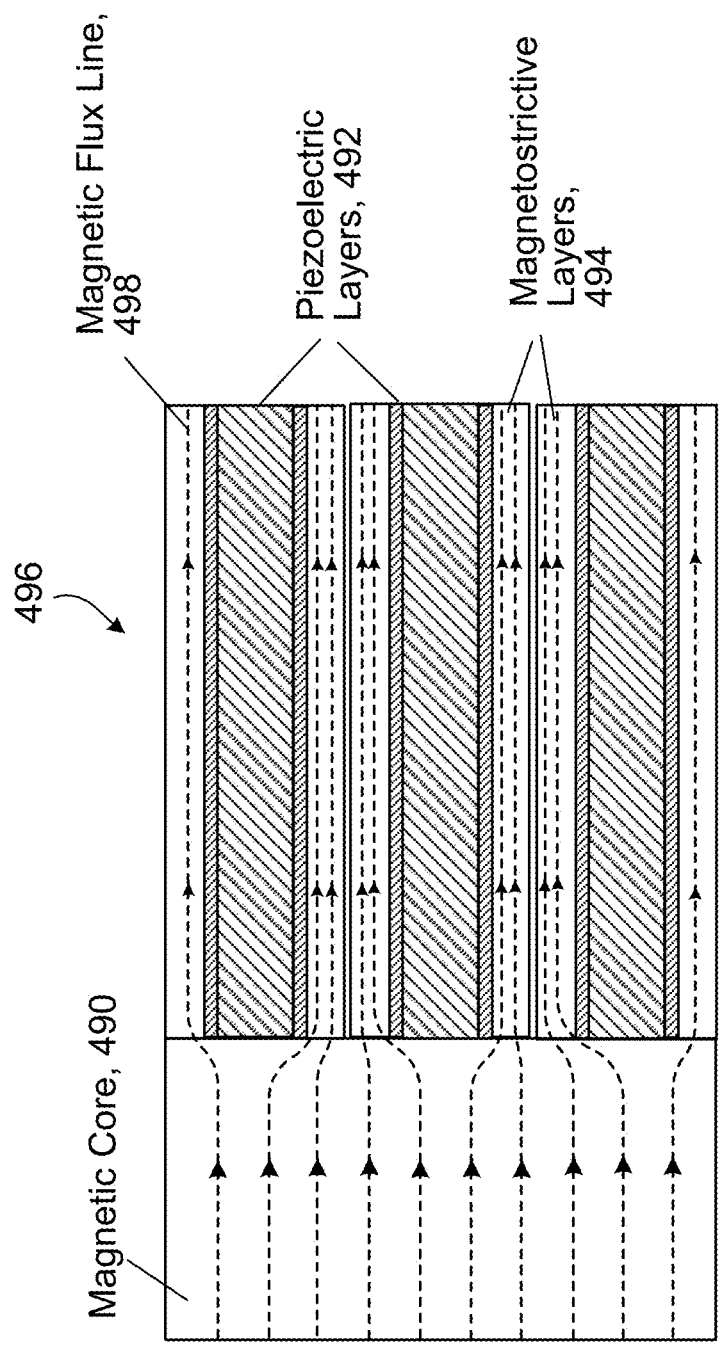
FIG. 30 is a diagram showing the magnetic flux line distribution in a magnetic flux valve and an adjacent magnetic core.

FIG. 30 is a diagram showing the magnetic flux line 498 distribution in a magnetic flux valve 496 and an adjacent magnetic core 490. The piezoelectric layers 492 of the magnetic flux valve 496 can be made of non-magnetic substances, so the magnetic flux flows mainly through the magnetostrictive layers 494 of the magnetic flux valve 496. Therefore, the total cross-sectional area of the magnetostrictive layers 494 determines the equivalent cross-sectional area of the magnetic flux valve 496 for the magnetic flux to flow through.

In some implementations, each magnetostrictive layer in FIGS. 16A, 16B, 17A, and 17B can be formed by using multiple laminated amorphous (e.g., Metglas iron-based) alloy ribbons that are stacked together. Each piezoelectric layer can be formed using a PZT sheet. The thicknesses of one PZT sheet and one amorphous alloy ribbon are represented by the parameters dp and dm, respectively. The numbers of the PZT sheets and amorphous alloy ribbons used to form the magnetic flux valve are represented by parameters np and nm, respectively. Then, the total thicknesses of the PZT sheets (i.e., piezoelectric layers) and amorphous alloy ribbons (i.e., magnetostrictive layers) are dp×np and dm×nm, respectively. The stacking factor (also known as lamination factor) ks is defined as ks=dm×nm/(dm×nm+dp×np). The value of ks should be as high as possible to increase the effective cross-sectional area of the magnetic flux valve for the magnetic flux to flow through. In addition to the voltage, increasing the effective cross-sectional area of the magnetic flux valve such that more magnetic flux can flow through also increases the maximum current that can flow through the primary windings. Therefore, increasing the effective cross-sectional area of the magnetic flux valve such that more magnetic flux can flow through will increase the power capacity of the EM power converter. For example, the thickness of a single PZT sheet is usually from 100 μm to 300 μm and the thickness of one layer of amorphous alloy ribbon is usually 25 μm. If a magnetostrictive layer that includes multiple stacked amorphous alloy ribbons is bonded with one PZT sheet on each side, ks increases while the permeability variation range of the magnetic flux valve decreases because the deformation force produced by the PZT sheet is distributed into multiple amorphous alloy ribbons.

Table I shows the experimental results of the permeability variation ranges of a magnetic flux valve when the stacking factor is changed by stacking different numbers of amorphous alloy ribbons together to form the magnetostrictive layer. In this example, the thicknesses of one PZT sheet and one amorphous alloy ribbon are 190 μm and 25 μm, respectively. If one piece of amorphous alloy ribbon is bonded on each side of each PZT sheet, the stacking factor is (25+25)/(25+25+190)=0.208. The permeability decreases 76.1% as the control voltage increases from 0 V to 400 V. As shown in Table 1 below, the permeability variation range decreases quickly as the stacking factor increases. This is because the stress generated by each PZT sheet is transferred to multiple pieces of amorphous alloy ribbon. As a consequence, the permeability variation of each piece of amorphous alloy ribbon decreases. Therefore, the design of the magnetic flux valve should consider the trade-off between stacking factor and permeability variation range.

TABLE 1

PERMEABILITY VARIATION RANGES
AT DIFFERENT STACKING FACTORS

| Number of amorphous ribbons on each side of one PZT sheet | Stacking factor $k_s$ | Permeability variation range* |
|---|---|---|
| 1 | 0.208 | 76.1% |
| 2 | 0.345 | 32.3% |
| 3 | 0.441 | 18.0% |

*Permeability variation range is the ratio of permeability variation (when the control voltage is increased from 0 V to 400 V) over the original permeability (when the control voltage is 0 V) of the magnetic flux valve ($\Delta\mu/\mu$).

Figure 31:
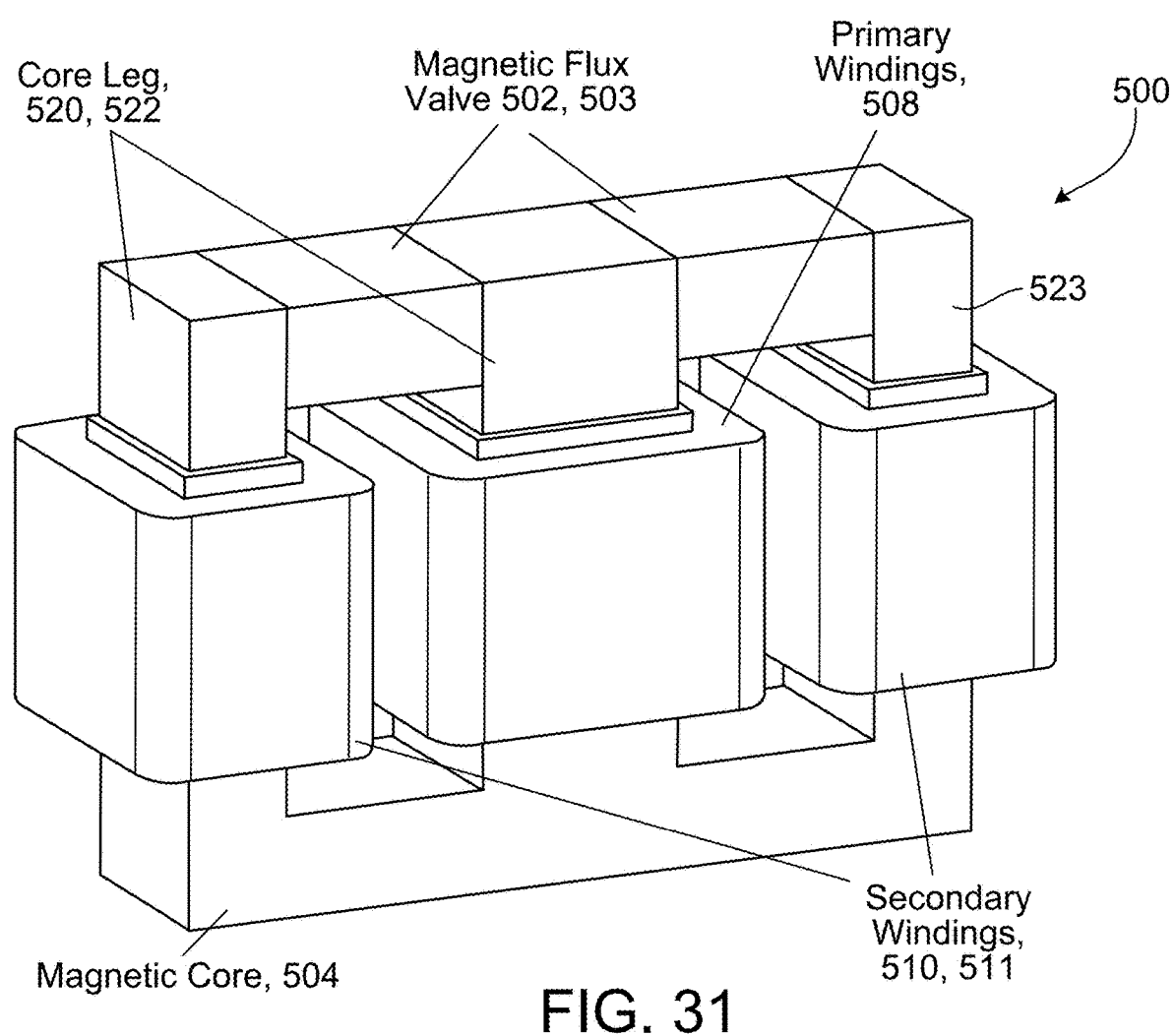
FIG. 31 is a diagram showing a compact configuration of an adjustable-voltage-ratio (AVR) transformer that has two magnetic flux valves.

Application of the Magnetic Flux Valve: Adjustable-Voltage-Ratio (AVR) Transformer FIG. 31 is a diagram showing a novel compact configuration of an adjustable-voltage-ratio (AVR) transformer 500 that has two magnetic flux valves 502, which is similar to a special case of the electromagnetic (EM) power converter. The AVR transformer 500 includes a magnetic E core 504 with three core legs 520, 522, and 523, a primary winding 508 on the central core leg, a secondary winding 510 or 511 on each of the side core legs, and a magnetic flux valve 502 or 503 between each of the two side (i.e., secondary) core legs and the central core leg. The permeability of each magnetic flux valve 502 or 503 can be altered by regulating the amplitude of the control voltage applied on the magnetic flux valve 502 or 503. As a consequence, the reluctance of the magnetic flux valve 502 or 503 changes and, therefore, the magnetic fluxes through the legs of the magnetic core 504 can be regulated by the magnetic flux valves 502 and 503.

Figure 32:
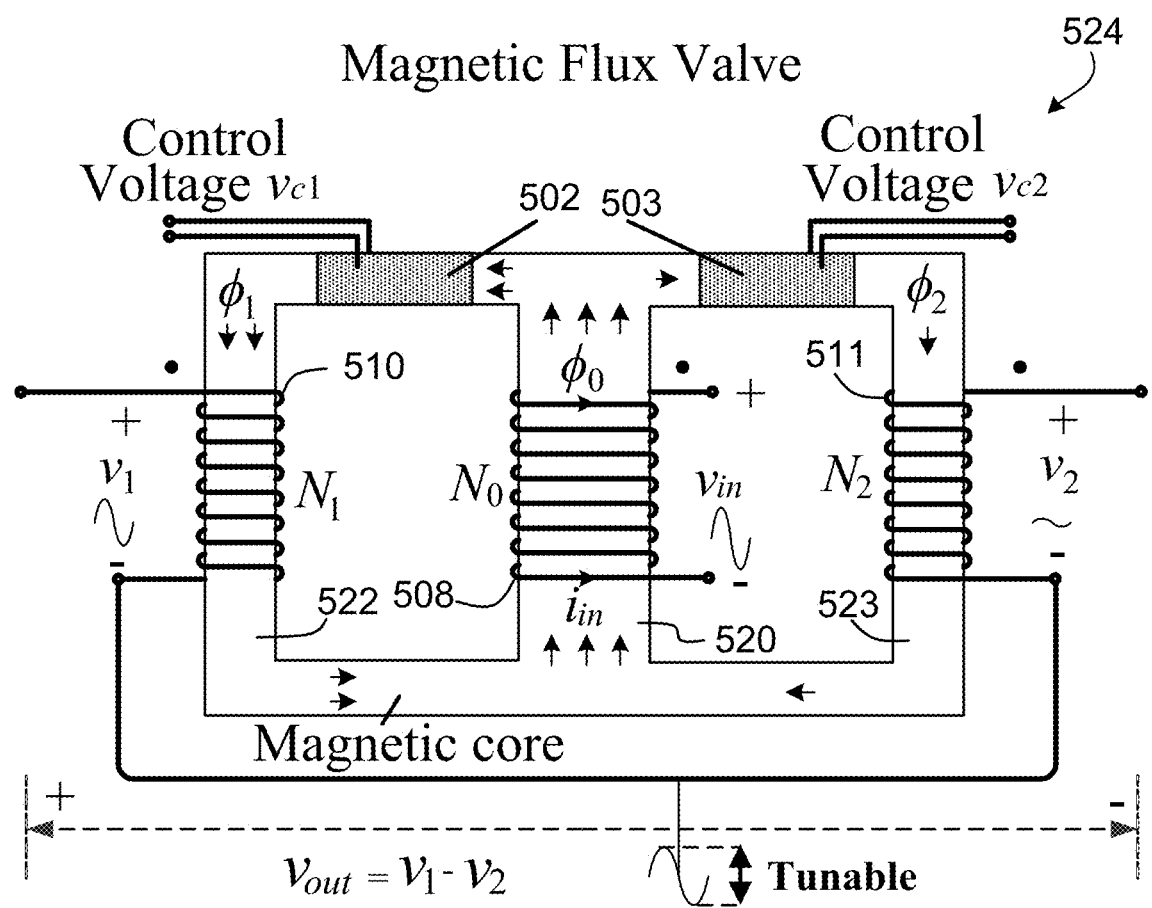
FIG. 32 is a diagram showing the magnetic circuit of the AVR transformer in FIG. 31.

FIG. 32 shows the magnetic circuit 524 of the AVR transformer 500 in FIG. 31. In this example, the primary winding 508 with No turns is located on the central core leg 520 and connected to an AC voltage source $v_{in}$ as the input. The two secondary windings 510, 511 are located on the two side core legs 522, 523 and connected in series to output the voltage $v_{out}$. The turn numbers of the two secondary windings 510, 511 are $N_1$ and $N_2$, respectively. The two magnetic flux valves 502, 503 are connected with a driver circuit (not shown in the figure), which supplies control voltages $v_c$, and $v_{c2}$ to the magnetic flux valves 502 and 503 to regulate their permeability. As shown in FIG. 32, the two output terminals of the transformer 500 are the two dotted terminals of the two secondary windings 510, 511 with the same polarity. Therefore, the output $v_{out}=v_1-v_2$, where $v_1$ and $v_2$ are the voltages induced by the secondary windings 510, 511 on the left and right core legs 522, 523, respectively. The parameter $i_{in}$ is the exciting current through the primary winding 520, and $\phi_0$ is the magnetic flux generated by the current $i_{in}$ (called the main flux). The main flux $\phi_0$ splits into two parts, which flow through the two side core legs 522, 523 respectively. The magnetic fluxes $\phi_1$ and $\phi_2$ ($\phi_1+\phi_2=\phi_0$) through the two side core legs 522, 523 will change when the permeabilities of the two magnetic flux valves 502, 503 are changed. The distribution of the magnetic flux in the left and right core legs 522, 523 depends on the reluctances of the two side core legs 522, 523.

Figure 33:
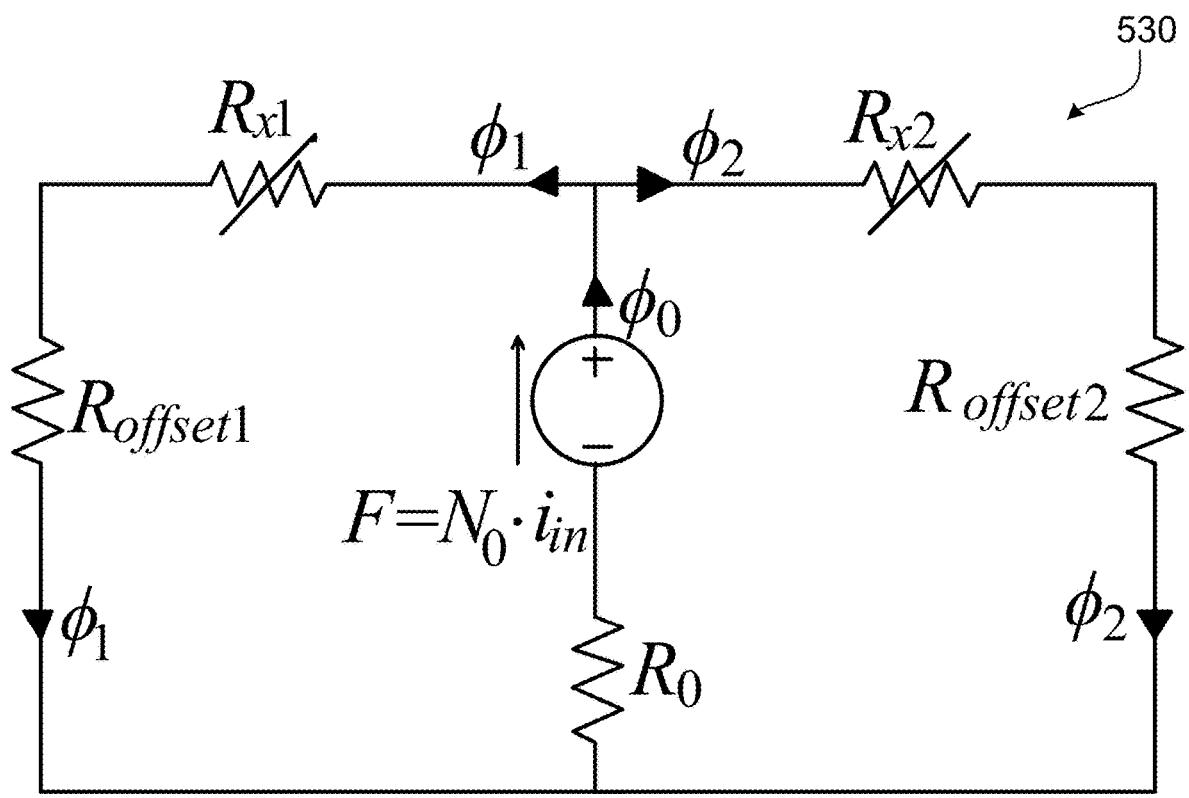
FIG. 33 is a diagram showing the equivalent circuit of the AVR transformer.

FIG. 33 shows the equivalent circuit 530 of the AVR transformer 500, where $R_0$ is the equivalent reluctance of the central core leg 520 wrapped by the primary winding 508; the two variable reluctances $R_{x1}$ and $R_{x2}$ represent the equivalent variable reluctances of the two magnetic flux valves 502, 503; the two fixed reluctances $R_{offset1}$ and $R_{offset2}$ represent the equivalent offset reluctances of the two side core legs 522, 523 and magnetic flux valves 502, 503, which are mainly determined by the magnetic properties of the core legs 522, 523 and the magnetic flux valves 502, 503. Therefore, the total reluctances $R_1$ of the left core leg 522 and $R_2$ of the right core leg 523 are $$R_1 = R_{offset1} + R_{x1} \quad (58)$$

$$R_2 = R_{offset2} + R_{x2} \quad (59)$$

Assume that the primary AC input is a time-varying sinusoidal voltage with the frequency ω and the amplitude $U_{in}$, i.e., $v_{in} = U_{in} \cos \omega t$. Then the main flux $\phi_0$ is $$\phi_0 = -\frac{U_{in}}{N_0 \omega} \sin \omega t \quad (60)$$

Therefore, the magnetic flux through the two secondary core legs 522, 523 can be expressed as:

$$\phi_1 = \phi_0 \frac{R_2}{R_1 + R_2} \quad (61)$$

$$\phi_2 = \phi_0 \frac{R_1}{R_1 + R_2} \quad (62)$$

The voltages inducted by the two secondary windings 510, 511 are $v_1 = -N_1 \cdot (d\phi_1/dt)$ and $v_2 = -N_2 \cdot (d\phi_2/dt)$. Therefore, the output voltage $v_{out}$ is $$v_{out} = v_1 - v_2 = -\frac{d}{dt}(N_1 \phi_1 - N_2 \phi_2) = -\frac{d}{dt}\left(\frac{N_1 R_2 - N_2 R_1}{R_1 + R_2} \phi_0\right) \quad (63)$$

By replacing $\phi_0$ with its expression in Equation (60), the output voltage $v_{out}$ in Equation (63) is $$v_{out} = \frac{N_1 R_2 - N_2 R_1}{N_0 (R_1 + R_2)} v_{in} \quad (64)$$

Assume $N_1 = N_2 = N$ and $R_{offset1} = R_{offset2} = R_{offset}$. The voltage ratio $v_{out}/v_{in}$ of the transformer 500 is derived as $$\frac{v_{out}}{v_{in}} = \frac{N}{N_0} \frac{R_{x2} - R_{x1}}{2R_{offset} + R_{x1} + R_{x2}} \quad (65)$$

When the control voltages applied to the two magnetic flux valves 502, 503 are equal ($v_{c1} = v_{c2}$), $R_{x1} = R_{x2}$, $R_1 = R_2$ and, therefore, $\phi_1 = \phi_2$ and $v_{out} = 0$. When the control voltage applied to the left magnetic flux valve 502 is higher than that applied to the right magnetic flux valve 503 ($v_{c1} > v_{c2}$), the left magnetic flux valve 502 has a lower permeability and, therefore, $R_1 > R_2$. In this case, a larger portion of the main flux generated by the current through the primary winding 508 will flow through the right core leg 523. An opposite case ($v_{c1} < v_{c2}$) is that a larger portion of the magnetic flux flows through the left core leg 522 when $R_1 < R_2$. The output voltage $v_{out}$ of the AVR transformer 500 is the differential voltage induced by the two secondary windings 510, 511 and is determined by the difference of the magnetic fluxes in the two side core legs 522, 523 due to the difference of the voltages applied to the two magnetic flux valves 502, 503.

An AVR transformer 500 was developed and tested, in which the left magnetic flux valve 502 was connected with a controllable voltage source and the right magnetic flux valve 503 was not connected to any voltage source. When the control voltage was applied to the left magnetic flux valve 502, the left magnetic flux valve 502 had a lower permeability and a larger portion of the main flux generated by the current through the primary winding 508 flowed through the right core leg 523. By changing the control voltage applied on the left magnetic flux valve 502, the output amplitude of the AVR transformer 500 can be regulated.

Figure 34:
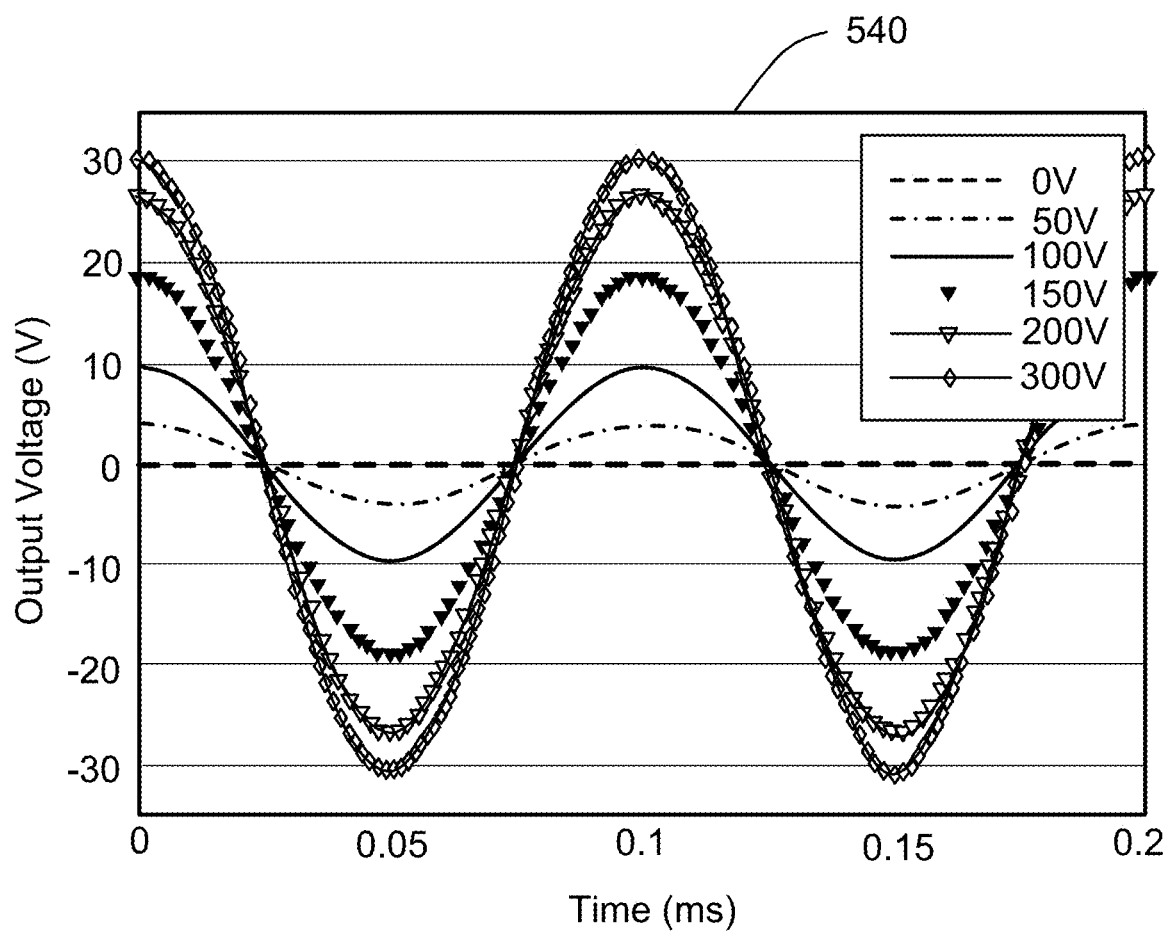
FIG. 34 is a graph that shows the waveforms of $v_{out}$ when different control voltages are applied.

FIG. 34 is a graph 540 that shows the waveforms of $v_{out}$ when different control voltages are applied. The amplitude of $v_{out}$ varies from 0 V to 31.8 V continuously as the control voltage increases from 0 V to 300 V. The input voltage amplitude of this transformer is 15 V. Therefore, the voltage ratio $v_{out}/v_{in}$ of the AVR transformer varies from 0 to 2.12, indicating that it can be both a step-down transformer and a step-up transformer. The AVR transformer 500 has great potential for flexible voltage control in power electronics and electric power grid applications.

Figure 21:
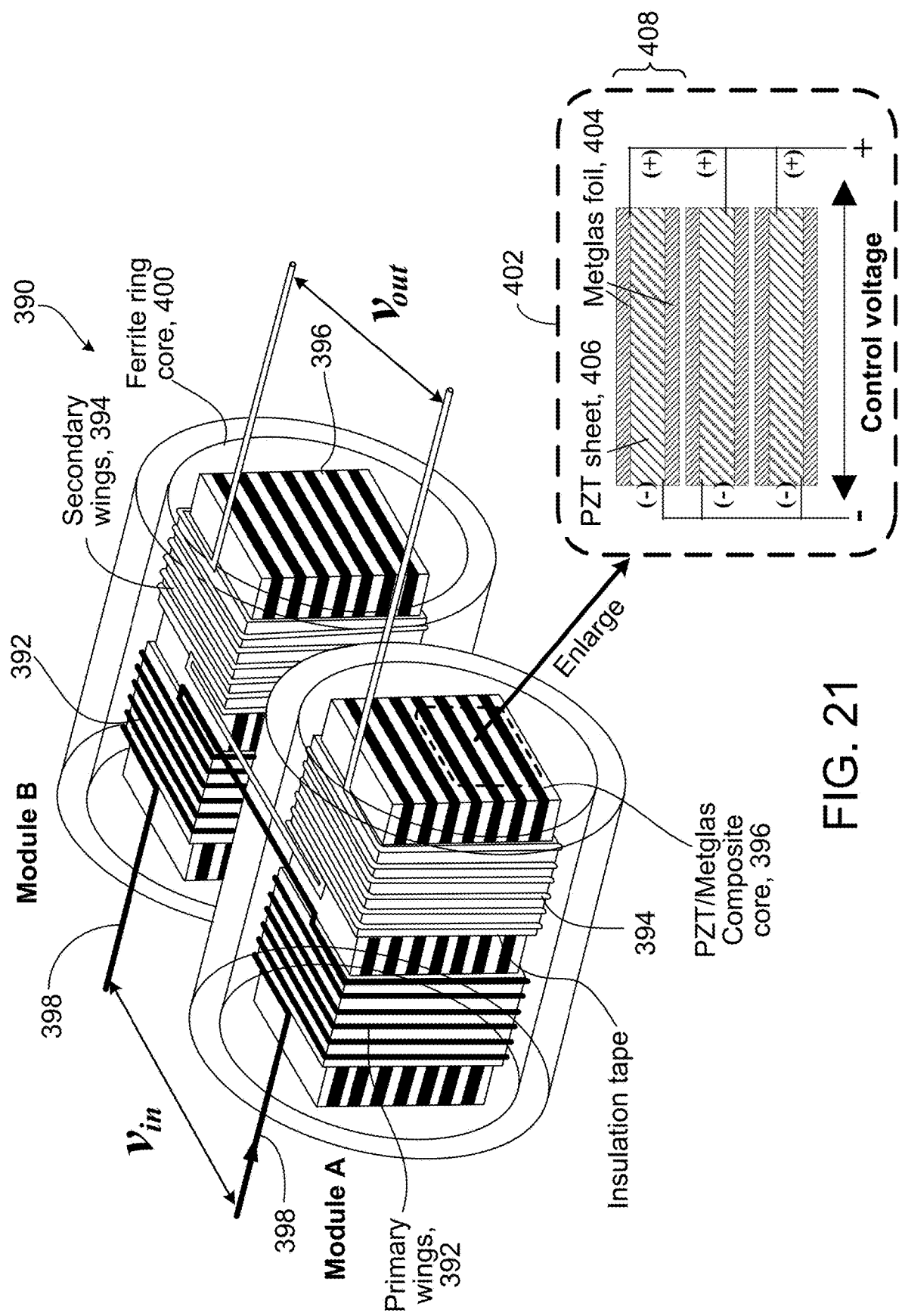
FIG. 21 is a diagram of an exemplary power transformer.

The following describes another example of a power transformer in which the windings are wound around the magnetic flux valves. Referring to FIG. 21, in some implementations, a power transformer 390 includes two modules, each module is a separate transformer with the primary windings 392 and secondary windings 394 wrapped on the same laminated PZT/Metglas composite core 396, which is made of bonded PZT and Metglas layers. The Metglas layers can be, e.g., amorphous magnetic foils (Metglas 2605SA1). The PZT layers can be, e.g., thin piezoelectric sheets (Piezo Systems Inc. PSI-5E4H).

In this example, each PZT layer is 18.1 mm in length and 6.58 mm in width. The thicknesses of the Metglas foil and the PZT sheet are 25 μm and 0.191 mm, respectively. As shown in a diagram 402 (which shows an enlarged portion of the PZT/Metglas composite core 396), two layers of Metglas foils 404 are placed on each side of a PZT sheet layer 406 to form a micro sandwich-type unit 408. The three layers are bonded together with Cyanoacrylate adhesives. Twenty two micro units are stacked together to form a laminated core. The electrodes on the PZT sheets of Module A are led out to form two terminals 398, which are connected with a controllable voltage source. Kapton tapes are wrapped around each PZT/Metglas composite core 396 to provide insulation. A ferrite ring core 400 is placed outside each PZT/Metglas composite core 396 as a shell to provide a complete magnetic circuit for each module.

Figure 22:
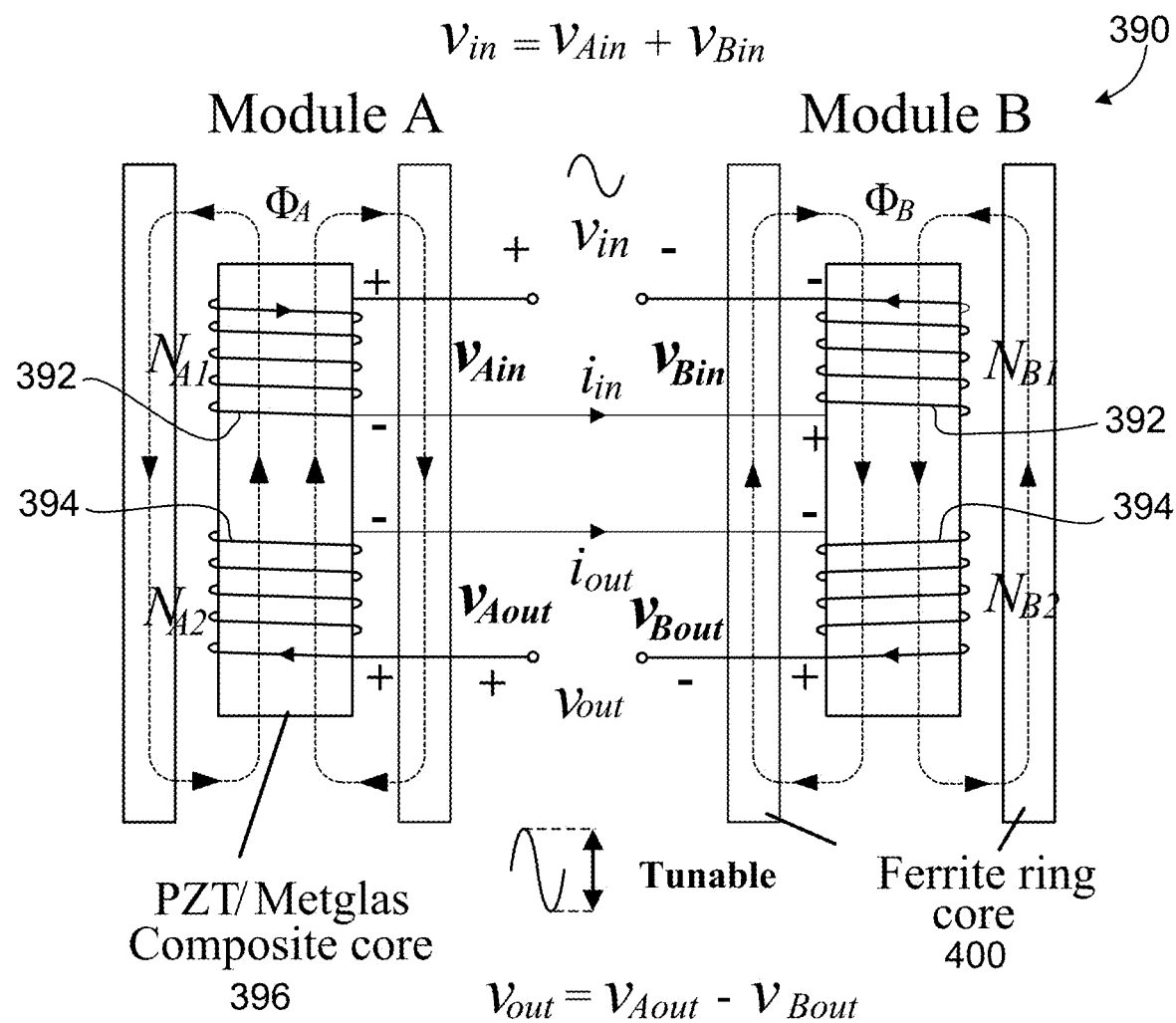
FIG. 22 is a schematic diagram of the power transformer of FIG. 21.

FIG. 22 shows a schematic diagram of the power transformer 390 in FIG. 21, in which $N_{A1}$ and $N_{B1}$ are the turns numbers of the primary windings 392 of Modules A and B, respectively; $N_{A2}$ and $N_{B2}$ are the turns numbers of the secondary windings 394 of Modules A and B, respectively; and $\Phi_A$ and $\Phi_B$ are the magnetic fluxes through the PZT/Metglas composite cores 396 of Modules A and B, respectively.

The primary windings 392 of the two modules are connected in series, e.g., the negative terminal of Module A's primary winding 392 is connected with the positive terminal of Module B's primary winding 392. Therefore, the total input voltage $v_{in}$ is the sum of the input voltages of the two modules, i.e., $v_{in} = v_{Ain} + v_{Bin}$. The secondary windings 394 of the two modules are connected in an opposite way, e.g., the negative terminals of the secondary windings 394 of the two modules are connected together. Therefore, the final output voltage $v_{out}$ is the subtraction of the output voltages of the two modules, i.e., $v_{out}=v_{Aout}-v_{Bout}$.

Because the primary windings 392 of the two modules are connected in series, the exciting currents through them are equal and can be expressed as $$i_{in} = i_A = i_B = \frac{\Phi_A R_{mA}}{N_{A1}} = \frac{\Phi_B R_{mB}}{N_{B1}}, \quad (58)$$

where $i_A$, $i_B$, and $i_{in}$ are the primary exciting currents (i.e., the current through the primary windings 392) of Module A, Module B, and the power transformer, respectively; and $R_{mA}$ and $R_{mB}$ are the magnetic reluctances of Modules A and B, respectively. The voltage v across a winding and the magnetic flux $\Phi$ through the core of a transformer have the relation $v=N\cdot d\Phi/dt$.

By using the voltage-magnetic flux relation, the relations $v_{in}=v_{Ain}+v_{Bin}$ and $v_{out}=v_{Aout}-v_{Bout}$, and Equation 58, the voltage ratio $v_{out}/v_{in}$ can be derived as follows $$\frac{v_{out}}{v_{in}} = \frac{v_{Aout} - v_{Bout}}{v_{Ain} + v_{Bin}} = \frac{N_{A2}N_{A1}R_{mB} - N_{B2}N_{B1}R_{mA}}{N_{A1}N_{A1}R_{mB} + N_{B1}N_{B1}R_{mA}}, \quad (59)$$

The magnetic reluctance $R_m$ of a transformer can be replaced by the inductance L of the primary winding as $R_m=N^2/L$. Therefore, the voltage ratio can be rewritten as $$\frac{v_{out}}{v_{in}} = \frac{N_{A2}N_{A1}L_A - N_{B2}N_{B1}L_B}{N_{A1}N_{A1}L_A + N_{B1}N_{B1}L_B}, \quad (60)$$

where $L_A$ and $L_B$ are the primary inductances of Modules A and B, respectively. According to Equation 60, the voltage ratio of the transformer can be regulated by changing the primary inductances of the two modules.

In the exemplary power transformer 390 shown in FIG. 21, the PZT sheets 406 of the PZT/Metglas composite core 396 of Module A are connected with a controllable voltage source while the PZT/Metglas composite core 396 of Module B is not connected to any voltage source. With this design, the inductance $L_A$ is adjustable by controlling the voltage applied on the PZT sheets 406 of the PZT/Metglas composite core 396 of Module A via the converse magnetoelectric effect, while the inductance $L_B$ is a fixed value. Therefore, the voltage ratio can be regulated by controlling the voltage applied on the PZT/Metglas composite core 396 of Module A. In this example, $N_{A1}=N_{B1}=200$, $N_{A2}=150$, and $N_{B2}=207$.

To test the power transformer 390, its primary winding 392 is connected to a 10 kHz, 10 V sinusoidal voltage source and its secondary winding 394 is connected to a 1 k$\Omega$ resistive load. The output voltage induced in the secondary winding 394 is a 10 kHz sinusoidal wave whose amplitude varies according to the control voltage applied on the PZT sheets 406 of the PZT/Metglas composite core 396 of Module A.

Figure 23:
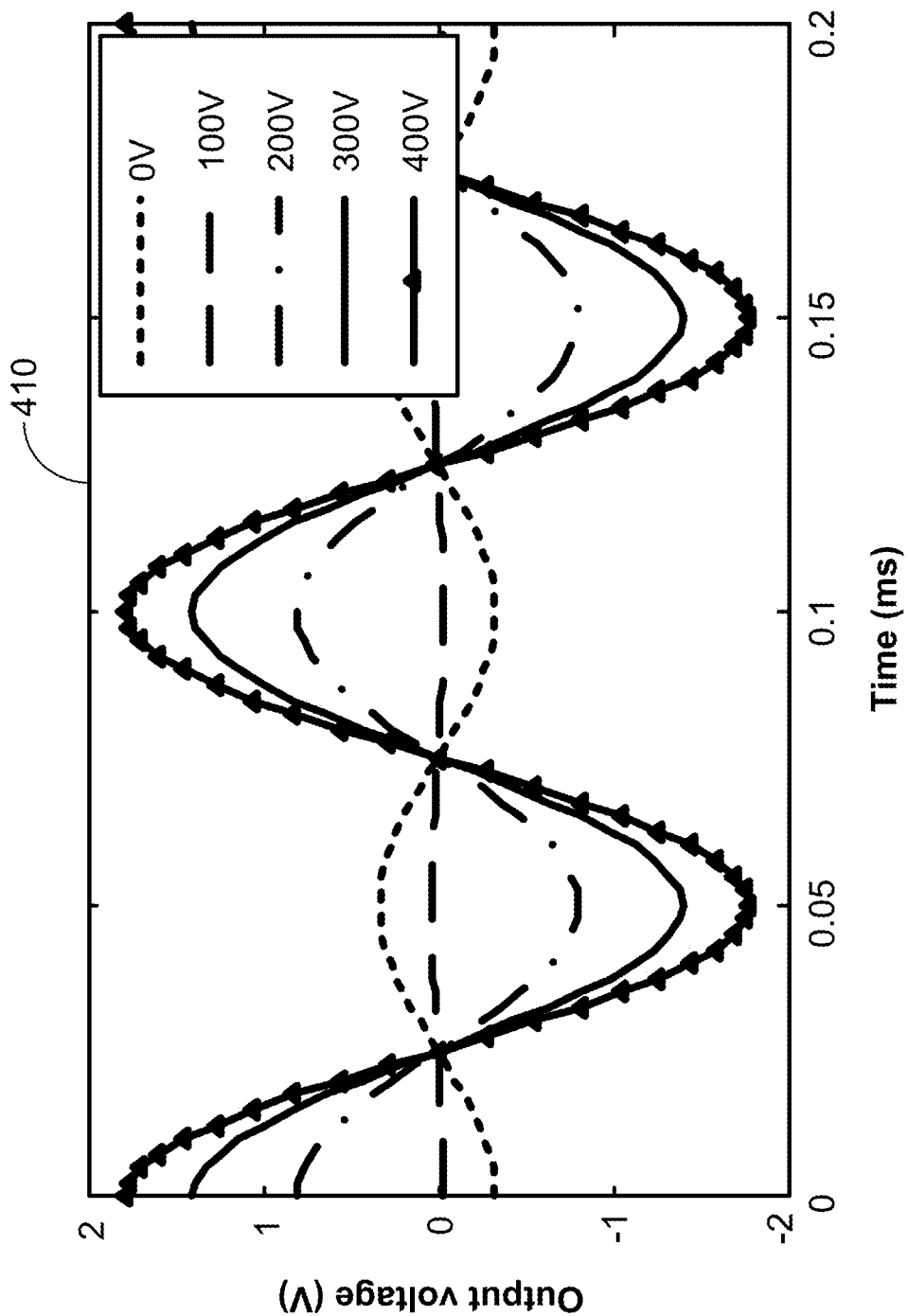
FIG. 23 is a graph showing output waveforms of the power transformer of FIG. 22.

FIG. 23 is a graph 410 showing output waveforms of the power transformer 390 when different control voltages are applied on the PZT sheets 406 of the PZT/Metglas composite core 396 in Module A. As the control voltage increases, the amplitude of the output voltage decreases from 0.33 V to 0 V first and then increases to the maximum value of 1.79 V continuously. According to Equation 60, this maximum value is determined by the variation range of the inductance $L_A$ and the turns numbers of the two modules.

Table 2 below lists the measured inductance of Module A, measured and calculated amplitudes of $v_{out}$, and the measured and calculated voltage ratios of the power transformer 390 when different control voltages are applied. The inductance $L_B$ is a fixed value of 4.85 mH. The value of $L_A$ decreases when the control voltage increases. The amplitudes of the output voltage calculated by Equation 60 match the measured values well.

TABLE 2

Measured inductance of Module A, calculated and measured amplitudes of output voltage, and calculated and measured voltage ratios of the power transformer when different control voltages were applied. The inductance of Module B is fixed at 4.85 mH.

| | Control voltage (V) | | | | | | | | |
|---|---|---|---|---|---|---|---|---|---|
| | 0 | 50 | 100 | 150 | 200 | 250 | 300 | 350 | 400 |
| Inductance of Module A (mH) | 7.25 | 6.99 | 6.60 | 6.04 | 5.54 | 5.10 | 4.76 | 4.50 | 4.30 |
| Calculated amplitude of $v_{out}$ (V) | 0.35 | 0.19 | 0.06 | 0.45 | 0.83 | 1.19 | 1.50 | 1.75 | 1.95 |
| Measured amplitude of $v_{out}$ (V) | 0.33 | 0.24 | 0.03 | 0.47 | 0.81 | 1.13 | 1.40 | 1.61 | 1.79 |
| Calculated voltage ratio ($v_{out}/v_{in}$) | 3.5% | 1.9% | 0.6% | 4.5% | 8.3% | 11.9% | 15% | 18% | 20% |
| Measured voltage ratio ($v_{out}/v_{in}$) | 3.3% | 2.4% | 0.3% | 4.7% | 8.1% | 11.3% | 14% | 16% | 18% |

Figure 24:
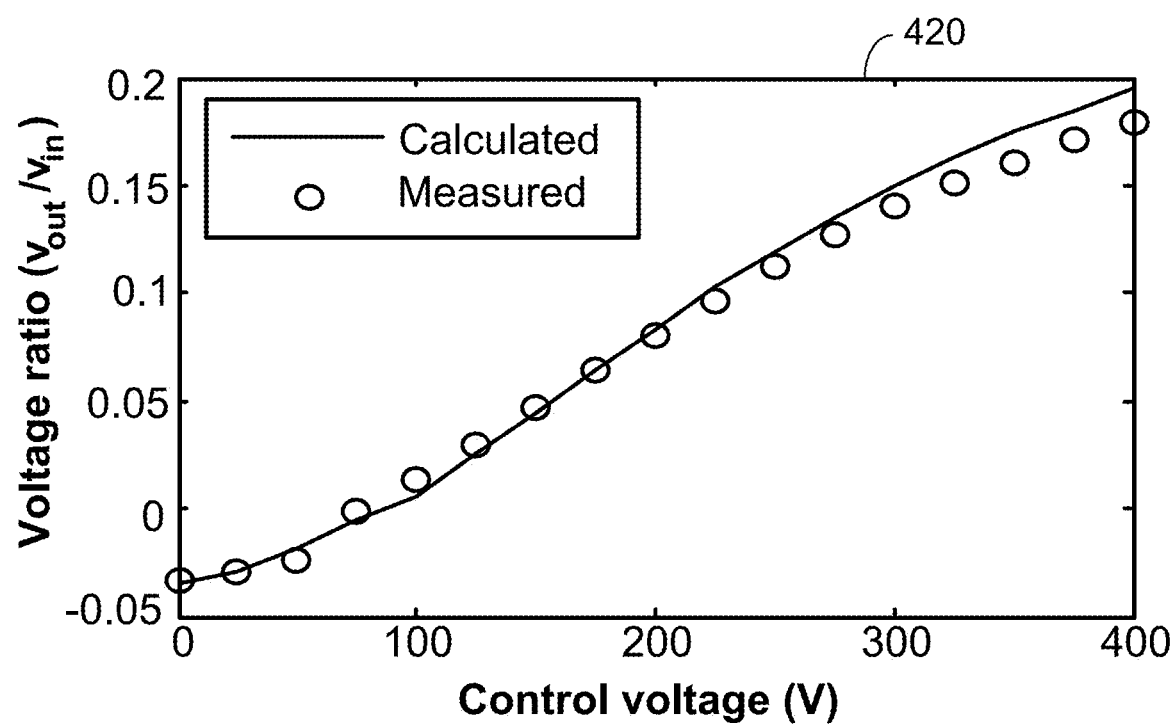
FIG. 24 is a graph showing a relationship between the voltage ratio of a transformer versus control voltage.

FIG. 24 is a graph showing the measured and calculated voltage ratios of the power transformer 390 versus the control voltage applied. The results show that the voltage ratio is continuously adjustable and the measured and calculated voltage ratios are close. The output voltage of the transformer 390 responds immediately when the control voltage is changed. Therefore, the voltage ratio of the transformer 390 can be adjusted rapidly without any delay (i.e., at a high frequency). In addition, once the PZT sheets are charged, the amplitude of the output voltage remains the same even if the control voltage source is removed. This means that the control process is an electrostatic process with a negligible power loss.

The magnetoelectric transformer 390 has a voltage ratio that can be adjusted from zero to the designed maximum value continuously and rapidly by changing the control voltage applied on the PZT sheets 406 of the PZT/Metglas composite core 396. The control process is electrostatic and has negligible power consumption. The transformer 390 is useful in electric power control and conversion applications.

Figure 25:
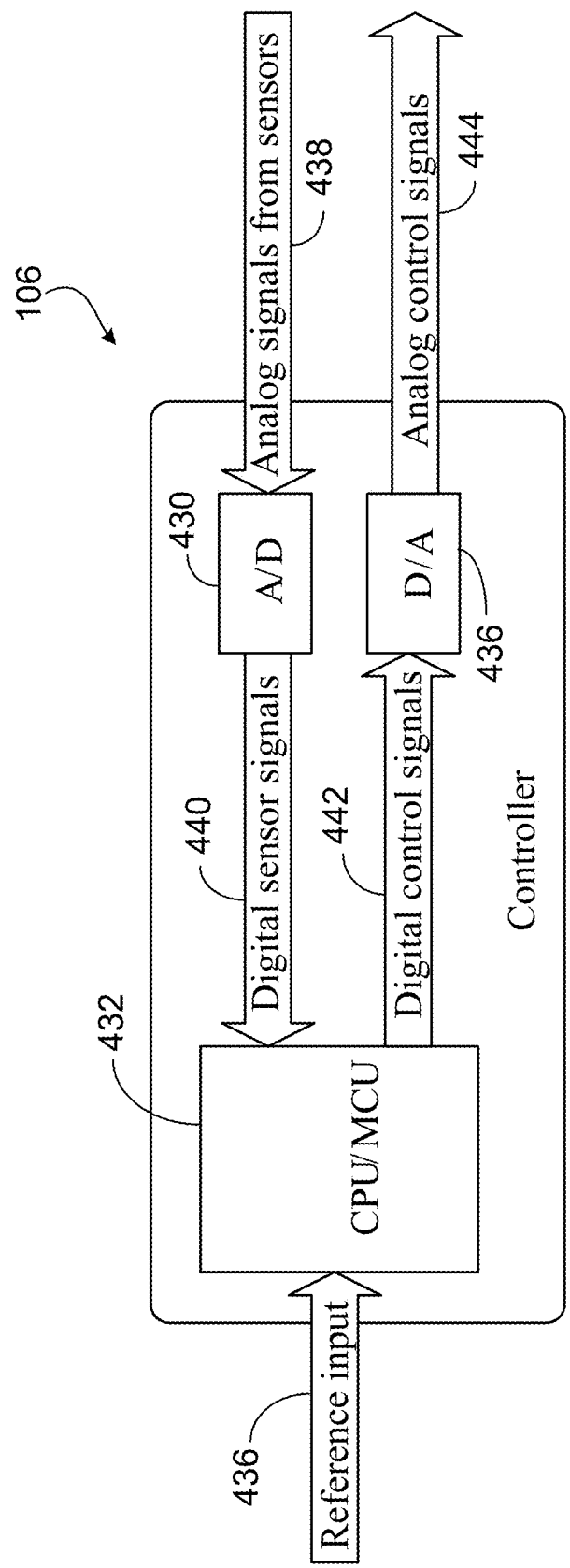
FIG. 25 is a diagram of an exemplary configuration for a controller.

FIG. 25 is a diagram of an exemplary configuration for the controller 106 (FIG. 1). The controller 106 includes an analog-to-digital (A/D) converter 430, a central processing unit (CPU) 432 or a microcontroller unit (MCU), and a digital-to-analog (D/A) converter 434. The A/D converter converts the analog signals 438 acquired from sensors, such as the AC output voltage(s) of the EM power converter 102 and the controllable voltages applied to the magnetic flux valves, into digital signals 440. One or more reference inputs 436 provide reference values for the CPU/MUC 432, in which the CPU/MCU 432 uses a control algorithm to process the digital sensor signals 440 to generate digital control signals 442 at the output. For example, the reference input can be the desired amplitude and frequency of the AC output voltage of the EM power converter 102. For example, the reference input can be provided by an operator, or by another system that sets the desired amplitude and frequency of the AC output voltage. The control algorithm describes the relationship between the desired controllable voltages applied to the magnetic flux valves and the desired AC output voltage(s) of the EM power converter 102. The digital control signals 442 are converted into analog control signals 444 by the D/A converter 434 for controlling the magnetic flux valve driver circuit 104.

Figure 26:
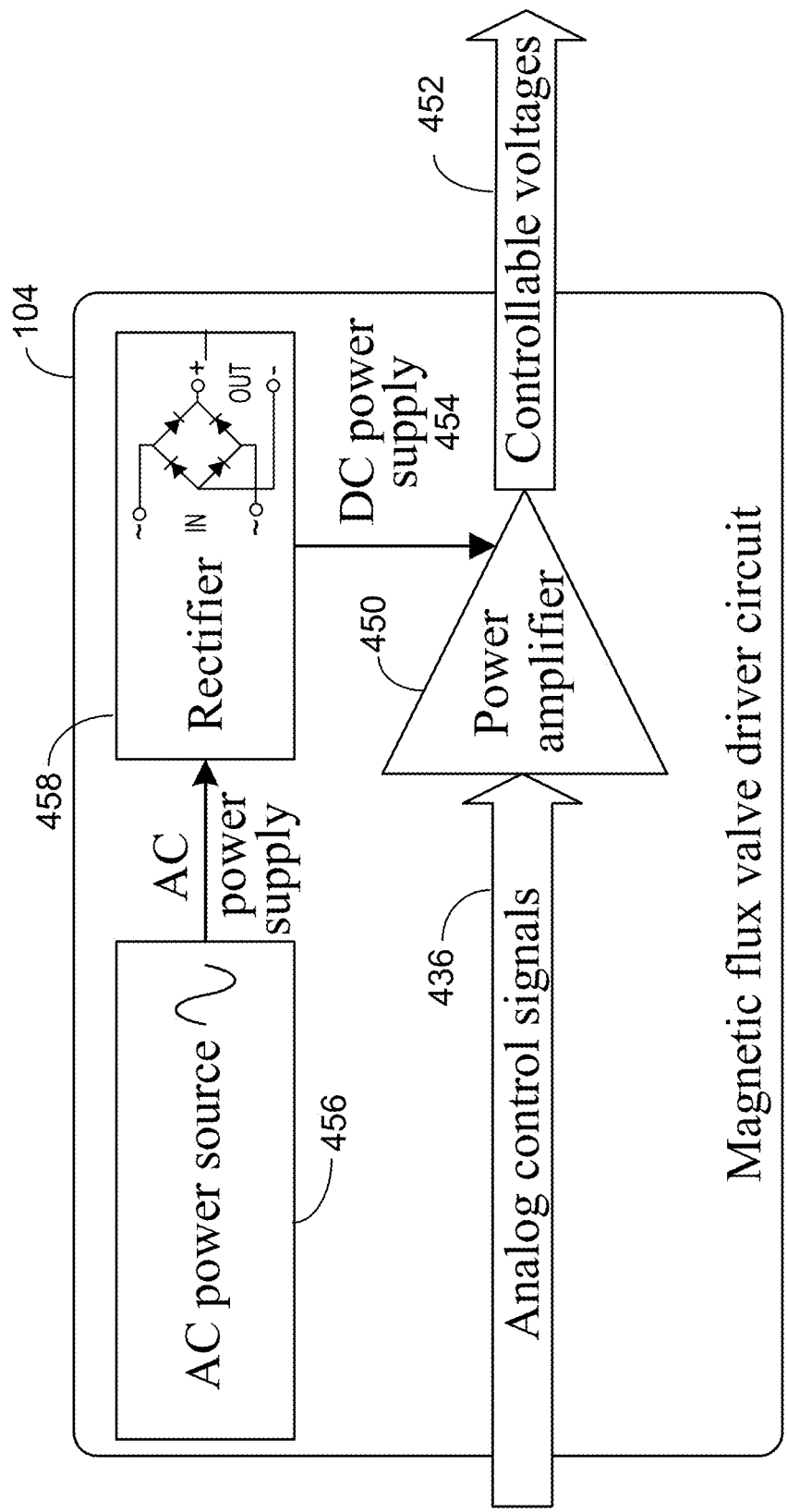
FIG. 26 is a diagram of an exemplary configuration for a magnetic flux valve driver circuit.

Referring to FIG. 26, in some implementations, a magnetic flux valve driver circuit 104 provides power amplification for the control signals. For example, the amplitudes of the analog control signals 444 may vary from 0 V to 1 V with only a 10 mA current, while the controllable voltages outputs of the driver circuit 104 may need to reach up to 400 V with a 1 A current according to the requirement of the magnetic flux valves (e.g., 128, 130). Therefore, the driver circuit 104 includes a power amplifier 450 to amplify the analog control signals 444 into controllable voltages 452 for the magnet flux valves. The amplitude of the controllable voltages 452 is determined by the amplitude of the DC power supply 454 applied to the power amplifier 450. The DC power supply 454 can be obtained from an AC power source 456 through a rectifier circuit 458. The AC power source 456 can be the same as the AC input source of the EM power converter 102.

The controller 106 may include additional components, such as a storage device to store program instructions for implementing the control algorithms. A user interface may be provided. For example, a touch screen and/or a keyboard and/or a pointer device (such as a computer mouse) may be provided to enable a user to specify an amplitude, frequency, and/or waveform of the output signal of the power converter 102.

In some implementations, the controller 106 can include one or more processors and one or more computer-readable media (e.g., RAM, ROM, SDRAM, hard disk, optical disk, and flash memory). The one or more processors can perform various calculations described above. The calculations can also be implemented using application-specific integrated circuits (ASICs). The term "computer-readable medium" refers to a medium that participates in providing instructions to a processor for execution, including without limitation, non-volatile media (e.g., optical or magnetic disks), and volatile media (e.g., memory) and transmission media. Transmission media includes, without limitation, coaxial cables, copper wire, fiber optics and free space.

The features described above can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, e.g., general purpose microprocessors, special purpose microprocessors, digital signal processors, single-core or multi-core processors, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM, DVD-ROM, and Blu-ray BD-ROM disks. The processor and the memory can be supplemented by, or incorporated in, ASICs (application-specific integrated circuits).

Particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Although some examples have been discussed above, other implementations and applications are also within the scope of the following claims. For example, the power converter 140 in FIG. 2B has two magnetic flux valves (e.g., 150A, 150B) on each leg of the magnetic core. It is possible to use a single magnetic flux valve on each core leg, or use three or more magnetic flux valves on each core leg. In the example of FIG. 7, three identical three-leg modules are used. It is possible to use three three-leg modules that have different characteristics, such as different core dimensions, primary windings with different numbers of turns, secondary windings with different numbers of turns, or magnetic flux valves with different functions $f(U)$ of permeability variation with respect to the applied voltage U. In the example of FIG. 10, three identical four-leg modules are used. It is also possible to use three four-leg modules that have different characteristics, such as different core dimensions, primary windings with different numbers of turns, secondary windings with different numbers of turns, or magnetic flux valves with different functions $f(U)$ of permeability variation with respect to the applied voltage U. In the example of FIG. 12A, the different legs can have different characteristics, such as different core leg dimensions, primary windings with different numbers of turns, secondary windings with different numbers of turns, or magnetic flux valves with different functions $f(U)$ of permeability variation with respect to the applied voltage U. For power converters that have multiple core legs, different core legs can have different numbers of magnetic flux valves. For example, one of the core legs may have one magnetic flux valve, a second core leg may have two magnetic flux valves, and a third core leg may not have any magnetic flux valve. Different control signals applied to different magnetic flux valves of a power converter can have different amplitudes, frequencies, and/or waveforms.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

What is claimed is:

1. A method of converting an alternating current (AC) signal to a direct current (DC) signal, the method comprising:
   providing the AC signal to a primary winding that is wound around a primary core of an electromagnetic (EM) power converter, in which the EM power converter comprises the primary core and at least two secondary cores, at least one of the secondary cores comprises a magnetic flux valve having an adjustable reluctance, in which each magnetic flux valve comprises one or more layers of piezoelectric material, one or more layers of magnetostrictive material, and electrodes to receive one of the control signals;
   providing one or more control signals to the one or more magnetic flux valves to control the permeability of each magnetic flux valve, control a reluctance of each secondary core that has the magnetic flux valve, and control a distribution of magnetic fluxes in the secondary cores;
   generating a first signal having a rectangular waveform based on output signals of secondary windings that are wound around the secondary cores; and
   generating the DC signal by rectifying the first signal.

2. The method of claim 1 in which comprising controlling the one or more control signals to cause a difference in magnetic fluxes of the two secondary cores to have a triangular waveform.

3. A method of regulating an amplitude of an output signal of an electromagnetic (EM) power converter, the method comprising:
   providing an input signal to a primary winding that is wound around a primary core of the EM power converter, in which the EM power converter comprises the primary core and at least two secondary cores, at least one of the secondary cores comprises a magnetic flux valve having an adjustable reluctance;
   applying one or more control signals to the one or more magnetic flux valves to control the permeability of each magnetic flux valve, control a reluctance of each secondary core that has the magnetic flux valve, and control a distribution of magnetic fluxes in the secondary cores;
   generating a first output signal based on output signals of secondary windings that are wound around the secondary cores; and
   controlling an amplitude of the first output signal by controlling the control signals applied to the one or more magnetic flux valves;
   wherein each magnetic flux valve comprises one or more layers of piezoelectric material, one or more layers of magnetostrictive material, and electrodes to receive one of the control signals.

4. An apparatus comprising:
   an electromagnetic (EM) power converter comprising:
     a plurality of converter modules, each converter module comprising:
       a first core leg;
       a primary winding wound around a section of the first core leg, the primary winding having a first terminal and a second terminal that are configured to receive an input signal;
       a second core leg comprising a first magnetic flux valve having a reluctance that changes in response to a control signal, in which the first magnetic flux valve comprises one or more layers of magnetostrictive material and one or more layers of piezoelectric material; and
       a first secondary winding wound around a section of the second core leg, the secondary winding having a first terminal and a second terminal;
     wherein at least some of the secondary windings of the plurality of converter modules are connected in series, and two terminals of the series-connected secondary windings are configured to provide an output signal.

5. The apparatus of claim 4 in which each converter module comprises:
   a third core leg; and
   a second secondary winding wound around a section of the third core leg, the second secondary winding having a first terminal and a second terminal;
   wherein the first secondary winding and the second secondary winding of at least some of the converter module are connected in series.

6. The apparatus of claim 5 in which the third core leg comprises a second magnetic flux valve having a reluctance that changes in response to a second control signal.

7. The apparatus of claim 6 in which each converter module comprises:
   a fourth core leg; and
   a third secondary winding wound around a section of the fourth core leg, the third secondary winding having a first terminal and a second terminal.

8. The apparatus of claim 7 in which the fourth core leg comprises a third magnetic flux valve having a reluctance that changes in response to a third control signal.

9. The apparatus of claim 6, comprising a driver circuit to generate the first and second control signals.

10. The apparatus of claim 9 in which the driver circuit is configured to generate the first and second control signals to provide a constant difference between a first reluctance of the first magnetic flux valve and a second reluctance of the second magnetic flux valve.

11. The apparatus of claim 9 in which the driver circuit is configured to generate the first and second control signals to cause the first magnetic flux valve to have a first reluctance, the second magnetic flux valve to have a second reluctance, and a difference between the first and second reluctances varies over time.

12. The apparatus of claim 5 in which within one converter module, a negative terminal of a first secondary winding is electrically coupled to a negative terminal of a second secondary winding.

13. The apparatus of claim 4 in which the one or more layers of piezoelectric material hold electric charges provided by the control signal and maintain at least a portion of the electric charges after the control signal is removed.

14. An apparatus comprising:
an electromagnetic (EM) power converter comprising:
a plurality of converter modules, each comprising:
a first core leg;
a primary winding wound around a section of the first core leg, the primary winding having a first terminal and a second terminal;
a second core leg;
a first secondary winding wound around a section of the second core leg, the secondary winding having a first terminal and a second terminal;
a first magnetic flux valve having a reluctance that changes in response to a first control signal, in which the first core leg, the second core leg, and the first magnetic flux valve together provide a first magnetic flux path having an overall reluctance that changes in response to the first control signal;
a third core leg;
a second secondary winding wound around a section of the third core leg, the second secondary winding having a first terminal and a second terminal; and
a second magnetic flux valve having a reluctance that changes in response to a second control signal, in which the first core leg, the third core leg, and the second magnetic flux valve together provide a second magnetic flux path having an overall reluctance that changes in response to the second control signal;
wherein each of the magnetic flux valves comprises one or more layers of magnetostrictive material and one or more layers of piezoelectric material.

15. The apparatus of claim 14 in which at least some of the secondary windings of the plurality of converter modules are connected in series, and two terminals of the series-connected secondary windings are configured to provide an output signal.

16. The apparatus of claim 15 in which the plurality of converter modules comprises three converter modules, the primary windings of the three converter modules are configured to receive a three-phase input signal, and the series-connected secondary windings are configured to provide a single phase output signal.

17. The apparatus of claim 14 in which the plurality of converter modules comprises three single-phase converter modules, each single-phase converter module comprises three converter modules, and the three single-phase converter modules are configured to provide a three-phase output signal.

18. The apparatus of claim 14, comprising a driver circuit configured to generate the first and second control signals.

19. The apparatus of claim 18 in which the driver circuit is configured to generate the first and second control signals to provide a constant difference between a first reluctance of the first magnetic flux valve and a second reluctance of the second magnetic flux valve.

20. The apparatus of claim 18 in which the driver circuit is configured to generate the first and second control signals to cause the first magnetic flux valve to have a first reluctance, the second magnetic flux valve to have a second reluctance, and a difference between the first and second reluctances varies over time.

21. The apparatus of claim 14 in which the one or more layers of piezoelectric material hold electric charges provided by the control signal and maintain at least a portion of the electric charges after the control signal is removed.

22. The apparatus of claim 14 in which each of the magnetic flux valves comprises electrodes to receive one of the control signals and to provide an electric field across the one or more piezoelectric layers in response to the control signal.

23. The apparatus of claim 14 in which each converter module comprises:
a fourth core leg;
a third secondary winding wound around a section of the fourth core leg, the third secondary winding having a first terminal and a second terminal; and
a third magnetic flux valve having a reluctance that changes in response to a third control signal, in which the first core leg, the fourth core leg, and the third magnetic flux valve together provide a third magnetic flux path, and the third magnetic flux path has an overall reluctance that changes in response to the third control signal.

24. The apparatus of claim 23 in which the plurality of converter modules comprise three converter modules, the second terminal of the first secondary winding of the first converter module is electrically coupled to the first terminal of the first secondary winding of the second converter module, the second terminal of the first secondary winding of the second converter module is electrically coupled to the first terminal of the first secondary winding of the third converter module, and the first terminal of the first secondary winding of the first converter module and the second terminal of the first secondary winding of the third converter module are configured to provide a first output signal.

25. The apparatus of claim 24 in which the second terminal of the second secondary winding of the first converter module is electrically coupled to the first terminal of the second secondary winding of the second converter module, the second terminal of the second secondary winding of the second converter module is electrically coupled to the first terminal of the second secondary winding of the third converter module, and the first terminal of the second secondary winding of the first converter module and the second terminal of the second secondary winding of the third converter module are configured to provide a second output signal.

26. The apparatus of claim 25 in which the second terminal of the third secondary winding of the first converter module is electrically coupled to the first terminal of the third secondary winding of the second converter module, the second terminal of the third secondary winding of the second converter module is electrically coupled to the first terminal of the third secondary winding of the third converter module, and the first terminal of the third secondary winding of the first converter module and the second terminal of the third secondary winding of the third converter module are configured to provide a third output signal.

27. The apparatus of claim 25 in which the three primary windings are configured to receive a three-phase input signal, and the first, second, and third output signals are configured to be a three-phase output signal.

* * * * *

UNITED STATES PATENT AND TRADEMARK OFFICE
CERTIFICATE OF CORRECTION

PATENT NO. : 10,784,041 B2
APPLICATION NO. : 16/410913
DATED : September 22, 2020
INVENTOR(S) : Wei Qiao, Liyan Qu and Haosen Wang Page 1 of 1

It is certified that error appears in the above-identified patent and that said Letters Patent is hereby corrected as shown below:

In the Claims

In Column 49, Line 4, in Claim 27, please delete "claim 25" and insert -- claim 26 --, therefor.

Signed and Sealed this
Twenty-second Day of June, 2021

Drew Hirshfeld
*Performing the Functions and Duties of the*
*Under Secretary of Commerce for Intellectual Property and*
*Director of the United States Patent and Trademark Office*